(12) United States Patent
Ebrahimi Afrouzi et al.

(10) Patent No.: US 12,533,810 B1
(45) Date of Patent: Jan. 27, 2026

(54) METHOD FOR TRACKING MOVEMENT OF A MOBILE ROBOTIC DEVICE

(71) Applicants: Ali Ebrahimi Afrouzi, Henderson, NV (US); Lukas Robinson, York (CA); Chen Zhang, Redmond, WA (US); Brian Highfill, Castro Valley, CA (US)

(72) Inventors: Ali Ebrahimi Afrouzi, Henderson, NV (US); Lukas Robinson, York (CA); Chen Zhang, Redmond, WA (US); Brian Highfill, Castro Valley, CA (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 18/896,359

(22) Filed: Sep. 25, 2024

Related U.S. Application Data

(63) Continuation of application No. 17/565,117, filed on Dec. 29, 2021, now Pat. No. 12,083,684, which is a
(Continued)

(51) Int. Cl.
*B25J 9/16* (2006.01)
*B25J 11/00* (2006.01)
(Continued)

(52) U.S. Cl.
CPC ........... *B25J 9/1671* (2013.01); *B25J 9/1664* (2013.01); *B25J 11/0085* (2013.01); *B25J 19/022* (2013.01); *G06F 17/18* (2013.01)

(58) Field of Classification Search
CPC .... B25J 9/1671; B25J 9/1664; B25J 11/0085; B25J 19/022; G06F 17/18
See application file for complete search history.

(56) References Cited

U.S. PATENT DOCUMENTS

| 4,862,373 A | * | 8/1989 | Meng | ................. | G01C 21/3878 |
| | | | | | 701/410 |
| 6,240,652 B1 | | 6/2001 | Bobel | | |

(Continued)

FOREIGN PATENT DOCUMENTS

| CA | 2246594 A1 | * | 2/1997 |
| CN | 105380575 A | | 9/2016 |

(Continued)

OTHER PUBLICATIONS

Bai et al., "Deep Learning Based Robot for Automatically Picking up Garbage On Grass", IEEE Transactions on Consumer Electronics, vol. 64, No. 3, Aug. 2018 (Year: 2018).*

(Continued)

*Primary Examiner* — Mekonen T Bekele

(57) ABSTRACT

Provided is a tangible, non-transitory, machine readable medium storing instructions that when executed by the processor effectuates operations including: capturing visual readings to objects within an environment; capturing readings of wheel rotation; capturing readings of a driving surface; capturing distances to obstacles; determining displacement of the robotic device in two dimensions based on sensor readings of the driving surface; estimating, with the processor, a corrected position of the robotic device to replace a last known position of the robotic device; determining a most feasible element in an ensemble based on the visual readings; and determining a most feasible position of the robotic device as the corrected position based on the most feasible element in the ensemble and the visual readings.

30 Claims, 38 Drawing Sheets

Related U.S. Application Data continuation of application No. 16/554,040, filed on Aug. 28, 2019, now Pat. No. 11,241,791, which is a continuation-in-part of application No. 15/955,480, filed on Apr. 17, 2018, now Pat. No. 10,436,810.

(60) Provisional application No. 62/774,420, filed on Dec. 3, 2018, provisional application No. 62/772,026, filed on Nov. 27, 2018, provisional application No. 62/760,267, filed on Nov. 13, 2018, provisional application No. 62/756,896, filed on Nov. 7, 2018, provisional application No. 62/748,943, filed on Oct. 22, 2018, provisional application No. 62/746,688, filed on Oct. 17, 2018, provisional application No. 62/740,558, filed on Oct. 3, 2018, provisional application No. 62/740,573, filed on Oct. 3, 2018, provisional application No. 62/740,580, filed on Oct. 3, 2018, provisional application No. 62/739,738, filed on Oct. 1, 2018, provisional application No. 62/737,576, filed on Sep. 27, 2018, provisional application No. 62/737,270, filed on Sep. 27, 2018, provisional application No. 62/736,676, filed on Sep. 26, 2018, provisional application No. 62/736,239, filed on Sep. 25, 2018, provisional application No. 62/735,137, filed on Sep. 23, 2018, provisional application No. 62/730,675, filed on Sep. 13, 2018, provisional application No. 62/729,015, filed on Sep. 10, 2018.

(51) Int. Cl.
*B25J 19/02* (2006.01)
*G06F 17/18* (2006.01)

(56) References Cited

U.S. PATENT DOCUMENTS

| | | | |
|---|---|---|---|
| 6,804,022 | B2 | 10/2004 | Fujiwara |
| 7,145,130 | B2 | 12/2006 | Sano |
| 7,456,815 | B2 | 11/2008 | Reime |
| 8,546,745 | B2 | 10/2013 | Lippuner |
| 2004/0193323 | A1 | 9/2004 | Higaki |
| 2006/0273749 | A1* | 12/2006 | Im .................. G05D 1/0242 318/587 |
| 2008/0129829 | A1 | 6/2008 | Shin |
| 2009/0027544 | A1 | 1/2009 | Grewal |
| 2009/0039886 | A1 | 2/2009 | White |
| 2009/0194137 | A1* | 8/2009 | Friedman ............ A47L 9/281 701/532 |
| 2010/0152897 | A1 | 6/2010 | Muller |
| 2013/0010066 | A1* | 1/2013 | Olivier, III .......... G01S 17/89 348/46 |
| 2013/0073089 | A1 | 3/2013 | Nakahara |
| 2016/0096272 | A1 | 4/2016 | Smith |
| 2017/0192435 | A1 | 7/2017 | Bakhishev |
| 2018/0344116 | A1 | 12/2018 | Schriesheim |

FOREIGN PATENT DOCUMENTS

| | | | | |
|---|---|---|---|---|
| EP | 2263510 | B1 * | 9/2017 | .......... A47L 11/4002 |
| FR | 2907949 | A1 * | 5/2008 | ............ G01S 17/06 |
| JP | 2018509595 | A * | 4/2018 | |

OTHER PUBLICATIONS

Bai et al., " Deep Learning Based Robot for Automatically Picking up Garbage on Grass", IEEE Transactions on Consumer Electronics, vol. 64, No. 3, Aug. 2018, publication year . . . 2018.*

* cited by examiner

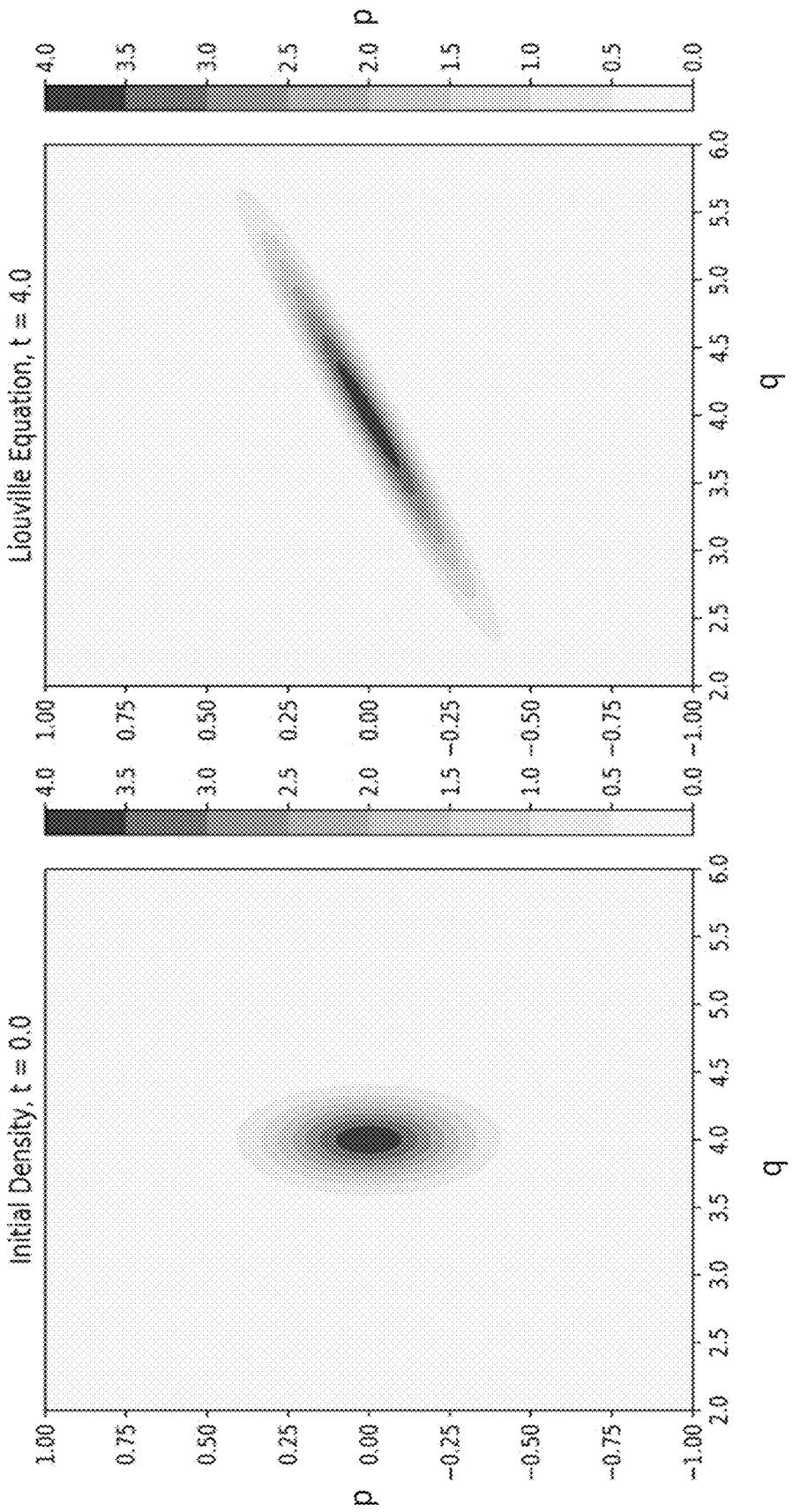

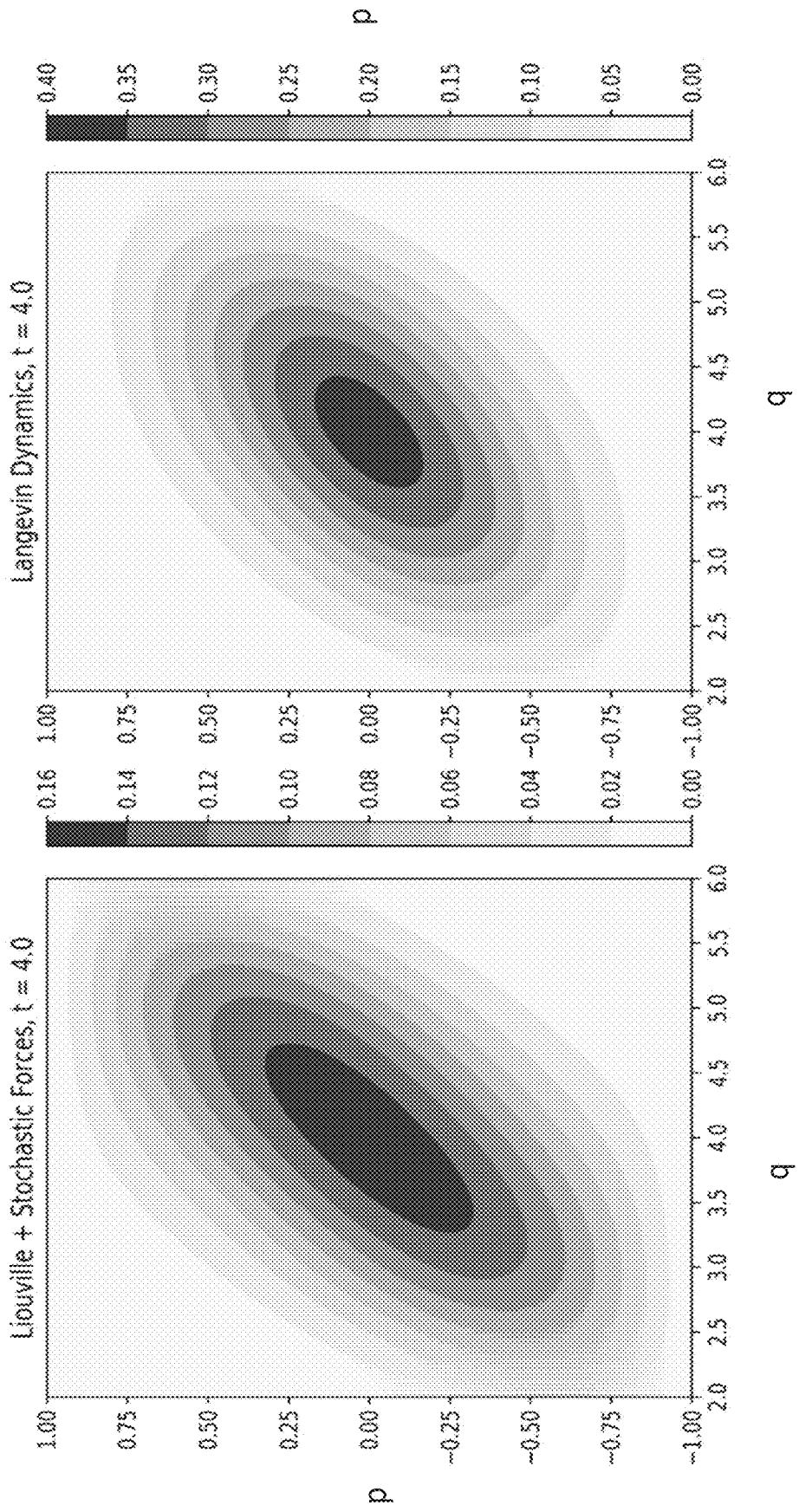

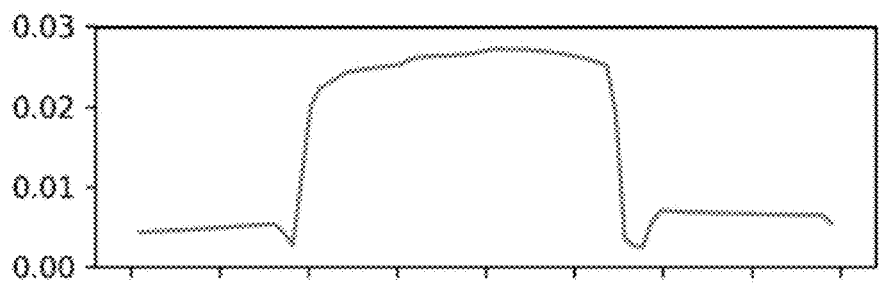
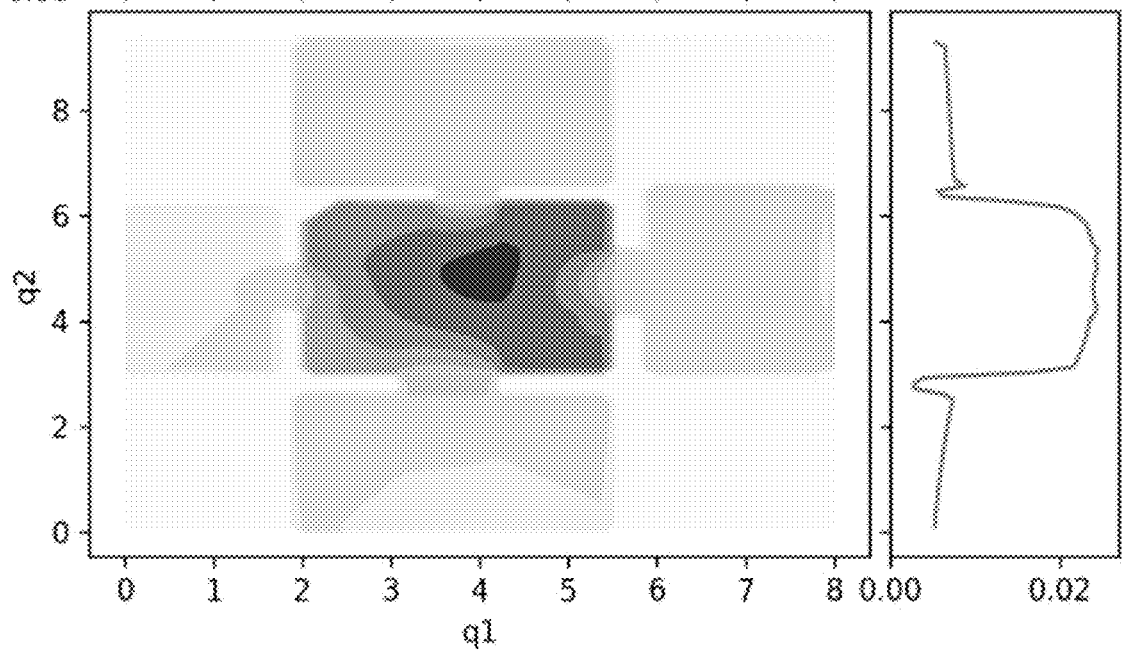
FIG. 10B
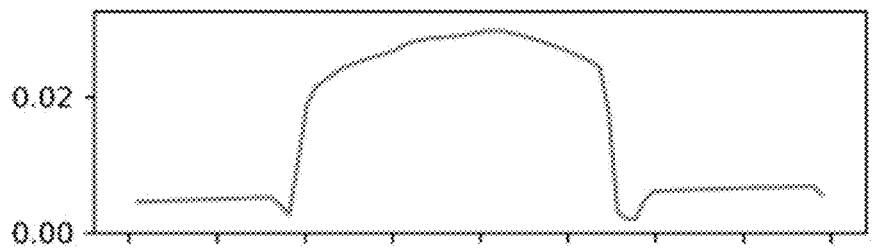
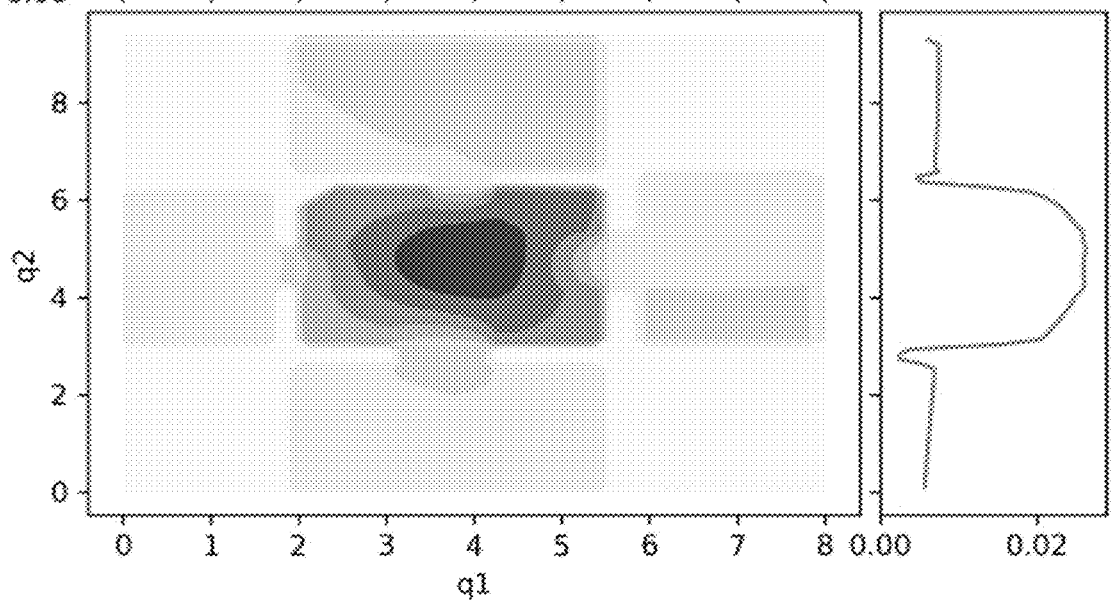
FIG. 10C

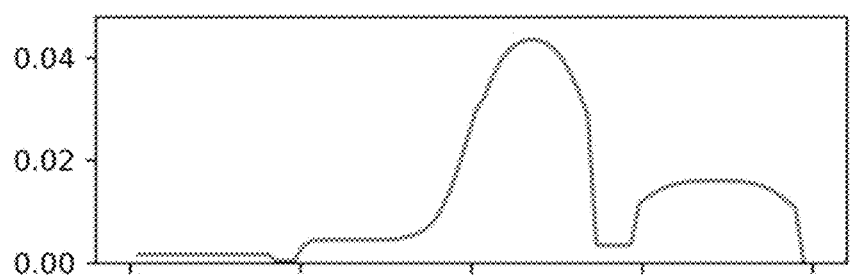
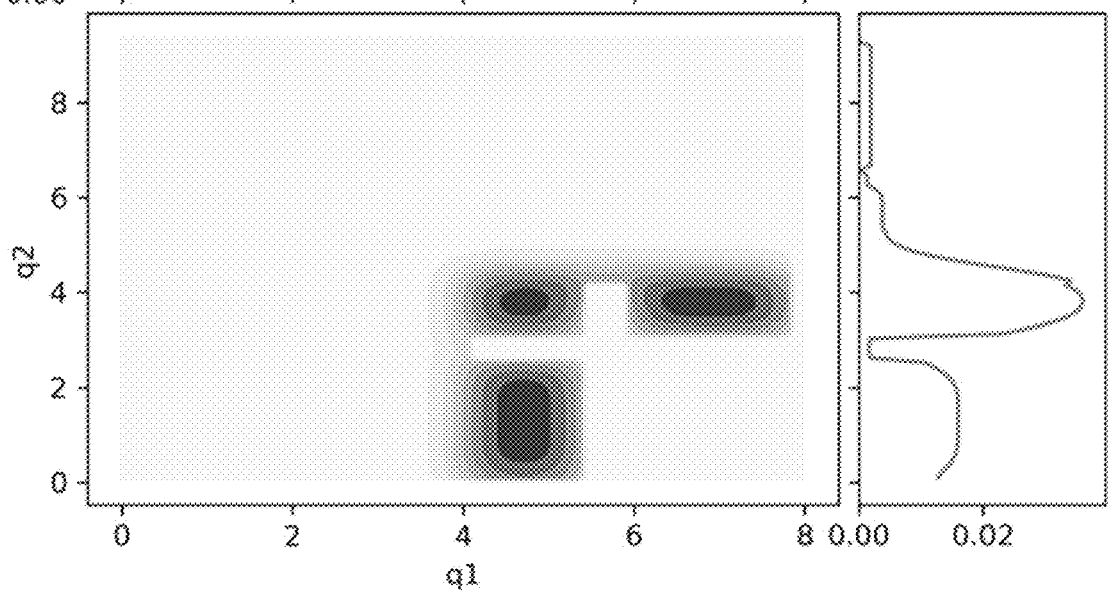
FIG. 14
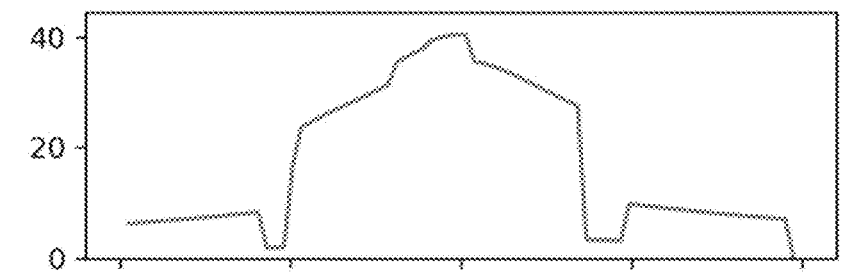
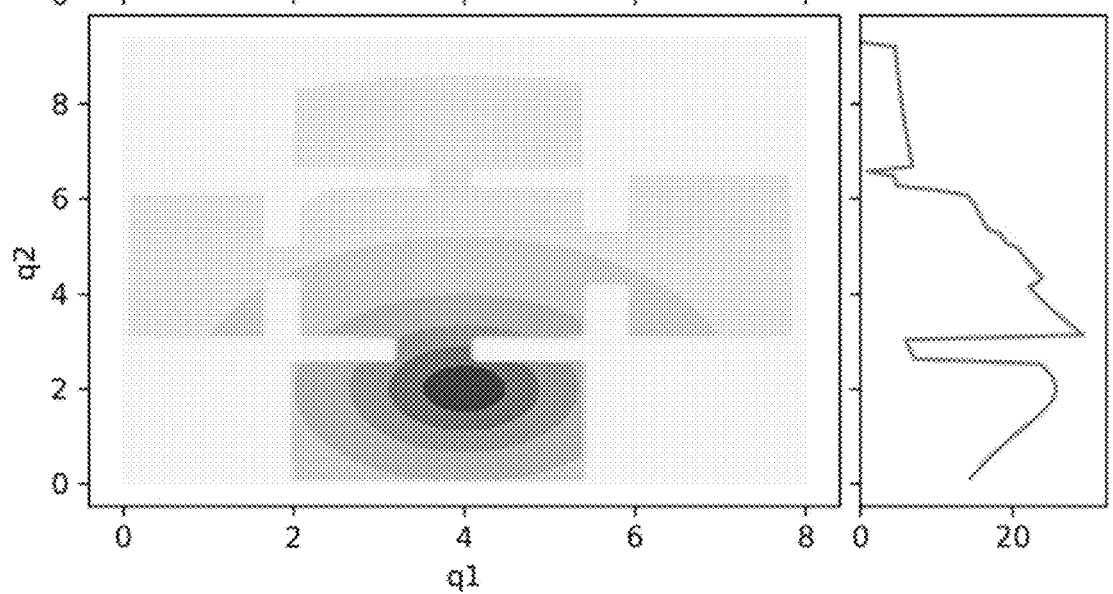
FIG. 15

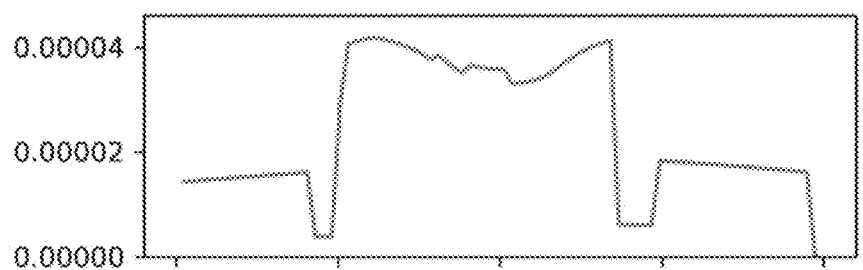
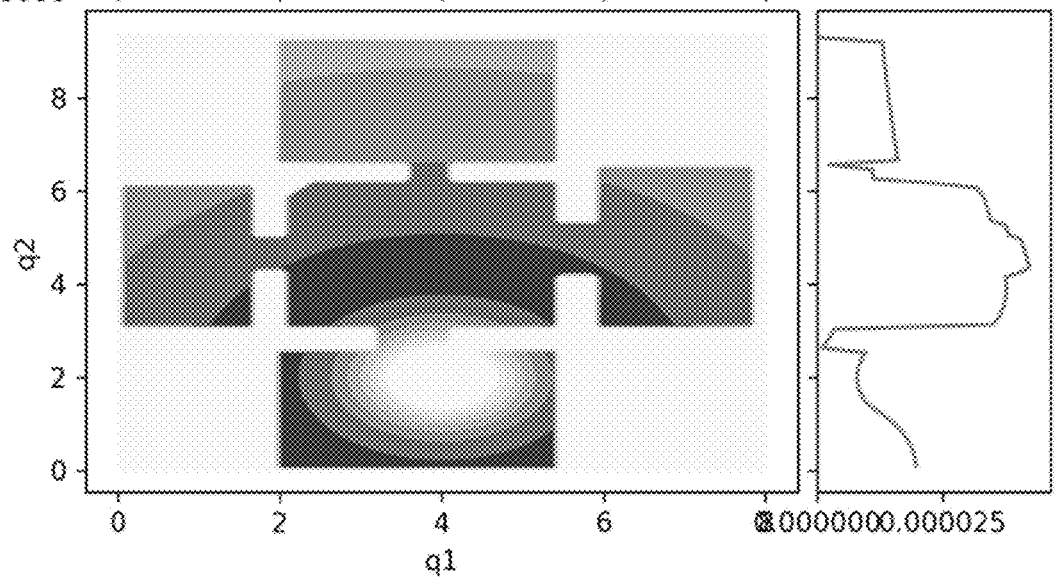
FIG. 16
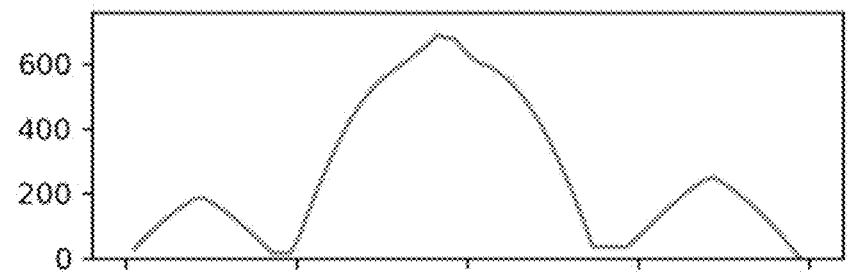
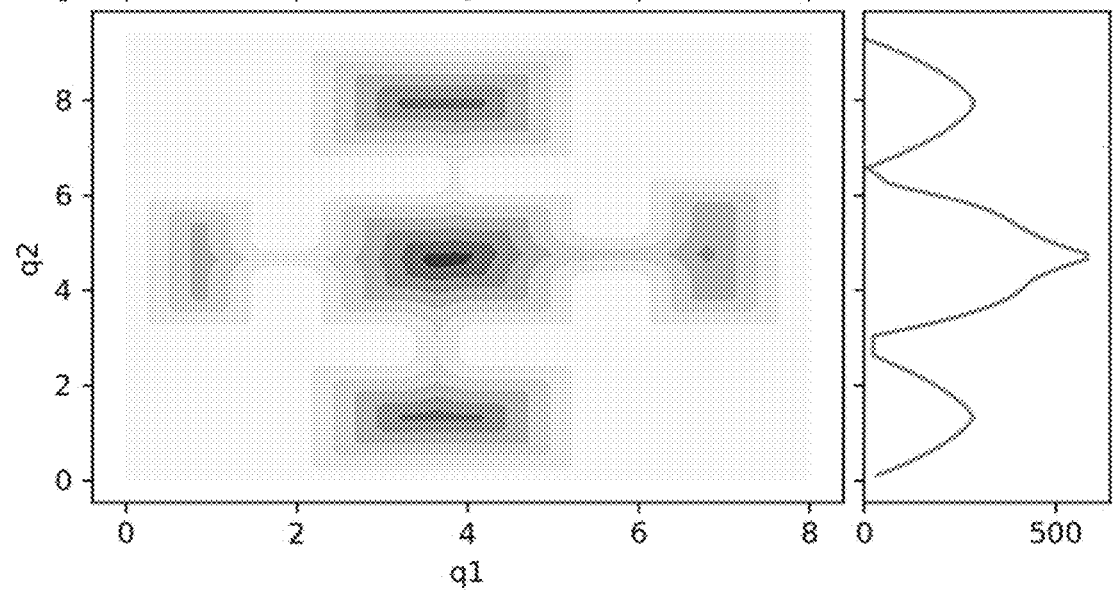
FIG. 17

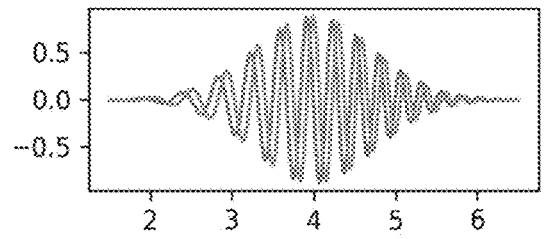
FIG. 26A Original Ψ(x, 2)
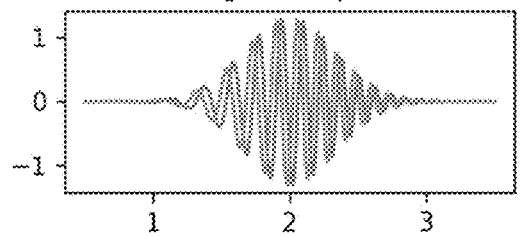
FIG. 26B Original Φ(p, 2)
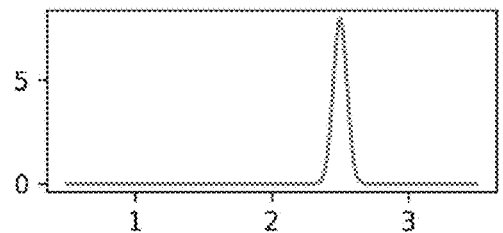
FIG. 26C Observed Momentum Prob
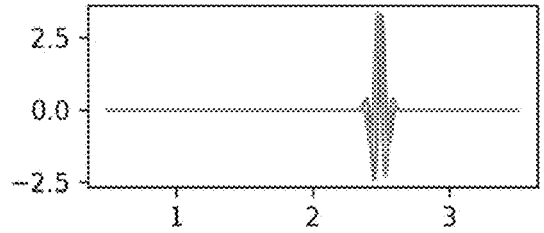
FIG. 26D Updated Φ(p, 2)
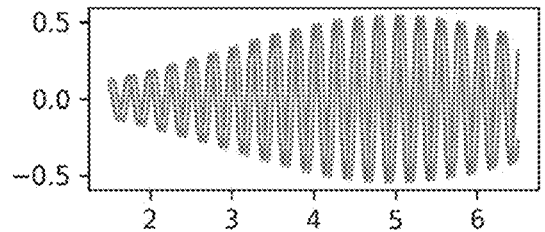
FIG. 26E Updated Ψ(x, 2)
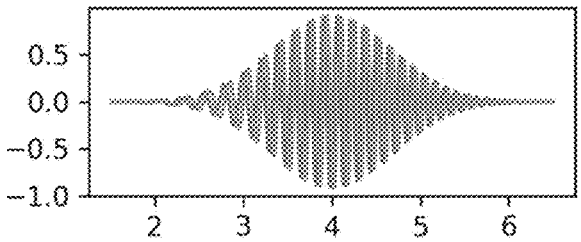
FIG. 27A Original Ψ(x, 2)
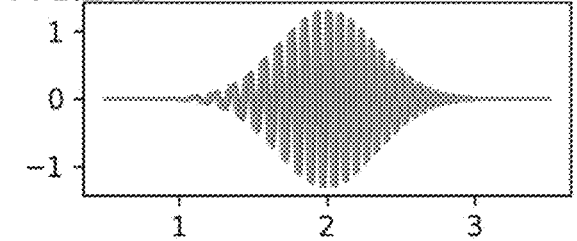
FIG. 27B Original Φ(p, 2)
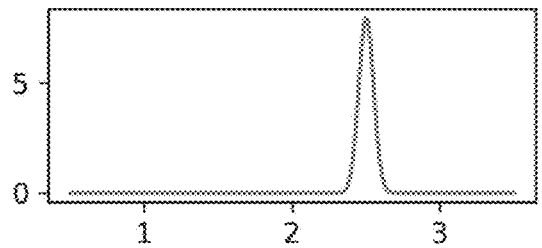
FIG. 27C Observed Momentum Prob
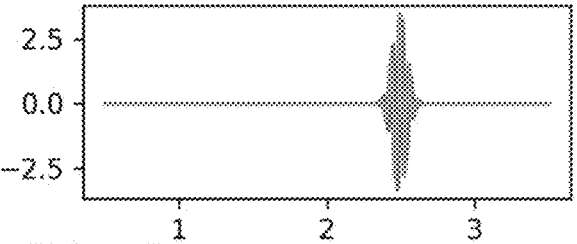
FIG. 27D Updated Φ(p, 2)
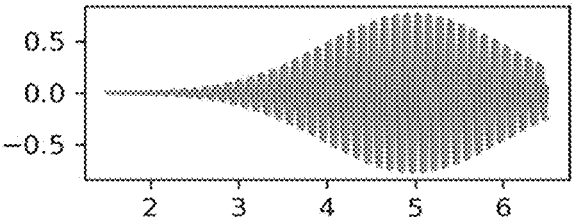
FIG. 27E Updated Ψ(x, 2)

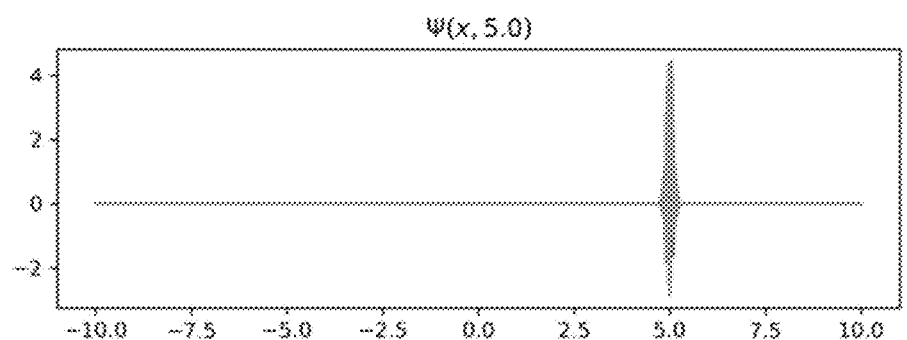
FIG. 35E
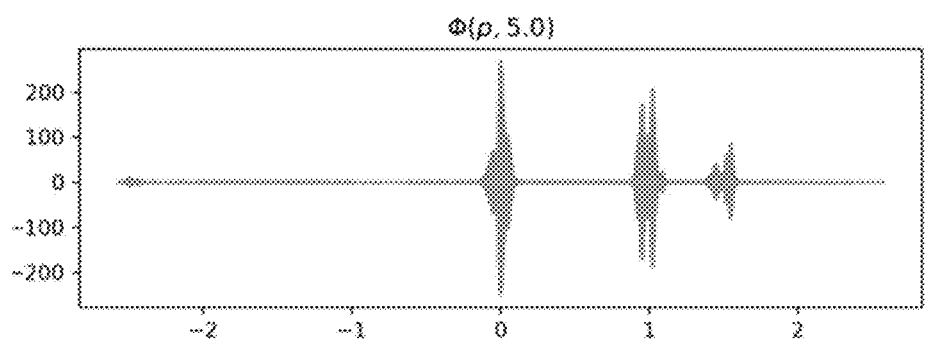
FIG. 35F
FIG. 36
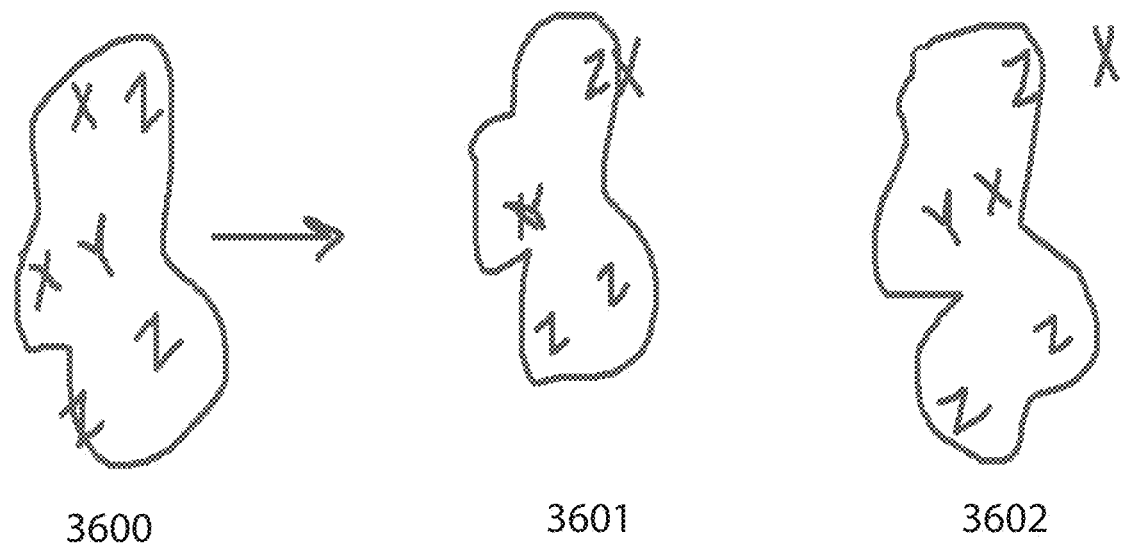
3600　　　　　　　　3601　　　　　　　　3602

METHOD FOR TRACKING MOVEMENT OF A MOBILE ROBOTIC DEVICE

CROSS-REFERENCE TO RELATED APPLICATIONS

This application is a Continuation of U.S. Non-Provisional patent application Ser. No. 17/565,117, filed Dec. 19, 2021, which is a Continuation of U.S. Non-Provisional patent application Ser. No. 16/554,040, filed Aug. 28, 2019, which is a Continuation-in-Part of U.S. patent application Ser. No. 15/955,480, filed Apr. 17, 2018, each of which is hereby incorporated by reference.

Non-Provisional patent application Ser. No. 16/554,040, filed Aug. 28, 2019, claims the benefit of Provisional Patent Application Nos. 62/746,688, filed Oct. 17, 2018, 62/740,573, filed Oct. 3, 2018, 62/740,580, filed Oct. 3, 2018, 62/735,137, filed Sep. 23, 2018, 62/740,558, filed Oct. 3, 2018, 62/736,676, filed Sep. 26, 2018, 62/729,015, filed Sep. 10, 2018, 62/730,675, filed Sep. 13, 2018, 62/736,239, filed Sep. 25, 2018, 62/737,270, filed Sep. 27, 2018, 62/739,738, filed Oct. 1, 2018, 62/748,943, filed Oct. 22, 2018, 62/756,896, filed Nov. 7, 2018, 62/772,026, filed Nov. 27, 2018, 62/774,420, filed Dec. 3, 2018, 62/760,267, filed Nov. 13, 2018, and 62/737,576, filed Sep. 27, 2018, each of which is hereby incorporated by reference.

In this patent, certain U.S. patents, U.S. patent applications, or other materials (e.g., articles) have been incorporated by reference. Specifically, U.S. patent application Ser. Nos. 15/272,752, 15/949,708, 16/277,991, 16/048,179, 16/048,185, 16/163,541, 16/163,562, 16/163,508, 16/185,000, 16/041,286, 16/422,234, 15/406,890, 14/673,633, 15/676,888, 16/163,530, 16/297,508, 15/955,480, 15/425,130, 15/955,344, 15/243,783, 15/954,335, 15/954,410, 15/257,798, 15/674,310, 15/224,442, 15/683,255, 14/817,952, 15/619,449, 16/198,393, 15/444,966, 15/447,450, 15/447,623, 15/951,096, 16/270,489, 16/239,410, 16/353,019, 15/447,122, 16/393,921, 16/389,797, 15/706,523, 16/241,436, 15/377,674, 16/427,317, 15/048,827, 15/981,643, 15/986,670, 16/130,880, and 14/948,620, are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to autonomous robotic devices.

BACKGROUND

Mobile robotic devices are being used with increasing frequency to carry out routine tasks, such as vacuuming, mopping, cutting grass, painting, etc. It may be useful to track the displacement and rotation of a mobile robotic device for reasons such as, accurately generating one or more maps of the environment, accurately locating the position of the robotic device within a map of the environment, and thorough coverage of an environment or area of an environment.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some embodiments provide a robotic device, including: a chassis; a set of wheels coupled to the chassis; one or more electric motors for rotating the set of wheels; one or more tools for performing work coupled to the chassis; a processor electronically coupled to a plurality of sensors; and a tangible, non-transitory, machine readable medium storing instructions that when executed by the processor effectuates operations including: capturing, with a visual sensor, visual readings to objects within an environment of the robotic device as the robotic device moves within the environment; capturing, with an encoder sensor, readings of wheel rotation indicative of displacement of the robotic device; capturing, with an optoelectronic sensor, readings of a driving surface of the environment of the robotic device; capturing, with a depth sensor, distances to obstacles as the robot moves within the environment; determining, with the processor, displacement of the robotic device in two dimensions based on the optoelectronic sensor readings of the driving surface; determining, with the processor, a difference in displacement between the displacement determined based on the encoder sensor readings and the displacement determined based on the optoelectronic sensor readings of the driving surface, the difference in displacement being indicative of slippage; estimating, with the processor, a corrected position of the robotic device to replace a last known position of the robotic device, wherein: estimating a corrected position of the robotic device occurs if the processor loses or reduces knowledge of a current position of the robotic device in relation to a global frame of reference of the environment of the robotic device when the robotic device moves along a path from the last known position to a new intended position while performing work using the one or more tools; the processor creates or updates an ensemble of simulated positions of possible new locations of the robotic device wherein some elements of the ensemble are based on the readings of wheel rotation from the encoder sensor and the displacement readings determined from the optoelectronic sensor readings; determining, by the processor, a most feasible element in the ensemble based on the visual readings; and determining, by the processor, a most feasible position of the robotic device as the corrected position based on the most feasible element in the ensemble and the visual readings.

Provided is a tangible, non-transitory, machine readable medium storing instructions that when executed by a processor effectuates operations including: capturing, with a visual sensor, visual readings to objects within an environment of a robotic device as the robotic device moves within the environment; capturing, with an encoder sensor, readings of wheel rotation indicative of displacement of the robotic device; capturing, with an optoelectronic sensor, readings of a driving surface of the environment of the robotic device; capturing, with a depth sensor, distances to obstacles as the robot moves within the environment; determining, with the processor, displacement of the robotic device in two dimensions based on the optoelectronic sensor readings of the driving surface; determining, with the processor, a difference in displacement between the displacement determined based on the encoder sensor readings and the displacement determined based on the optoelectronic sensor readings of the driving surface, the difference in displacement being indicative of slippage; and estimating, with the processor, a corrected position of the robotic device to replace a last known position of the robotic device

BRIEF DESCRIPTION OF DRAWINGS

FIG. 6A illustrates an example of an initial phase space probability density of a robotic device, according to some embodiments.

FIGS. 6B-6D illustrates examples of the time evolution of the phase space probability density, according to some embodiments.

FIGS. 10A-10C illustrate an example of an evolution of a probability density reduced to the $q_1$, $q_2$ space at three different time points, according to some embodiments.

FIG. 14 illustrates an example of an updated probability density after observing floor type, according to some embodiments.

FIG. 16 illustrates an example of an updated probability density after observing Wi-Fi strength, according to some embodiments.

FIG. 15 illustrates an example of a Wi-Fi map, according to some embodiments.

FIG. 17 illustrates an example of a wall distance map, according to some embodiments.

FIGS. 26A-26E illustrate an example of evolution of a wave function in a position and momentum space with observed momentum, according to some embodiments.

FIGS. 27A-27E illustrate an example of evolution of a wave function in a position and momentum space with observed momentum, according to some embodiments.

FIGS. 33A, 33B, 34A-34H, and 35A-35F illustrate an example of a wave function of a state of a robotic device after observations, according to some embodiments.

FIG. 36 illustrates an example of an evolution of an ensemble, according to some embodiments.

DETAILED DESCRIPTION OF SOME EMBODIMENTS

Figure 1A:
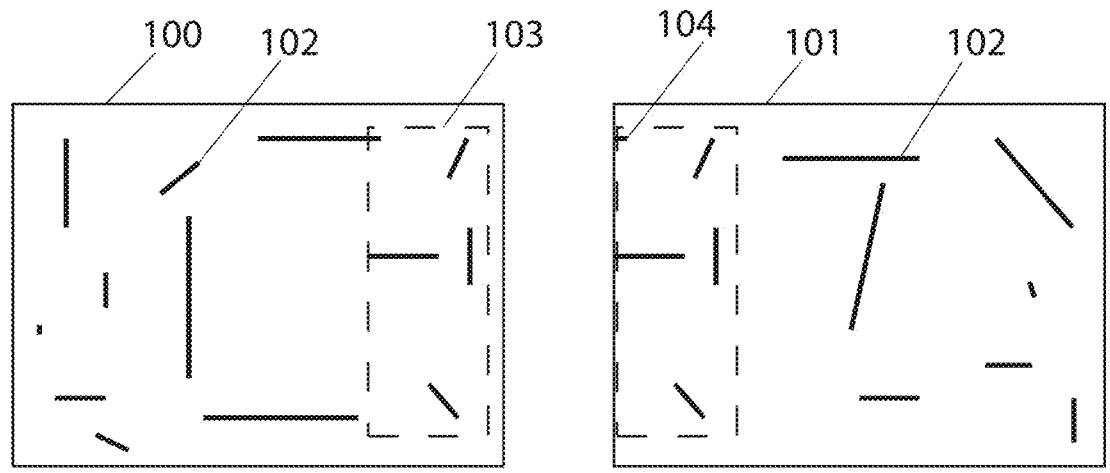
FIGS. 1A and 1B illustrate how an overlapping area is detected in some embodiments using raw pixel intensity data and the combination of data at overlapping points.

The present techniques will now be described in detail with reference to a few embodiments thereof as illustrated in the accompanying drawings. In the following description, numerous specific details are set forth in order to provide a thorough understanding. It will be apparent, however, to one skilled in the art, that the present techniques may be practiced without some or all of these specific details. In other instances, well known process steps and/or structures have not been described in detail in order to not unnecessarily obscure the present techniques. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

In some embodiments, a robotic device may include one or more autonomous or semi-autonomous robotic devices having communication, mobility, actuation and/or processing elements. In some embodiments, a robotic device includes a vehicle, such as a car or truck, with an electric motor. For example, the robotic device may include an electric vehicle with an electric motor. In some embodiments, a vehicle, such as a car or truck, with an electric motor includes a robot. For example, an electric vehicle with an electric motor may include a robotic device powered by an electric motor. In some embodiments, a robotic device may include, but is not limited to include, one or more of a casing, a chassis including a set of wheels, a motor to drive the wheels, a receiver that acquires signals transmitted from, for example, a transmitting beacon, a transmitter for transmitting signals, a processor, a memory, a controller, tactile sensors, obstacle sensors, imaging sensors, depth sensors, visual sensors, a mapping and localization system, network or wireless communications, radio frequency communications, power management such as a rechargeable battery, one or more clock or synchronizing devices. The processor may, for example, receive and process data from internal or external sensors, execute commands based on data received, control motors such as wheel motors, map the environment, localize the robot, divide the environment into two or more zones, and determine movement paths. In some embodiments, at least a portion of the sensors of the robotic device are provided in a sensor array, wherein the at least a portion of sensors are coupled to a flexible, semi-flexible, or rigid frame. In some embodiments, the frame is fixed to a chassis or casing of the robotic device. In some embodiments, the sensors are positioned along the frame such that the field of view of the robot is maximized while the cross-talk or interference between sensors is minimized. In some cases, a component may be placed between adjacent sensors to minimize cross-talk or interference.

In some embodiments, the wheels of the robotic device include a wheel suspension system. An example of a dual wheel suspension system is described in U.S. patent application Ser. Nos. 15/951,096 and 16/270,489, the entire contents of which are hereby incorporated by reference. Another example of a wheel suspension system that may be used is described in U.S. patent application Ser. No. 16/389,797, the entire contents of which is hereby incorporated by reference. In some embodiments, the different wheel suspension systems may be used independently or in combination.

In some embodiments, the robotic device includes two wheels. To turn clockwise, the right wheel rotates in reverse direction at a negative velocity and the left wheel rotates in a forward direction at a positive velocity. To move forward, both wheels rotate in a forward direction at a positive velocity. In some embodiments, the wheels rotate in such a manner to allow for diagonal motion. In some embodiments, the wheels are mecanum wheels allowing for motion in all directions. In some embodiments, the robotic device includes four mecanum wheels. In some embodiments, rollers of the mecanum wheels are oriented at 45 degrees relative to a horizontal axis towards the right. To move leftwards, given the rollers are oriented at 45 degrees, the front right wheel and back left wheel rotate in a forward direction at a positive velocity and the front left wheel and back right wheel rotate in a reverse direction at a negative velocity, wherein the positive and negative velocity are of equal magnitude. To move rightwards, the opposite applies for each of the four mecanum wheels. To rotate in a counter-clockwise direction both right wheels rotate in a forward direction at a positive velocity and both lefts wheels rotate in a reverse direction at a negative velocity, wherein the positive and negative velocity are equal in magnitude. To rotate in a clockwise direction, the opposite applies.

In some embodiments, the wheels of the robotic device are also expandable wheels, as described in U.S. patent application Ser. Nos. 15/444,966 and 15/447,623, the entire contents of which are hereby incorporated by reference. In some embodiments, the expandable wheels are mecanum wheels. In some embodiments, the expandable wheel includes an outer housing with a plurality of apertures therein, an inner shaft co-centered and positioned within an outer shaft coupled to the outer housing, a plurality of spokes mounted pivotally by a first end to the inner shaft, a pivoting linkage connected to a second end of the spoke, and a roller mounted at the distal end of the pivoting linkage so as to be rotatable around an axial of the roller. The inner shaft is positioned within the outer housing in a manner such that it can rotate independently and relative to the outer housing and coupled outer shaft. The inner shaft can be rotated relative to the outer housing and coupled outer shaft, causing the wheel to move from a first position in which the linkages and rollers protrude minimally through their corresponding apertures to a second position in which the linkages and rollers protrude maximally through their corresponding apertures. The rollers form the circumference of the wheel, which is smallest in the fully contracted position and largest in the fully expanded position. The outer shaft coupled to the outer housing can rotate independently and relative to the inner shaft to rotate the expandable mecanum wheel once positioned at a desired circumference, causing the robot to move. When the inner shaft is caused to rotate relative to the outer shaft and housing, the spokes together with the pivoting linkages work as a crank mechanism and translate the relative rotation of the inner shaft to a linear movement of the roller radially outward from the center of the wheel, the aperture working as a guide. Expansion of the wheels increases the distance of the robotic device from the floor and thus facilitates movement across different surfaces and obstacles. In some embodiments, a sleeve is provided around the apertures to limit the wear of the link member and to provide better support for the link member as a guide.

In some embodiments, the wheel includes a means for rotating the inner shaft and the outer shaft of the expandable wheel. In some embodiments, separate motors are used to rotate the inner shaft and the outer shaft. In some embodiments, a single means for rotation of the inner shaft and outer shaft may be used. In some embodiments, means for rotation of inner shaft and/or outer shaft may be electrical (e.g., electrical motor) or mechanical (e.g., expansion and retraction of the wheel using a crank). Rotation of the inner shaft increases or decreases the circumference of the wheel by extension and retraction of the rollers. Rotation of the outer shaft rotates the expandable mecanum wheel, causing the robot to move.

In some embodiments, the processor of the robot determines when the mecanum wheels should be expanded or retracted based on sensor data collected by one or more sensors. For example, data of a sensor monitoring tension on the wheels may be used to determine when to expand the wheel, when, for example, more than a predetermined amount of tension is detected. Similarly, data of a sensor monitoring rate of rotation of a wheel may be used to determine when to expand the wheel, when, for example, it is determined that rotation is not concurrent with motor power. In another example, obstacle sensor data may be used to determine when to expand a wheel, when, for example, a large obstacle is detected requiring expanded wheels to overcome the obstacle by driving over the obstacle with the wheel or by increasing the clearance between the robot chassis and the driving surface such that the obstacle may fit beneath the robot. In some embodiments, the processor may expand and retract the wheel to loosen an object that may have become entangled with the wheel. In some embodiments, the processor detects entanglement of an object with the wheel based on increased tension on the wheel. In some embodiments, increased tension indicates that the robot is stuck or that the wheel is entangled with an object.

In some embodiments, one or more wheels of the robotic device are driven by one or more electric motors. For example, a wheel may include a main wheel gear that may be driven by one or more output gears of one or more corresponding electric motors interfacing with the wheel gear. The processor of the robotic device may autonomously activate each of the one or more output gears independently of one another depending on the amount of torque required. For example, the processor may detect an obstacle on the driving surface and may activate all electric motors of the output gears as a large amount of torque may be required to overcome the obstacle. Output gears may rotate when deactivated. In other embodiments, any number of output gears interfacing with the wheel gear may be used. In some embodiments, a brushless DC wheel motor may be positioned within a wheel of the robotic device. For example, the wheel with motor may include a rotor with magnets, a bearing, a stator with coil sets, an axle and tire each attached to rotor. Each coil set may include three separate coils, the three separate coils within each coil set being every third coil. The rotor acts as a permanent magnet. DC current is applied to a first set of coils causing the coils to energize and become an electromagnet. Due to the force interaction between the permanent magnet (i.e., the rotor) and the electromagnet (i.e., the first set of coils of the stator), the opposite poles of the rotor and stator are attracted to each other, causing the rotor to rotate towards the first set of coils. As the opposite poles of the rotor approach the first set of coils, the second set of coils are energized and so on, and so forth, causing the rotor to continuously rotate due to the magnetic attraction. Once the rotor is about to reach the first coil set a second time, the first coil set is energized again but with opposite polarity as the rotor has rotated 180 degrees. In some embodiments, two set of coils are energized simultaneously to increase the torque. In some embodiments, the processor uses data of a wheel sensor (e.g., halls effect sensor) to determine the position of the rotor, and based on the position determines which pairs of coils to energize.

In some embodiments, the processor of the robotic device uses data from various sensors, such as cameras, LIDAR, and other depth sensing devices (or depth perceiving devices), to generate a map of the surroundings. In some embodiments, a camera captures spatial data while the robotic device moves within the surroundings. In some embodiments, the robotic device moves back and forth across the environment in straight lines, such as in a boustrophedon pattern. In some embodiments, the camera captures spatial data while the robotic device rotates 360 degrees. In some embodiments, spatial data of the surroundings are captured continuously as the robotic device moves around the surroundings or rotates in one or more different positions in the surroundings. In some embodiments, the camera captures objects within a first field of view. In some embodiments, the image captured is a depth image, the depth image being any image containing data which may be related to the distance from the camera to objects captured in the image (e.g., pixel brightness, intensity, and color, time for light to reflect and return back to sensor, depth vector, etc.). In some embodiments, depth to objects within the surroundings is measured using a depth measurement device, such as those described in Ser. No. 15/447,122, 16/393,921, 15/243,783, 15/954,335, 15/954,410, 15/257,798, 15/674,310, 15/224,442, and 15/683,255, the entire contents of which are hereby incorporated by reference. In one embodiment, the camera measures vectors from the camera to objects in the surroundings and the processor calculates the L2 norm of the vectors using $\|x\|_p = (\Sigma_i |x_i|^P)^{1/P}$ with P=2 to estimate depths to objects. In some embodiments, the camera rotates to observe a second field of view partly overlapping the first field of view and captures a depth image of objects within the second field of view (e.g., differing from the first field of view due to a difference in camera pose). In some embodiments, the processor compares the depth readings for the second field of view to those of the first field of view and identifies an area of overlap when a number of consecutive readings from the first and second fields of view are similar. The area of overlap between two consecutive fields of view correlates with the angular movement of the camera (relative to a static frame of reference of a room, for example) from one field of view to the next field of view. By ensuring the frame rate of the camera is fast enough to capture more than one frame of readings in the time it takes the camera to rotate the width of the frame, there is always overlap between the readings taken within two consecutive fields of view. The amount of overlap between frames may vary depending on the angular (and in some cases, linear) displacement of the camera, where a larger area of overlap is expected to provide data by which some of the present techniques generate a more accurate segment of the map relative to operations on data with less overlap. In some embodiments, the processor infers the angular disposition of the Robotic device from the size of the area of overlap and uses the angular disposition to adjust odometer information to overcome the inherent noise of an odometer.

Prior to measuring vectors from the camera to objects within each new field of view and estimating depths, the processor may adjust previous readings to account for the measured movement of the robotic device as it moves from observing one field of view to the next (e.g., differing from one another due to a difference in camera pose). This adjustment accounts for the movement of the coordinate system observed by the camera with respect to a stationary coordinate system that may or may not coincide with the first field of view of the camera. In instances wherein the camera and robotic device move as a single unit, the observed coordinate system of the camera moves with respect to the stationary coordinate system as the robotic device moves. In some embodiments, a movement measuring device such as an odometer, gyroscope, optical flow sensor, etc. measures the movement of the robotic device and hence the camera (assuming the two move as a single unit) as the camera moves to observe new fields of view with corresponding new observed coordinate systems. In some embodiments, the processor stores the movement data in a movement vector and transforms all perimeter and object coordinates to correspond to, for example, the initial coordinate system observed by the camera coinciding with the stationary coordinate system. For example, in an embodiment wherein C is a stationary Cartesian coordinate system, C0 may be the observed coordinate system of the camera fixed to the robotic device at time t0 with state S and coinciding with stationary coordinate system C. The robotic device with attached camera displaces and the camera observes coordinate system C1 at time t1 with state S'. A movement measuring device measures the movement vector V with values (x, y, theta) and the processor uses the movement vector V to transform coordinates observed in coordinate system C1 to corresponding coordinates in coordinate system C0, coinciding with static coordinate system C. The movement vector V allows all coordinates corresponding to different coordinate systems to be transformed to a single coordinate system, such as the static coordinate system C, thereby allowing the entire perimeter to correspond to a single coordinate system. Some embodiments of the present techniques reduce a non-trivial problem to simple addition of vectors. Embodiments of this approach may be a lossy compression of the state world; but, by adjusting resolutions and creatively using mathematical estimations, acceptable results may be achieved for most home environments. With a holistic, stationary, or global coordinate system in which the camera of the robotic device observes a local coordinate system, a function that relates the local observations of the camera to the stationary or global observation may be created. A challenge may be estimating a reliable function that can provide high accuracy. For example, accounting for scenarios wherein the surface on which the robotic device operates is unlevelled whereby the odometer may measure a depth greater or smaller than the true 2D displacement. Methods for eradicating such issues have been suggested in U.S. patent application Ser. No. 15/683,255, the entire contents of which are hereby incorporated by reference, whereby the processor monitors declining depth measurements as a depth measurement device of the robotic device moves towards a stationary object. If the steady decline of measurements is interrupted by a predetermined number of measurements that are a predetermined percentage greater than the measurements immediately before and after the interruption, the processor discards the interrupting measurements.

In some embodiments, the processor identifies (e.g., determines) an area of overlap between two fields of view when (e.g., during evaluation a plurality of candidate overlaps) a number of consecutive (e.g., adjacent in pixel space) readings from the first and second fields of view are equal or close in value. Although the value of overlapping readings from the first and second fields of view may not be exactly the same, readings with similar values, to within a tolerance range of one another, can be identified (e.g., determined to correspond based on similarity of the values). Furthermore, identifying matching patterns in the value of readings captured within the first and second fields of view may also be used in identifying the area of overlap. For example, a sudden increase then decrease in the readings values observed in both depth images may be used to identify the area of overlap. Other patterns, such as increasing values followed by constant values or constant values followed by decreasing values or any other pattern in the values of the readings, can also be used to estimate the area of overlap. A Jacobian and Hessian matrix may be used to identify such similarities. In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric, such as the Szymkiewicz-Simpson coefficient, may be used to indicate how good of an overlap there is between the two sets of readings. Or some embodiments may determine an overlap with a convolution. Some embodiments may implement a kernel function that determines an aggregate measure of differences (e.g., a root mean square value) between some or all of a collection of adjacent readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied. In some embodiments, the processor determines the area of overlap based on translation and rotation of the camera between consecutive frames measured by an inertial measurement unit (IMU). In some embodiments, the translation and rotation of the camera between frames is measured by two separate movement measurement devices (e.g., optical encoder and gyroscope of the robotic device) and the movement of the robotic device is the average of the measurements from the two separate devices. In some embodiments, the data from one movement measurement device is the movement data used and the data from the second movement measurement device is used to confirm the data of the first movement measurement device. In some embodiments, the processor uses movement of the camera between consecutive frames to validate the area of overlap identified between readings. Or, in some embodiments, comparison between the values of readings is used to validate the area of overlap determined based on measured movement of the camera between consecutive frames.

Figure 1B:
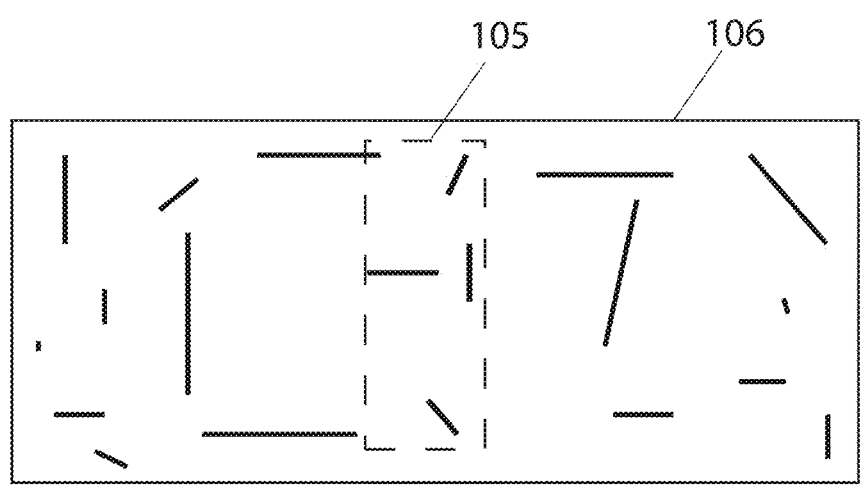

FIGS. 1A and 1B illustrate an example of identifying an area of overlap using raw pixel intensity data and the combination of data at overlapping points. In FIG. 1A, the overlapping area between overlapping image 100 captured in a first field of view and image 101 captured in a second field of view may be determined by comparing pixel intensity values of each captured image (or transformation thereof, such as the output of a pipeline that includes normalizing pixel intensities, applying Gaussian blur to reduce the effect of noise, detecting edges in the blurred output (such as Canny or Haar edge detection), and thresholding the output of edge detection algorithms to produce a bitmap like that shown) and identifying matching patterns in the pixel intensity values of the two images, for instance by executing the above-described operations by which some embodiments determine an overlap with a convolution. Lines 102 represent pixels with high pixel intensity value (such as those above a certain threshold) in each image. Area 103 of image 100 and area 104 of image 101 capture the same area of the environment and, as such, the same pattern for pixel intensity values is sensed in area 103 of image 100 and area 104 of image 101. After identifying matching patterns in pixel intensity values in image 100 and 101, an overlapping area between both images may be determined. In FIG. 1B, the images are combined at overlapping area 105 to form a larger image 106 of the environment. In some cases, data corresponding to the images may be combined. For instance, depth values may be aligned based on alignment determined with the image.

Figure 2A:
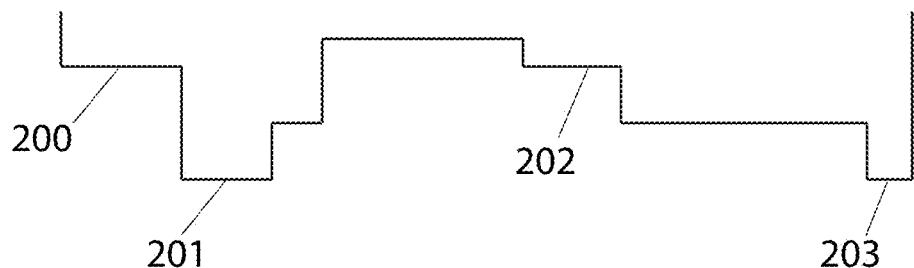
FIGS. 2A-2C illustrate how an overlapping area is detected in some embodiments using raw pixel intensity data and the combination of data at overlapping points.
Figure 2B:
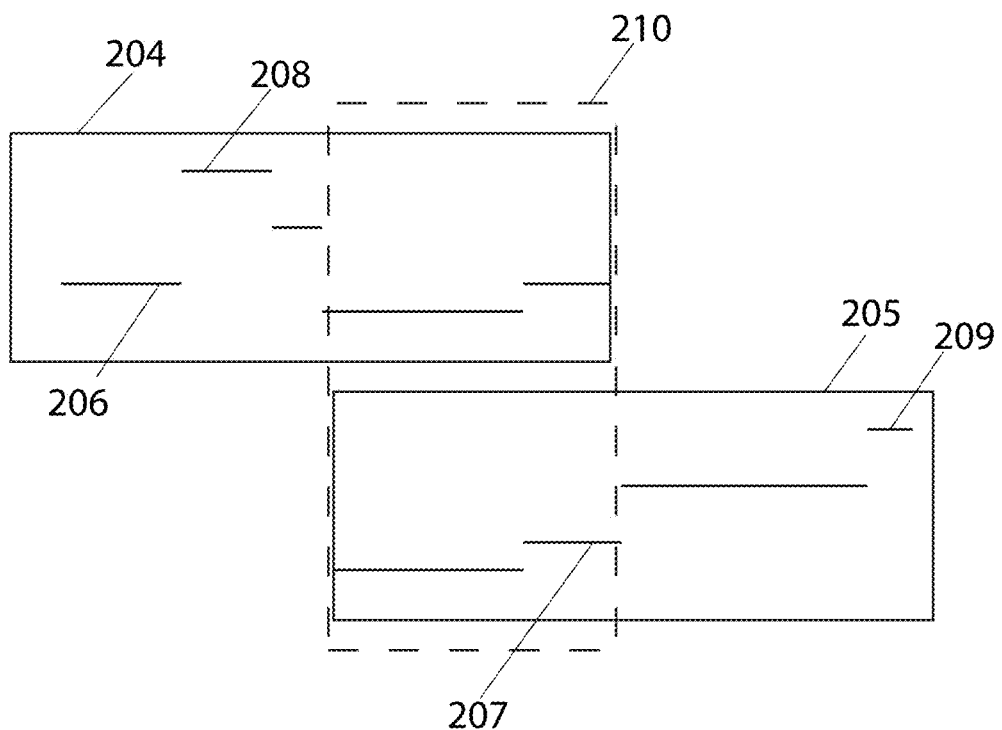
Figure 2C:
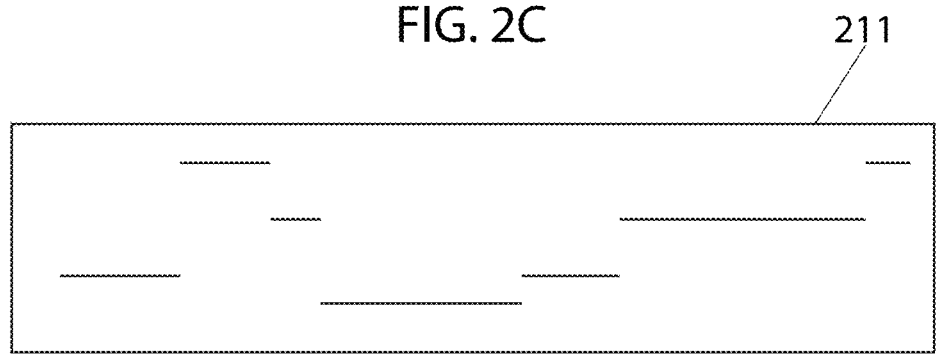

FIGS. 2A-2C illustrate another example of identifying an area of overlap using raw pixel intensity data and the combination of data at overlapping points. FIG. 2A illustrates a top (plan) view of an object, such as a wall, with uneven surfaces wherein, for example, surface 200 is further away from an observer than surface 201 or surface 202 is further away from an observer than surface 203. In some embodiments, at least one infrared line laser positioned at a downward angle relative to a horizontal plane coupled with at least one camera may be used to determine the depth of multiple points across the uneven surfaces from captured images of the line laser projected onto the uneven surfaces of the object. Since the line laser is positioned at a downward angle, the position of the line laser in the captured image will appear higher for closer surfaces and will appear lower for further surfaces. Similar approaches may be applied with lasers offset from a camera in the horizontal plane. The position of the laser line (or feature of a structured light pattern) in the image may be detected by finding pixels with intensity above a threshold. The position of the line laser in the captured image may be related to a distance from the surface upon which the line laser is projected. In FIG. 2B, captured images 204 and 205 of the laser line projected onto the object surface for two different fields of view are shown. Projected laser lines with lower position, such as laser lines 206 and 207 in images 204 and 205 respectively, correspond to object surfaces 200 and 202, respectively, further away from the infrared illuminator and camera. Projected laser lines with higher position, such as laser lines 208 and 209 in images 204 and 205 respectively, correspond to object surfaces 201 and 203, respectively, closer to the infrared illuminator and camera. Captured images 204 and 205 from two different fields of view may be combined into a larger image of the environment by finding an overlapping area between the two images and stitching them together at overlapping points. The overlapping area may be found by identifying similar arrangement of pixel intensities in both images, wherein pixels with high intensity may be the laser line. For example, areas of images 204 and 205 bound within dashed lines 210 have similar arrangement of pixel intensities as both images captured a same portion of the object within their field of view. Therefore, images 204 and 205 may be combined at overlapping points to construct larger image 211 of the environment shown in FIG. 2C. The position of the laser lines in image 211, indicated by pixels with intensity value above a threshold intensity, may also be used to infer depth of surfaces of objects from the infrared illuminator and camera (see, U.S. patent application Ser. No. 15/674,310, the entire contents of which is hereby incorporated by reference).

In some embodiments, the area of overlap between readings taken within the two field of views is estimated based on the measured movement of the robotic device and is used as a method of verifying the identified area of overlap. In some embodiments, measured movement may be used as the primary method of identifying the area of overlap. In some embodiments, devices such as an odometer, gyroscope, and optical flow sensor may be used to measure movement. For example, the angular displacement provided by an odometer and gyroscope and/or the mathematical convolution of the two may be used to estimate the area of overlap. In some embodiments, the readings from the odometer, gyroscope and optical sensor may be combined to produce more accurate readings, e.g., with data fusion techniques and a Kalman filter. Gyroscopes and odometers provide similar readings (e.g., in vector form indicating magnitude of distance and direction). However, since each measurement device is subject to a different type of noise and different errors, combining readings from both measurement devices through a mathematical process can produce more accurate readings. In some embodiments, the robotic device may have more than one movement measuring device in order to measure movement between each time step or fields of view observed. For example, the robotic device may have gyroscopes and odometers that simultaneously provide redundant information. In many implementations, only one set of information is used by the processor of the robotic device while the other is discarded. In other implementations, the processor combines the two readings by, for example, using a moving average (or some other measure of central tendency may be applied, like a median or mode) or a more complex method. Due to measurement noise, the type of measurement device used, etc. discrepancies between the measurements by a first device and a second device may exist and may not be the exact same. In such cases, the processor calculates movement of the robotic device by combining the measurements from the first and second device, or selects measurements from one device as more accurate than the others. For example, the processor may combine measurements from the first device and the second device (or measurements from more devices, like more than three, more than five, or more than 10) using a moving average (or some other measure of central tendency may be applied, like a median or mode). The processor may also use minimum sum of errors to adjust and calculate movement of the robotic device to compensate for the lack of precision between the measurements from the first and second device. By way of further example, the processor may use minimum mean squared error to provide a more precise estimate of the movement of the robotic device. The processor may also use other mathematical methods to further process measured movement of the robotic device by the first and second device, such as split and merge algorithm, incremental algorithm, Hough Transform, line regression, Random Sample Consensus, Expectation-Maximization algorithm, or curve fitting, for example, to estimate more realistic movement of the robotic device. In another embodiment, the processor may use the k-nearest neighbors algorithm where each movement measurement is calculated as the average of its k-nearest neighbors.

Due to measurement noise, discrepancies between the value of readings within the area of overlap from the first field of view and the second field of view may exist and the values of the overlapping readings may not be the exact same. In such cases, new readings may be calculated, or some of the readings may be selected as more accurate than others. For example, the overlapping readings from the first field of view and the second field of view (or more fields of view where more images overlap, like more than three, more than five, or more than 10) may be combined using a moving average (or some other measure of central tendency may be applied, like a median or mode) and adopted as the new readings for the area of overlap. The minimum sum of errors may also be used to adjust and calculate new readings for the overlapping area to compensate for the lack of precision between overlapping readings perceived within the first and second fields of view. By way of further example, the minimum mean squared error may be used to provide a more precise estimate of readings within the overlapping area. Other mathematical methods may also be used to further process the readings within the area of overlap, such as split and merge algorithm, incremental algorithm, Hough Transform, line regression, Random Sample Consensus, Expectation-Maximization algorithm, or curve fitting, for example, to estimate more realistic readings given the overlapping readings perceived within the first and second fields of view. The calculated readings are used as the new readings for the overlapping area. In another embodiment, the k-nearest neighbors algorithm can be used where each new reading is calculated as the average of the values of its k-nearest neighbors. Some embodiments may implement DB-SCAN on readings and related values like pixel intensity, e.g., in a vector space that includes both depths and pixel intensities corresponding to those depths, to determine a plurality of clusters, each corresponding to readings of the same feature of an object. In some embodiments, a first set of readings is fixed and used as a reference while the second set of readings, overlapping with the first set of readings, is transformed to match the fixed reference. In some embodiments, the processor expands the area of overlap to include a number of readings immediately before and after (or spatially adjacent) readings within the identified area of overlap.

Structure of data used in inferring readings may have various forms. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the environment. For ease of visualization, data from which depth is inferred may be converted and reported in the format of millimeters or inches of depth; however, this is not a requirement, which is not to suggest that other described features are required. For example, pixel intensities from which depth may be inferred may be converted into meters of depth for ease of visualization, or they may be used directly given that the relation between pixel intensity and depth is known. To reduce computational expense, the extra step of converting data from which depth may be inferred into a specific format can be eliminated, which is not to suggest that any other feature here may not also be omitted in some embodiments. It is noted that each step taken in the process of transforming raw readings into a depth value in millimeters or inches is a loss and computationally expensive compression and further reduces the state space in each step when digitizing each quality. In order to reduce the loss and computational expenses, it is desired and useful to omit intermediary steps if the goal can be accomplished without them. Based on information theory principal, it is beneficial to increase content for a given number of bits. For example, reporting depth in specific formats, such as metric units, is only necessary for human visualization. In implementation, such steps can be avoided to save computational expense and loss of information. The amount of compression and the amount of information captured and processed is a trade-off, which a person of ordinary skill in the art can balance to get the desired result with the benefit of this disclosure. Depths may be perceived (e.g., measured or otherwise inferred) in any form and be reported in any format. The methods of perceiving or otherwise inferring depths and the formats of reporting depths used herein are for illustrative purposes and are not intended to limit the invention, again which is not to suggest that other descriptions are limiting.

In some embodiments, two classes of sensors are used, one acting as a predictor and the other confirming perimeter points of a work space. The predictor sensor predicts a specific coordinate as a perimeter point. The second set of sensors may either confirm or refute the prediction. For example, a predicted coordinate is proven to be false if the second set of sensors detects the robotic device occupying the area within which the coordinate is found. If the second set of sensors detects that coordinate is within an area the robotic device cannot access, the prediction is found true. In some embodiments, this is implemented with a low range sensor array. The second set of sensors may be, but is not limited to, a low range IR sensor, a distance sensor, a tactile sensor, a bumper sensor, or other types of sensors.

The processor of the robotic device may use the map of the environment to autonomously navigate the environment during operation. In some embodiments, the map (e.g., mapped, e.g., in vector or bitmap form) is stored in memory for future use. Storage of the map may be in temporary memory such that a map is only available during an operational session or in more permanent forms of memory such that the map is available at the next session or startup. In some embodiments, the map is further processed to identify rooms and other segments. In some embodiments, a new map is constructed at each use. In some embodiments, the map may be externally stored on another device such as the docking station or other base station of the robotic device or in the cloud (e.g., in memory of a server at a remote data center) or other remote storage device.

Figure 3A:
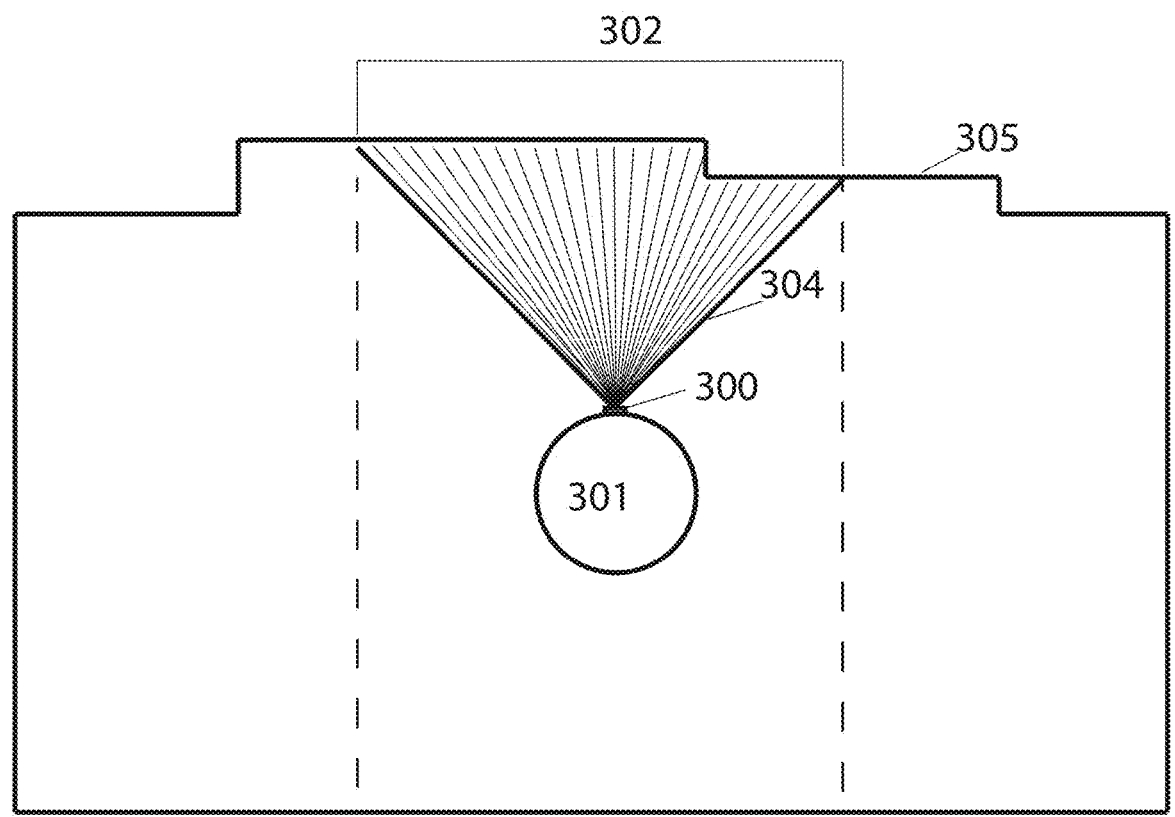
FIGS. 3A and 3B illustrate a camera taking distance measurements of an enclosure within a first range of sight and resulting segment of a 2D boundary of the enclosure in some embodiments.
Figure 3B:
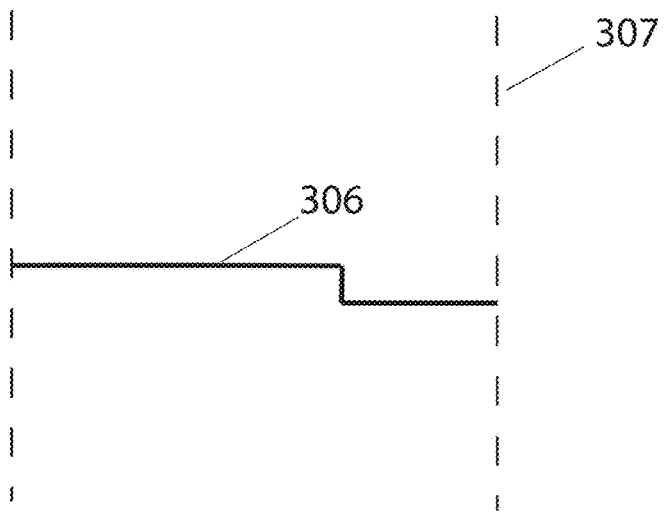

FIG. 3A illustrates an embodiment consistent with the above mapping techniques wherein camera 300 mounted on robotic device 301 is measuring distances 302 within first field of view (i.e. field of view) 304. Distance measurements 302 taken by camera 300 measure the distance from camera 300 to object 305, which in this case is a wall. FIG. 3B illustrates 2D perimeters segment 306 resulting from plotted distance measurements 302 taken within first field of view 304. Dashed lines 307 demonstrates that resulting 2D perimeter segment 304 corresponds to distance measurements 302 taken within field of view 304. In some embodiments, 3D distance measurements are taken and plotted to construct 2D or 3D perimeter segments of the map.

Figure 4A:
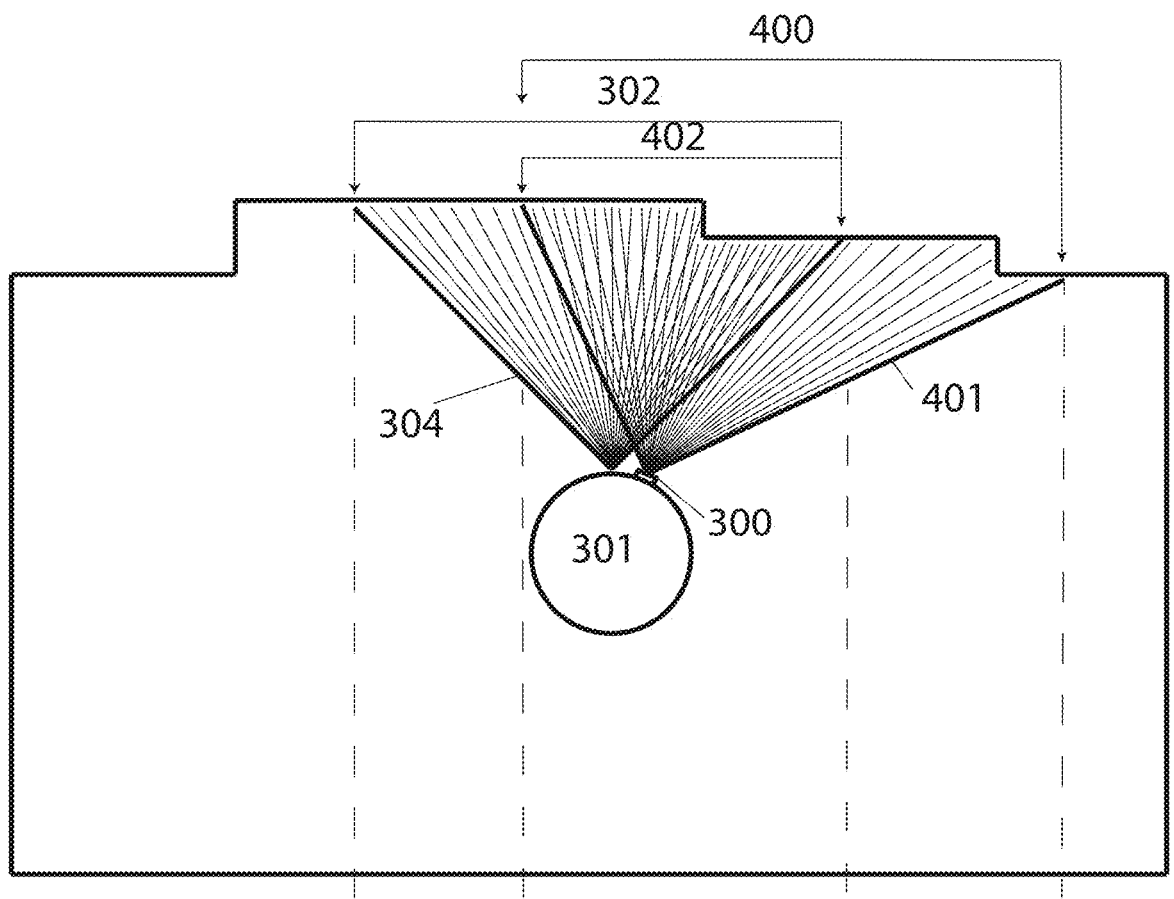
FIGS. 4A and 4B illustrate how a segment of a 2D boundary of an enclosure is constructed from distance measurements taken within successively overlapping range of sight in some embodiments.

FIG. 4A illustrates camera 300 mounted on robotic device 301 measuring distances 400 within second field of view 401 partly overlapping distance measurements 302 within first field of view 304. After distance measurements 302 within first field of view 304 are taken, robotic device 301 with mounted camera 300 moves to observe overlapping second field of view 401 and take distance measurements 400. As robotic device 301 moves to observe second field of view 401, the values of distance measurements 302 taken within first field of view 304 are adjusted to account for the movement of robotic device 301. Distance measurements 402 represent the area of overlap between distance measurements 302 taken within field of view 304 and distance measurements 400 taken within field of view 401.

Figure 4B:
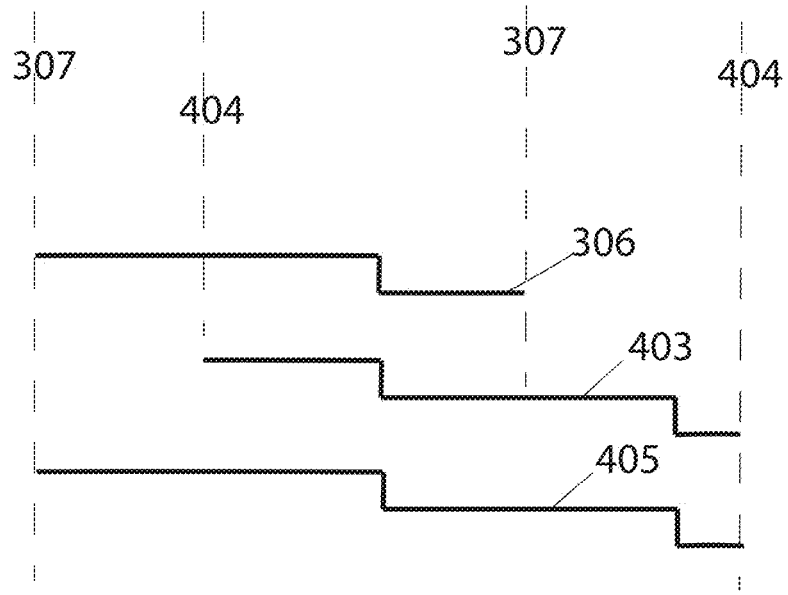

FIG. 4B illustrates 2D perimeters segments 306 and 403 resulting from distance measurements 302 and 400, respectively. While shown aligned, the processor may receive the data in a format in which each segment is in a distinct coordinate system, e.g., each in pixel coordinates of a different image. Segments 306 and 403 are bounded by dashed lines 307 and 404, respectively. 2D perimeters segment 405 constructed from the combination of 2D perimeters segments 306 and 403 and bounded by the outermost dashed lines of 307 and 404 is also illustrated. Distance measurements 400 captured within second field of view 401 are compared to distance measurements 302 captured within first field of view 304 to identify the area of overlap bounded by the innermost dashed lines of 404 and 307. The processor of the robotic device may compare measurements and determine the area of overlap using the methods described above. 2D perimeters segment 306 from distance measurements taken within first field of view 304 and 2D perimeters segment 403 from distance measurements taken within second field of view 401 may be combined at the area of overlap to construct larger 2D perimeters segment 405. When the values of overlapping distance measurements from field of view 304 and 401 within the area of overlap are slightly different, an analytical method, such as a data or sensor fusion algorithm, averaging, minimum sum of errors, or any other suitable method as described above is used to calculate a single distance value for each pair of overlapping distance measurements that can result in a more accurate ground truth as compared to the distance measurements initially taken. In some embodiments, this method is repeated such that distance measurements captured within successively overlapping field of views may be combined to construct the perimeters of the entire map.

Figure 5:
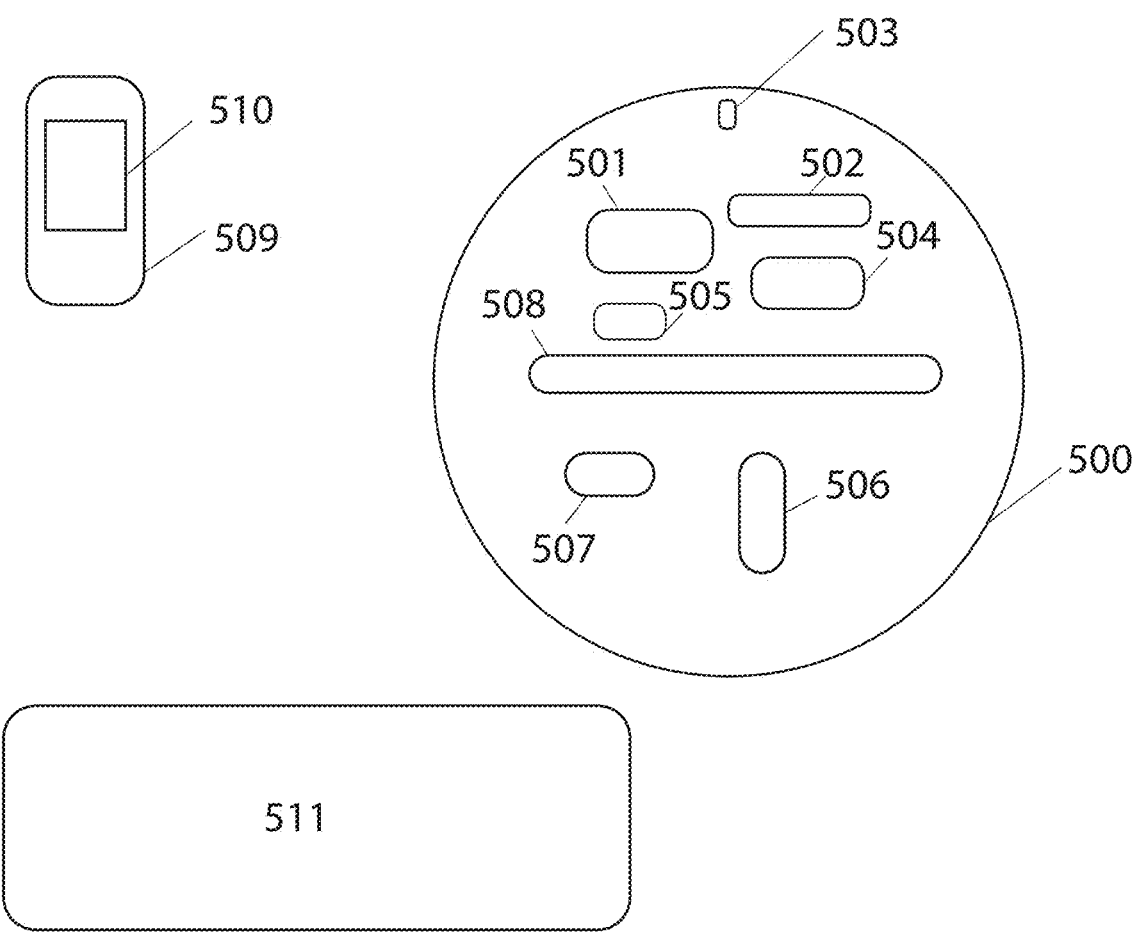
FIG. 5 is a schematic diagram of an example of a robot with which the present techniques may be implemented in some embodiments.

FIG. 5 depicts an example of a robotic device 500 with processor 501, memory 502, a first set of sensors 503, second set of sensors 504, network communication 505, movement driver 506, signal transmitter/receiver 507, and a tool 508 for performing work. The first and second set of sensors 503 and 504 may include depth measuring devices, movement measuring devices, and the like. In some embodiments, the tool may be various different objects depending on the type of robotic device. For example, the tool may be an impeller and brush for a robotic vacuum, a fluid dispersion mechanism and mopping pad for a robotic mop, a blade for a robotic lawn mower, a shovel for a robotic snow plough, a salt distributer for a salt distributing robot, a plough for a robotic tractor, a passenger pod for a robotic taxi, etc. In some embodiments, the robotic device may include the features of a robotic device described herein. The shape of the illustrated features is not meant to imply that the robotic device has a round shape or that any feature has any particular shape. In some embodiments, program code stored in the memory 502 and executed by the processor 501 may effectuate the operations described herein. Some embodiments additionally include user communication device 509 having a touchscreen 510 with a software application coupled to the robotic device 500, such as that described in U.S. patent application Ser. Nos. 15/272,752, 15/949,708, and 16/277,991, the entire contents of which is hereby incorporated by reference. For example, the application may be used to provide instructions to the robotic device, such as days and times to execute particular functions and which areas to execute particular functions within. In some embodiments, the application may be used to choose settings such as cleaning power settings, fluid dispersion settings, and the number of passes the robotic device makes during coverage for different areas. In some embodiments, the application may be used to choose performing different functions in one or more zones. In some embodiments, the functions are performed by the same robotic device or by different robotic devices. For example, the application may be used to choose vacuuming in particular areas and mopping in particular areas. In some embodiments, the application may be used to choose performing a second type of function after completing a first type of function. For example, mopping after vacuuming. In some embodiments, a first robotic device executes the first type of function and a second robotic device executes the second type of function. In some embodiments, the first robotic device completes the first type of function then notifies the second robotic device such that it may begin executing the second type of function. In some embodiments, the second robotic device begins executing the second type of function before the first robotic device is finished executing the first type of function. In some embodiments, the second robotic device begins executing the second type of function within areas already covered by the first robotic device or areas that the first robotic device is not required to operate within. In some embodiments, the second robotic device follows behind the first robotic device along the same path while each robotic device executes their respective function. In some embodiments, the robotic devices share their intelligence with one another. In some embodiments, some robotic devices are configured to only receive intelligence. In some embodiments, some robotic devices are only configured to transmit intelligence. In some embodiments, each robotic device creates their own map and localizes independently and in other instances, robotic devices share a common map and localization. In some embodiments, robotic devices collaborate using methods such as those described in U.S. patent application Ser. Nos. 15/048,827, 15/981,643, 15/986,670, 16/130,880, and 14/948,620, the entire contents of which are hereby incorporated by reference. In some embodiments, the application displays a status of the robotic device such as charging or cleaning (e.g., vacuuming or mopping or steam cleaning). In some embodiments, the application pairs with a smart home device or a similar other type of device and the smart home device may be used to control an action of the robotic device based on received voice command from a user. In some cases, the application provides history of work sessions such as total area covered, total hours of operation, total charging time, etc. In some cases, the application may be used to instruct the robotic device to empty its bin and may display a bin fill level. In other cases, the application may be used by a user to modify the map of the environment by, for example, adding, deleting, and adjusting perimeters and obstacles, creating virtual barriers, and creating subareas within the map. In another example, the application may transmit self-test information (e.g., from diagnostic testing the processor of the robotic device executes autonomously to identify errors or malfunctions) directly to human customer support or to the cloud for an artificial intelligence (AI) system to analyze. In some cases, the AI system may determine a solution and transmit the solution to the application or the processor of the robotic device. In other cases, the AI system may determine that human customer support is required and transmit the self-test information to human customer support for further analysis. In some cases, the customer service representative may communicate with a user using the application or other form of communication. Further, minimal explanation may be required by the user as the customer service representative may be in possession of self-test information and logs recorded by the processor which may be used in finding the root source of the error or malfunction. In some cases, the AI system or customer service representative sends a shipping label to the user that may be used in sending the robotic device for repair. In some cases, the AI system or customer service representative sends. In some cases, the AI system analyzes self-test information autonomously in the background and sends a spare to the user in anticipation of the robotic device requiring the spare part. For example, the AI system detects that a filter requires replacement earlier than expected and sends a new filter to a home of the user. In some cases, the processor of the robotic device transmits the self-test information directly to human customer service or the cloud for the AI system to retrieve. In some cases, the application may be used to choose when and which self-tests to execute. In some embodiments, the application notifies the user of an error and provides instructions on how to repair the error.

While the examples and illustrations provided apply the some of the present techniques to the construction of a 2D perimeters using 2D distance measurements, the 2D perimeters may be constructed using 3D distance measurements as well. Furthermore, embodiments may construct 3D perimeters of the map using 3D distance measurements. The 3D perimeters of the map may be plotted using at least one camera, such as a distance measuring camera, capable of taking 3D distance measurements. 3D distance measurements taken within overlapping field of views may be combined at identified areas of overlap where overlapping distance measurements are used as the attachment points. In some embodiments, a 2D perimeters can be extracted from the plotted 3D perimeters.

The resulting plot of the perimeters may be encoded in various forms. For instance, some embodiments may construct a point cloud of three dimensional points by transforming vectors into a vector space with a shared origin, e.g., based on the above-described vectors, in some cases displacement vectors may be used and refined based on measured depths. Some embodiments may represent maps with a set of polygons that model detected surfaces, e.g., by calculating a convex hull over measured vectors within a threshold area, like a tiling polygon. Polygons are expected to afford faster interrogation of maps during navigation and consume less memory than point clouds at the expense of greater computational load when plotting.

In some embodiments, the field of view of the sensor may be limited. In such cases, there may not be overlap between measurements captured in consecutive field of views as the robot rotates 360 degrees to scan the environment or executes other movements within the environment. In some embodiments, the robotic device includes a camera oriented towards the ceiling. The camera captures images of features and the processor monitors how the image of the ceiling changes in each degree of angular displacement. The processor compares consecutively captured images and determines a transpose that transforms a previously captured image into a currently captured image. The processor applies the transpose to all measurements and normalizes them. The transpose may be determined and applied to the measurements at the end of a rotation (e.g., 50, 195, or 360 degrees rotation), at every incremental degree, or at a predetermined interval (e.g., an interval corresponding with camera FPS or TOF sensor Hz). In other instances, the camera captures images of other objects such as walls, floors, walls and floors, ceilings and walls, the driving surface, etc. For example, the camera may be oriented to capture images of walls and floors and the processor may determine the transpose of a corner connecting a floor and two walls from one image to another. In some embodiments, the processor determines the change in distance of the feature from an edge of the image.

In some embodiments, more than one camera may be used to improve accuracy of the map. For example, a plurality of distance measuring cameras (e.g., carried by the robotic device) may be used simultaneously (or concurrently) to more accurately determine the perimeters of the map. The use of a plurality of distance measuring cameras is expected to allow for the collection of distance measurements from different perspectives and angles, for example. Where more than one distance measuring camera is used, triangulation or others suitable methods may be used for further data refinement and accuracy. In some embodiments, a 360-degree LIDAR is used to create perimeters of the map. It should be emphasized, though, that embodiments are not limited to techniques that construct maps in this way, as the present techniques may also be used for plane finding in augmented reality, barrier detection in virtual reality applications, outdoor mapping with autonomous drones, and other similar applications, which is not to suggest that any other description is limiting. Further details of mapping methods are described in U.S. patent application Ser. Nos. 16/048,179, 16/048,185, 16/163,541, 16/163,562, 16/163,508, and 16/185,000, the entire contents of which are hereby incorporated by reference.

In some embodiments, the processor of the robotic device may generate multiple maps of the environment over multiple working sessions. The maps may be stored in a memory of the robotic device and may be combined with previously generated maps to keep the map of the environment up to date. In some embodiments, a predetermined map of the environment may be generated and stored in an internal memory of the robotic device. In some embodiments, the robotic device may generate a map of the environment during operation in the environment. In some embodiments, the processor may update the internal map of the environment with observations collected during each successive work session. Continuous updates to the map of the environment may help establish the most efficient path of the robotic device. In some embodiments, the processor of the robotic device generates a local map and a global map. In some embodiments, the processor integrates the local map into the global map. In some embodiments, the processor only observes a portion of the global map that is local relative to the location of the robotic device. In some embodiments, one or more local maps are superimposed on a global map. In some instances, local maps are combined to create a global map. In some instances. The processor generates a local map and determines its location based on locating the local map within the global map by detecting similar features between the two maps.

The robotic device may, for example, use the map to autonomously navigate the environment during operation, e.g., accessing the map to determine that a candidate route is blocked by an obstacle denoted in the map, to select a route with a route-finding algorithm from a current point to a target point, or the like. To avoid false detection of an obstacle, in some embodiments, the processor assigns each location within the map an obstacle probability indicating the probability of an obstacle existing in each respective location. The obstacle probability assigned to a particular location increases each time an obstacle is observed in the particular location, and the processor qualifies an obstacle as existing in a particular location only when the obstacle probability is greater than a predetermined threshold. For example, all locations in a map are initially set to an obstacle probability of 0.25 (i.e., 25% chance that an obstacle exists in each location). When an obstacle is observed in a particular location, the obstacle probability increases to 0.325, and if observed a second time in the same particular location the obstacle probability increases to 0.3925, and so on. When the obstacle probability assigned to a particular location is greater than 0.325, the processor qualifies an obstacle as existing in the particular location. In some embodiments, the map is stored in memory for future use. Storage of the map may be in temporary memory such that a stored map is only available during an operational session or in more permanent forms of memory such that the map is available at the next session or startup. In some embodiments, the map is further processed to identify rooms and other segments. Examples of methods for dividing an environment into zones are described in U.S. patent application Ser. Nos. 14/817,952, 16/198,393, and 15/619,449, the entire contents of which are hereby incorporated by reference. In some embodiments, a new map is constructed at each use, or an extant map is updated based on newly acquired data.

In some embodiments, the memory of the robotic device may include an internal database of obstacles likely to be encountered within the environment. In some embodiments, an obstacle encountered in the environment may be identified using various sensors to capture features of the obstacle and the processor may determine the type of obstacle based on the internal database. In some embodiments, the processor executes one or more actions based on the type of obstacle detected. The processor may note the increased likelihood of that type of obstacle being located in the region of the environment in which it was encountered. In some embodiments, the processor may mark the location in the map. For example, images sensors of the robotic device continuously capture images, and if the robotic device encounters a wire on the floor, the processor analyzes images of the wire to extract features of the obstacle and compares them with features of obstacles within the internal database to determine that it is a wire. The processor may mark the region in which the wire was encountered within an internal map as a region with increased likelihood of containing a wire. In some embodiments, the processor may further determine if an obstacle may be overcome by the robotic device. For example, the processor may determine if the wire is an obstacle that may be overcome by the robotic device by, for example, driving over the wire. If so, the robotic device may attempt to drive over the obstacle. If, however, the robotic device encounters a large obstacle, such as a chair or table, the processor may determine that it cannot overcome the obstacle and may attempt to maneuver around the obstacle and continue along its path. In some embodiments, regions wherein obstacles are consistently encountered may be classified by the processor as a high obstacle density area and may be marked in the map of the environment. In some embodiments, the processor may attempt to alter its path to avoid high obstacle density areas. In some embodiments, the processor may alert a user when an unanticipated obstacle blocking the path of the robotic device is encountered, particularly when the robotic device may not overcome the obstacle by maneuvering around or driving over the obstacle. The robotic device may alert the user by generating a noise, sending a message to an application of a communication device paired with the robotic device or any other device paired with the robotic device, displaying a message on a screen of the robotic device, illuminating lights, and the like.

In some embodiments, the robotic device is configured with a first exteroceptive sensor (e.g., depth sensor) and a second proprioceptive sensor (e.g., gyroscope, such as in a three or six axis inertial measurement unit (IMU), the data of which the processor uses simultaneously and interchangeably for mapping and localization of the robotic device. In some embodiments, data from one sensor is used in a primary method for mapping and localization while data from the other sensor is used in a secondary method for mapping and localization. The processor uses the secondary method for mapping and localization when, for example, the sensor used in the primary method for mapping and localization malfunctions, becomes unusable or is functionally affected by the environment. For example, in direct sunlight a first exteroceptive sensor, such as a depth camera, may not provide the reliable readings required for a primary method for mapping and localization. In such instances, the processor uses a secondary method for mapping and localization using data from a second proprioceptive sensor, such as a gyroscope, to localize the robotic device and mark the area covered by the robotic device such that repeat coverage is avoided. The transition between the primary and secondary method may be seamless (e.g., occurring within less than 10 seconds, less than 1 second, or less than 500 milliseconds, and resulting in less than 1 cm, 10 cm, or 50 cm of error in position over 10 seconds of travel) and may be controlled with a finite state machine. In some embodiments, the processor uses the secondary method to verify output of the primary method. In some embodiments, one sensor is active (e.g., depth sensor emitting light to the environment and measuring reflected light) and the other sensor is passive (e.g., gyroscope measuring movement). For example, data from a digital camera (i.e., passive sensor) is used in a primary method for mapping and localization and data from a wheel encoder (i.e., active sensor) is used in a secondary method for mapping and localization.

In some embodiments, IMU measurements in a multi-channel stream indicative of acceleration along three or six axes may be integrated over time to infer a change in pose of the robotic device, e.g., with a Kalman filter. In some cases, the change in pose may be expressed as a movement vector in the frame of reference of the room through which the robotic device moves. Some embodiments may localize the robotic device or map the room based on this movement vector (and contact sensors in some cases) even if the camera is inoperative or degraded. In some cases, IMU measurements may be combined with image-based (or other exteroceptive) mapping data in a map or localization determination. Or in some cases, data from one active sensor may be used at a time for localization or mapping, and the other sensor may remain passive, e.g., sensing data, but that data may not be used for localization or mapping while the other sensor is active. Some embodiments may maintain a buffer of sensor data from the passive sensor (e.g., including measurements over a preceding duration, like one second or ten seconds), and upon failover from the active sensor to the passive sensor, which may then become active, some embodiments may access the buffer to infer a current position or map features based on both currently sensed data and buffered data. In some embodiments, the buffered data may be calibrated to the location or mapped features from the formerly active sensor, e.g., with the above-described sensor fusion techniques.

In some embodiments, cliffs are marked as obstacles in the map. In some embodiments, cliffs are detected using edge sensors, such as those described in U.S. patent application Ser. Nos. 14/941,385, 16/279,699, and 16/041,470. In some embodiments, the cliffs marked as obstacles in the map prevent the robotic device from visiting the cliff area more than one time. Without the cliffs marked as obstacles in the map, the robotic device may attempt to visit the cliff area multiple times. Although the cliffs are detected by the edge detection sensors and prevent the robotic device from moving past the cliff, the processor may not learn that the cliff area is off limits and may try to visit the cliff area multiple times. By adding cliffs to the map as obstacles, the robotic device may avoid returning to cliff area again during the same work session and in future work sessions if the map is saved. In some embodiments, the processor treats the cliff area as a perimeter of the environment and directs the robotic device to move along a smooth line parallel to the cliff line as it if was a wall.

In some instances where linear algebra is used, Basic Linear Algebra Subprograms (BLAS) may be implemented to carry out operations such as vector addition, vector norms, scalar multiplication, matrix multiplication, matric transpose, matrix-vector multiplication, linear combinations, dot products, cross products, and the like.

The techniques described herein, e.g., such as mapping and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, a mapping chip or a processing chip with a mapping processing unit may be used.

In some embodiments, the processor localizes itself during mapping or during operation. In some embodiments, methods of localization are inherently independent from mapping and path planning but may be used in tandem with any mapping or path planning method or may be used independently to localize the robotic device irrespective of the path or map of the environment. In some embodiments, the processor uses quantum SLAM.

In some embodiments, the processor localizes the robotic device within an environment represented by a phase space or Hilbert space. In some embodiments, the space includes all possible states of the robotic device within the space. In some embodiments, a probability distribution may be used by the processor of the robotic device to approximate the likelihood of the state of the robotic device being within a specific region of the space. In some embodiments, the processor of the robotic device determines a phase space probability distribution over all possible states of the robotic device within the phase space using a statistical ensemble including a large collection of elements representing virtual, independent copies of the robotic device in various states of the phase space. In some embodiments, the phase space consists of all possible values of position and momentum variables. In some embodiments, the processor represents the statistical ensemble by a phase space probability density function ρ(p, q, t), q and p denoting position and velocity vectors. In some embodiments, the processor uses the phase space probability density function ρ(p, q, t) to determine the probability ρ(p, q, t)dq dp that the Robotic device at time t will be found in the infinitesimal phase space volume dq dp. In some embodiments, the phase space probability density function ρ(p, q, t) has the properties ρ(p, q, t)≥0 and ∫ρ(p, q, t)d(p, q)=1, ∀t≥0, and the probability of the position q lying within a position interval a, b is $$P[a \leq q \leq b] = \int_a^b \int \rho(p, q, t) dp dq.$$

Similarly, the probability of the velocity p lying within a velocity interval c, d is $$P[c \leq q \leq d] = \int_c^d \int \rho(p, q, t) dq dp.$$

In some embodiments, the processor determines values by integration over the phase space. For example, the processor determines the expectation value of the position q by $\langle q \rangle = \int q \rho(p, q, t) d(p, q)$.

In some embodiments, the processor evolves each state within the ensemble over time t according to an equation of motion. In some embodiments, the processor models the motion of the Robotic device using a Hamiltonian dynamical system with generalized coordinates q, p wherein dynamical properties are modeled by a Hamiltonian function H. In some embodiments, the function represents the total energy of the system. In some embodiments, the processor represents the time evolution of a single point in the phase space using Hamilton's equations $$\frac{dp}{dt} = -\frac{\partial H}{\partial q}, \frac{dq}{dt} = \frac{\partial H}{\partial p}.$$

In some embodiments, the processor evolves the entire statistical ensemble of phase space density function ρ(p, q, t) under a Hamiltonian H using the Liouville equation $$\frac{\partial \rho}{\partial t} = -\{\rho, H\},$$

wherein $\{\cdot,\cdot\}$ denotes the Poisson bracket and H is the Hamiltonian of the system. For two functions $f$, g on the phase space, the Poisson bracket is given by $$\{f, g\} = \sum_{i=1}^N \left(\frac{\partial f}{\partial q_i}\frac{\partial g}{\partial p_i} - \frac{\partial f}{\partial p_i}\frac{\partial g}{\partial q_i}\right).$$

In this approach, the processor evolves each possible state in the phase space over time instead of keeping the phase space density constant over time, which is particularly advantageous if sensor readings are sparse in time.

In some embodiments, the processor evolves the phase space probability density function ρ(p, q, t) over time using the Fokker-Plank equation which describes the time evolution of a probability density function of a particle under drag and random forces. In comparison to the behavior of the robotic device modeled by both the Hamiltonian and Liouville equations, which are purely deterministic, the Fokker-Planck equation includes stochastic behaviour. Given a stochastic process with $dX_t=\mu(X_t, t) dt+\sigma(X_t, t)dW_t$, wherein $X_t$ and $\mu(X_t, t)$ are M-dimensional vectors, $\sigma(X_t, t)$ is a M×P matrix, and $W_t$ is a P-dimensional standard Wiener process, the probability density ρ(x, t) for $X_t$ satisfies the Fokker-Planck equation $$\frac{\partial \rho(x, t)}{\partial t} = -\sum_{i=1}^M \frac{\partial}{\partial x_i}[\mu_i(x, t)\rho(x, t)] + \sum_{i=1}^M \sum_{j=1}^M \frac{\partial^2}{\partial x_i \partial x_j}[D_{ij}(x, t)\rho(x, t)]$$

with drift vector $\mu=(\mu_1, \ldots, \mu_M)$ and diffusion tensor $$D = \frac{1}{2}\sigma\sigma^T.$$

In some embodiments, the processor adds stochastic forces to the motion of the robotic device governed by the Hamiltonian H and the motion of the robotic device is then given by the stochastic differential equation $$dX_t = (dq\, dp) = \left(+\frac{\partial H}{\partial p} - \frac{\partial H}{\partial q}\right)dt = (0_N \sigma_N(p, q, t))dW_t,$$

wherein $\sigma_N$ is a N×N matrix and $dW_t$ is a N-dimensional Wiener process. This leads to the Fokker-Plank equation $$\frac{\partial \rho}{\partial t} = -\{\rho, H\} + \nabla_p \cdot (D\nabla_p \rho),$$

wherein $\nabla_p$ denotes the gradient with respect to position p, $\nabla\cdot$ denotes divergence, and $$D = \frac{1}{2}\sigma_N \sigma_N^T$$

is the diffusion tensor.

In other embodiments, the processor incorporates stochastic behaviour by modeling the dynamics of the robotic device using Langevin dynamics, which models friction forces and perturbation to the system, instead of Hamiltonian dynamics. The Langevian equations are given by $M\ddot{q}=-\nabla_q U(q)-\gamma p+\sqrt{2\gamma k_B T M} R(t)$, wherein $(-\gamma p)$ are friction forces, $R(t)$ are random forces with zero-mean and delta-correlated stationary Gaussian process, T is the temperature, $k_B$ is Boltzmann's constant, $\gamma$ is a damping constant, and M is a diagonal mass matrix. In some embodiments, the Langevin equation is reformulated as a Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

that the processor uses to evolve the phase space probability density function over time. In some embodiments, the second order term $\nabla_p \cdot (\gamma M \nabla_p \rho)$ is a model of classical Brownian motion, modeling a diffusion process. In some embodiments, partial differential equations for evolving the probability density function over time may be solved by the processor of the robotic device using, for example, finite difference and/or finite element methods.

FIG. 6A illustrates an example of an initial phase space probability density of a robotic device, a Gaussian in (q, p) space. FIG. 6B illustrates an example of the time evolution of the phase space probability density after four time units when evolved using the Liouville equation incorporating Hamiltonian dynamics, $$\frac{\partial \rho}{\partial t} = -\{\rho, H\}$$

with Hamiltonian $$H = \frac{1}{2}p^2.$$

FIG. 6C illustrates an example of the time evolution of the phase space probability density after four time units when evolved using the Fokker-Planck equation incorporating Hamiltonian dynamics, $$\frac{\partial \rho}{\partial t} = -\{\rho, H\} + \nabla_p \cdot (D\nabla_p \rho)$$

with D=0.1. FIG. 6D illustrates an example of the time evolution of the phase space probability density after four time units when evolved using the Fokker-Planck equation incorporating Langevin dynamics, $$\frac{\partial \rho}{\partial t} = -\{\rho, H\} + \nabla_p \cdot (\gamma p \rho) + k_B T \nabla_p \cdot (\gamma M \nabla_p \rho)$$

with $\gamma=0.5$, T=0.2, and $k_B=1$. FIG. 6B illustrates that the Liouville equation incorporating Hamiltonian dynamics conserves momentum over time, as the initial density in FIG. 6A was only distorted in the q-axis (position). In comparison, FIGS. 6C and 6D illustrate diffusion along the p-axis (velocity) as well, as both evolution equations account for stochastic forces. With the Fokker-Planck equation incorporating Hamiltonian dynamics the density spread more equally (FIG. 6C) as compared to the Fokker-Planck equation incorporating Langevin dynamics where the density remained more confined (FIG. 6D) due to the additional friction forces.

In some embodiments, the processor of the robotic device may update the phase space probability distribution when the processor receives readings (or measurements or observations). Any type of reading that may be represented as a probability distribution that describes the likelihood of the state of the robotic device being in a particular region of the phase space may be used. Readings may include measurements or observations acquired by sensors of the robotic device or external devices such as a Wi-Fi camera. Each reading may provide partial information on the likely region of the state of the robotic device within the phase space and/or may exclude the state of the robotic device from being within some region of the phase space. For example, a depth sensor of the robotic device may detect an obstacle in close proximity to the robotic device. Based on this measurement and using a map of the phase space, the processor of the robotic device may reduce the likelihood of the state of the robotic device being any state of the phase space at a great distance from an obstacle. In another example, a reading of a floor sensor of the robotic device and a floor map may be used by the processor of the robotic device to adjust the likelihood of the state of the robotic device being within the particular region of the phase space coinciding with the type of floor sensed. In an additional example, a measured Wi-Fi signal strength and a map of the expected Wi-Fi signal strength within the phase space may be used by the processor of the robotic device to adjust the phase space probability distribution. As a further example, a Wi-Fi camera may observe the absence of the robotic device within a particular room. Based on this observation the processor of the robotic device may reduce the likelihood of the state of the robotic device being any state of the phase space that places the robotic device within the particular room. In some embodiments, the processor generates a simulated representation of the environment for each hypothetical state of the robot. In some embodiments, the processor compares the measurement against each simulated representation of the environment (e.g., a floor map, a spatial map, a Wi-Fi map, etc.) corresponding with a perspective of each of the hypothetical states of the robot. In some embodiments, the processor chooses the state of the robot that makes the most sense as the most feasible state of the robot. In some embodiments, the processor selects additional hypothetical states of the robot as a backup to the most feasible state of the robot.

In some embodiments, the processor of the robotic device may update the current phase space probability distribution $\rho(p, q, t_i)$ by re-weighting the phase space probability distribution with an observation probability distribution $m(p, q, t_i)$ according to $$\underline{\rho}(p, q, t_i) = \frac{\rho(p, q, t_i) \cdot m(p, q, t_i)}{\int \rho(p, q, t_i) m(p, q, t_i) d(p, q)}.$$

In some embodiments, the observation probability distribution may be determined by the processor of the robotic device for a reading at time $t_i$ using an inverse sensor model. In some embodiments, wherein the observation probability distribution does not incorporate the confidence or uncertainty of the reading taken, the processor of the robotic device may incorporate the uncertainty into the observation probability distribution by determining an updated observation probability distribution $$\hat{m} = \frac{1-\alpha}{c} + \alpha m$$

that may be used in re-weighting the current phase space probability distribution, wherein $\alpha$ is the confidence in the reading with a value of $0 \leq \alpha \leq 1$ and $c = \iint dp\, dq$. At any given time, the processor of the robotic device may estimate a region of the phase space within which the state of the robotic device is likely to be given the phase space probability distribution at the particular time.

Figure 7A:
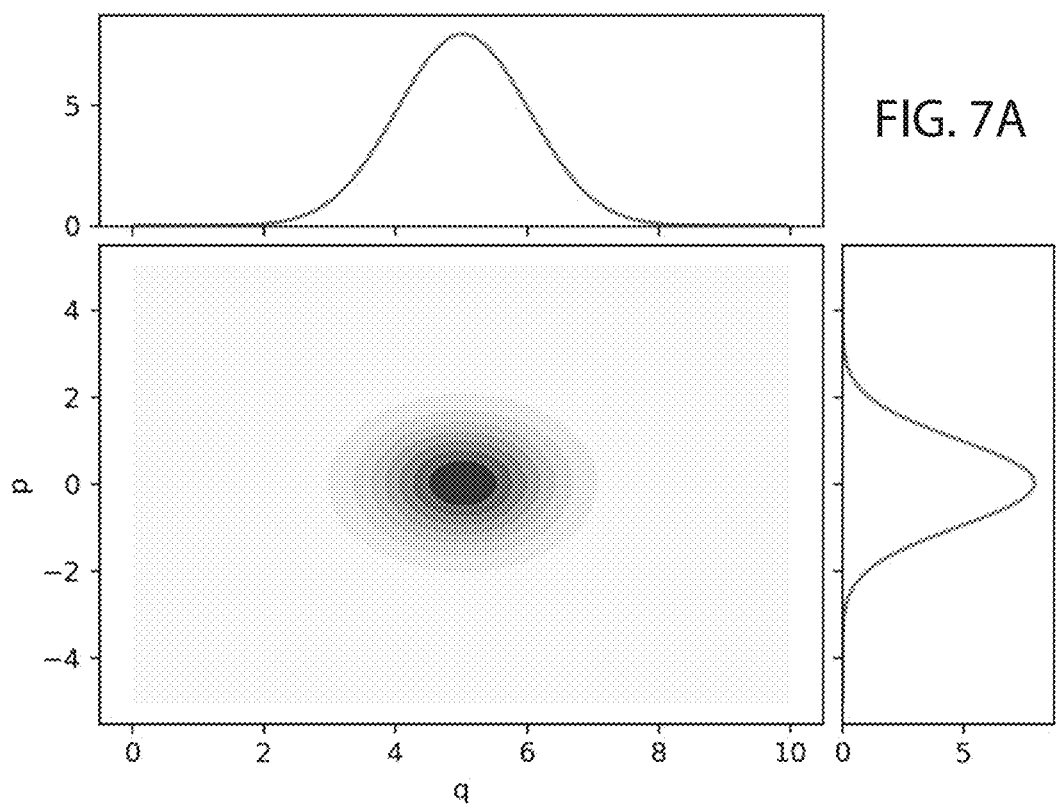
FIGS. 7A-7D illustrate examples of initial phase space probability distributions, according to some embodiments.
Figure 7B:
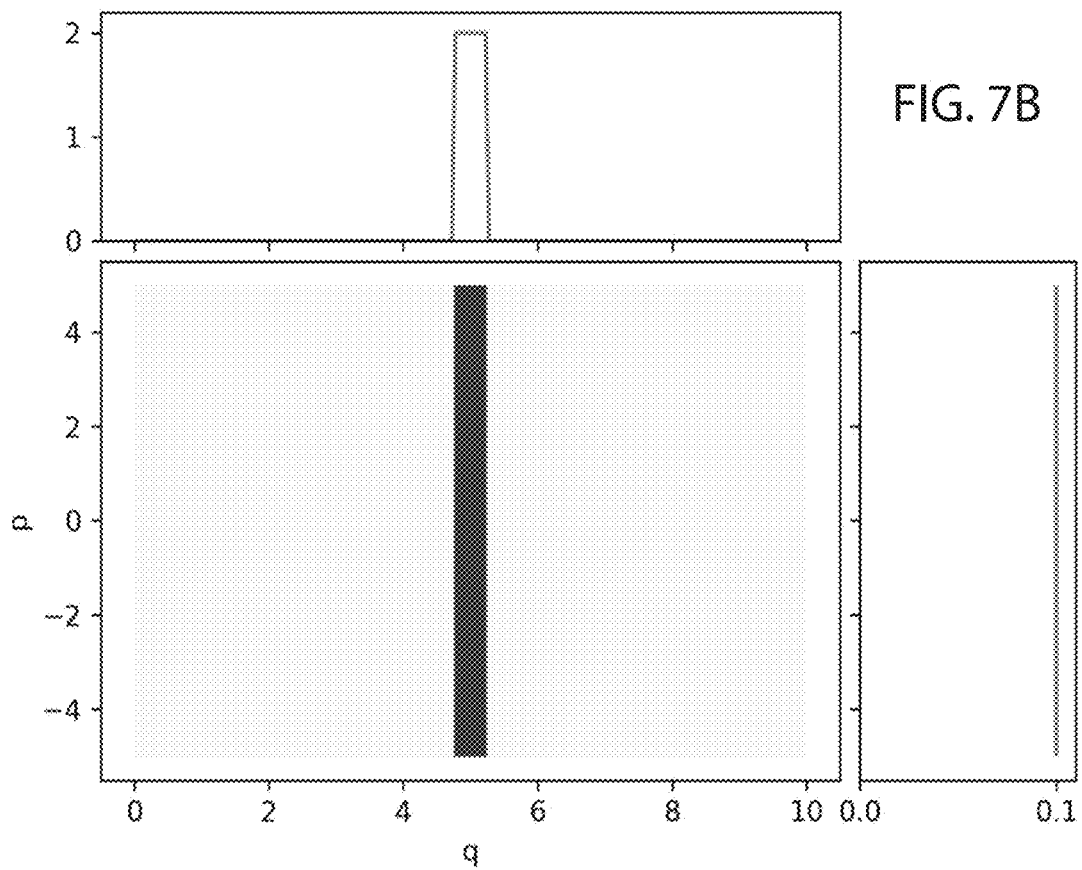
Figure 7C:
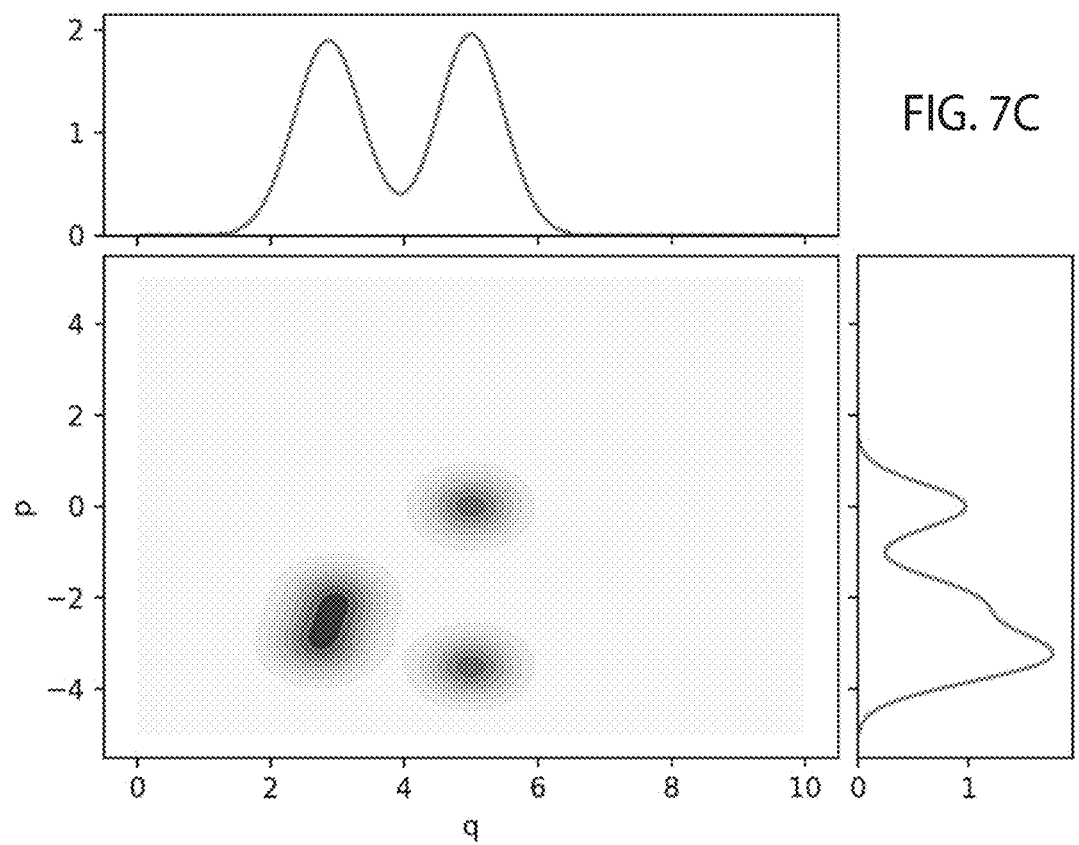
Figure 7D:
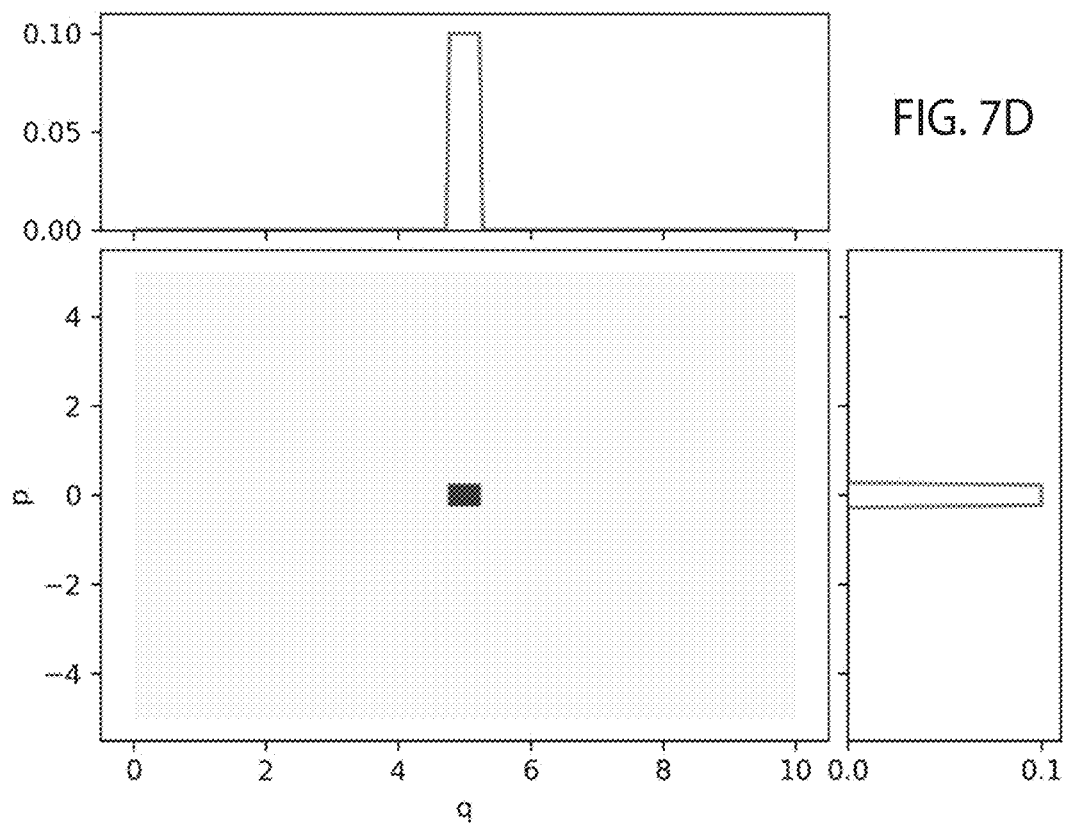

To further explain the localization methods described, examples are provided. In a first example, the processor uses a two-dimensional phase space of the robotic device, including position q and velocity p. The processor confines the position of the robotic device q to an interval [0, 10] and the velocity p to an interval [−5, +5], limited by the top speed of the robotic device, therefore the phase space (p, q) is the rectangle D=[−5, 5]×[0, 10]. The processor uses a Hamiltonian function $$H = \frac{p^2}{2m},$$

with mass m and resulting equations of motion $$\dot{p} = 0 \text{ and } \dot{q} = \frac{p}{m}$$

to delineate the motion of the robotic device. The processor adds Langevin-style stochastic forces to obtain motion equations $\dot{p} = -\gamma p + \sqrt{2\gamma m k_B T} R(t)$ and $$\dot{q} = \frac{p}{m},$$

wherein R(t) denotes random forces and m=1. The processor of the robotic device initially generates a uniform phase space probability distribution over the phase space D. FIGS. 7A-7D illustrate examples of initial phase space probability distributions the processor may use. FIG. 7A illustrates a Gaussian distribution over the phase space, centered at q=5, p=0. The robotic device is estimated to be in close proximity to the center point with high probability, the probability decreasing exponentially as the distance of the point from the center point increases. FIG. 7B illustrates uniform distribution for q∈[4.75, 5.25], p∈[−5, 5] over the phase space, wherein there is no assumption on p and q is equally likely to be in [4.75, 5.25]. FIG. 7C illustrates multiple Gaussian distributions and FIG. 7D illustrates a confined spike at q=5, p=0, indicating that the processor is certain of the state of the robotic device.

In this example, the processor of the robotic device evolves the phase space probability distribution over time according to Langevin equation $$\frac{\partial \rho}{\partial t} = -\{\rho, H\} + \left(\gamma \frac{\partial}{\partial p}\right) \cdot (p\rho) + \gamma k_B T \frac{\partial^2 \rho}{\partial p^2},$$

wherein $$\{\rho, H\} = p\frac{\partial \rho}{\partial q} \text{ and } m = 1.$$

Figure 8A:
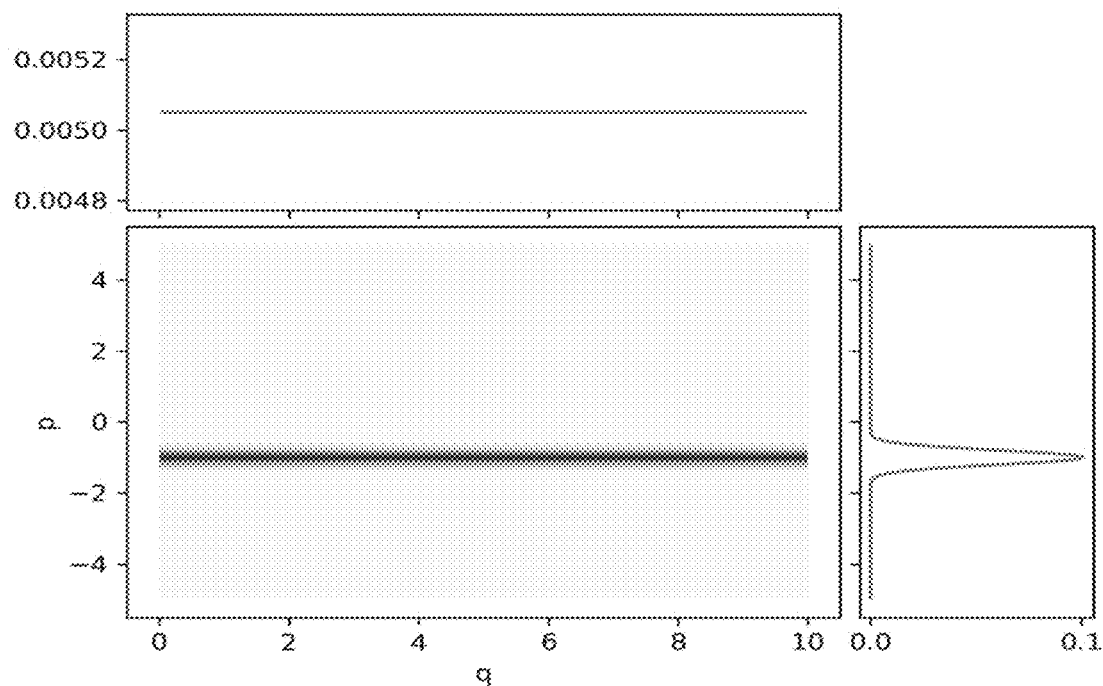
FIGS. 8A and 8B illustrate examples of observation probability distributions, according to some embodiments.
Figure 8B:
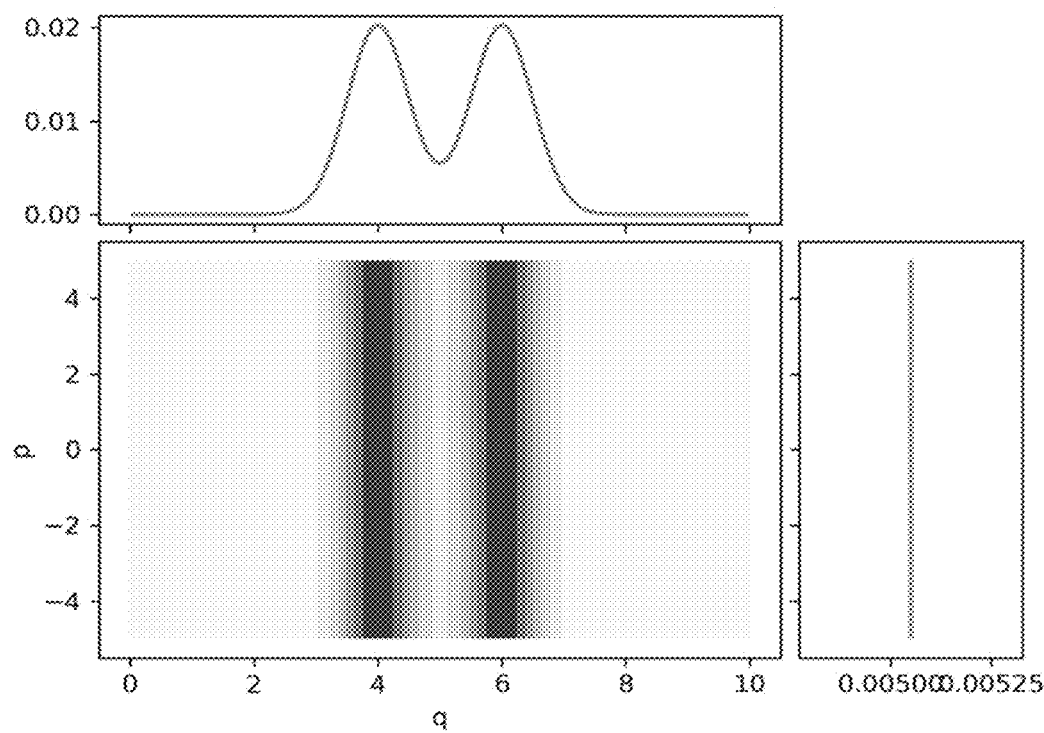

Thus, the processor solves $$\frac{\partial \rho}{\partial t} = -p\frac{\partial \rho}{\partial q} + \gamma\left(\rho + p\frac{\partial \rho}{\partial p}\right) + \gamma k_B T \frac{\partial^2 \rho}{\partial p^2} \text{ for } t > 0$$

with initial condition $\rho(p, q, 0) = \rho_0$ and homogenous Neumann perimeters conditions. The perimeters conditions govern what happens when the robotic device reaches an extreme state. In the position state, this may correspond to the robotic device reaching a wall, and in the velocity state, it may correspond to the motor limit. The processor of the robotic device updates the phase space probability distribution each time a new reading is received by the processor. FIGS. 8A and 8B illustrate examples of observation probability distributions for odometry measurements and distance measurements, respectively. FIG. 8A illustrates a narrow Gaussian observation probability distribution for velocity p, reflecting an accurate odometry sensor. Position q is uniform as odometry data does not indicate position. FIG. 8B illustrates a bimodal observation probability distribution for position q including uncertainty for an environment with a wall at q=0 and q=10. Therefore, for a distance measurement of four, the robotic device is either at q=4 or q=6, resulting in the bi-modal distribution. Velocity p is uniform as distance data does not indicate velocity. In some embodiments, the processor may update the phase space at periodic intervals or at predetermined intervals or points in time. In some embodiments, the processor of the robotic device may determine an observation probability distribution of a reading using an inverse sensor model and the phase space probability distribution may be updated by the processor by re-weighting it with the observation probability distribution of the reading.

Figure 9:
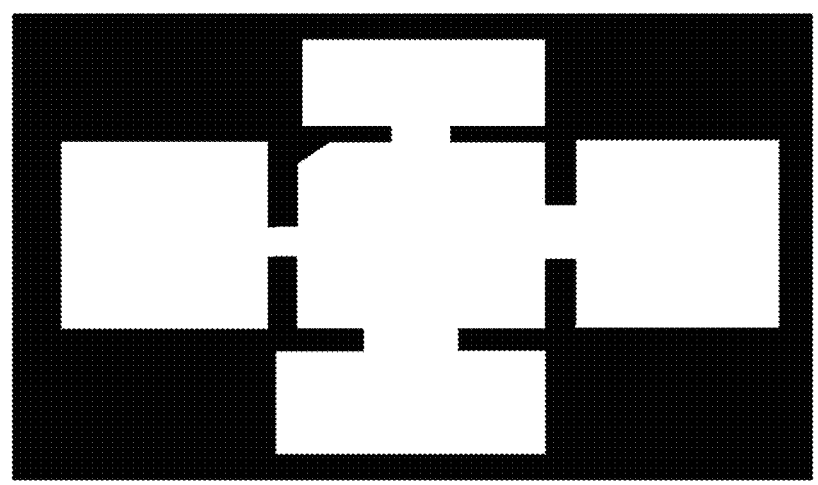
FIG. 9 illustrates an example of a map of an environment, according to some embodiments.
Figure 10A:
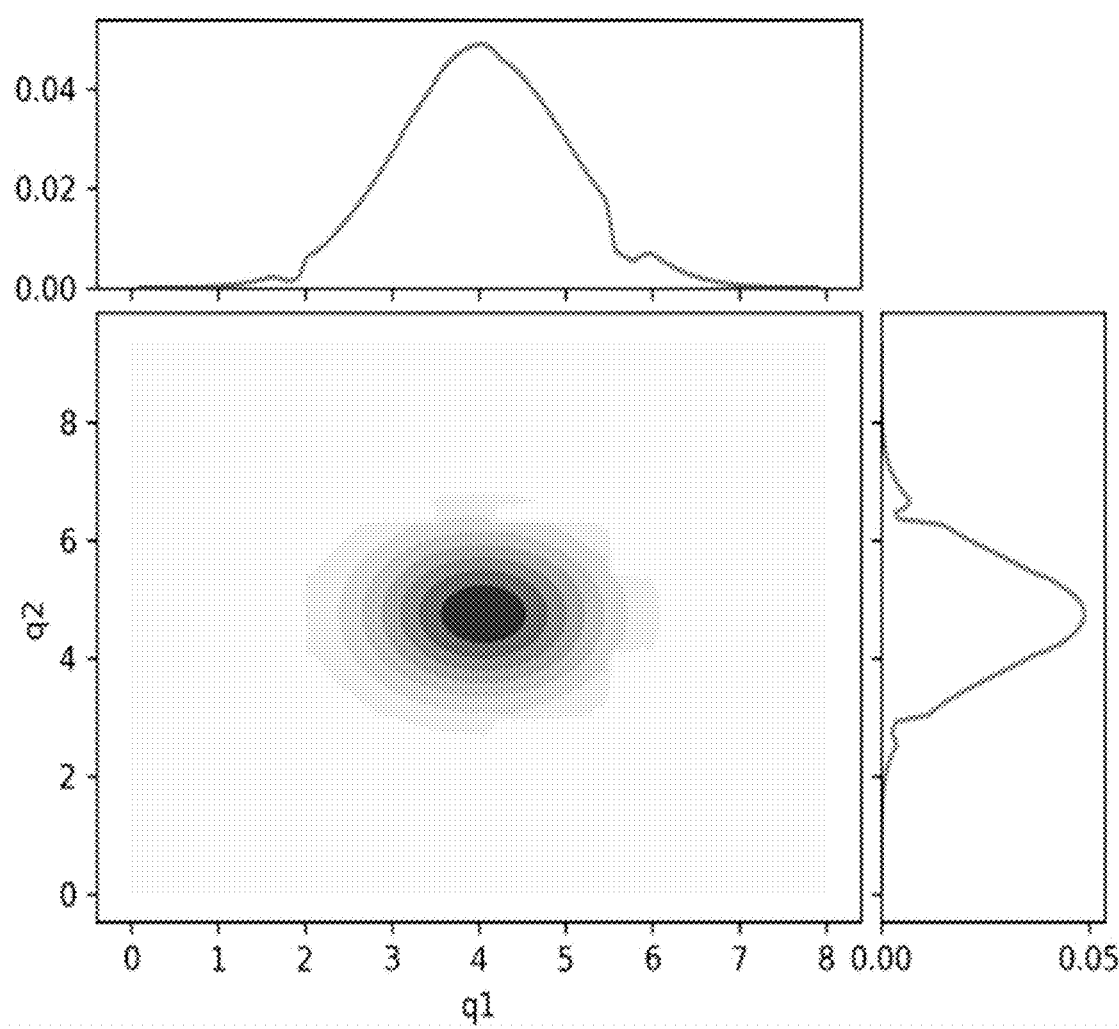
Figure 11A:
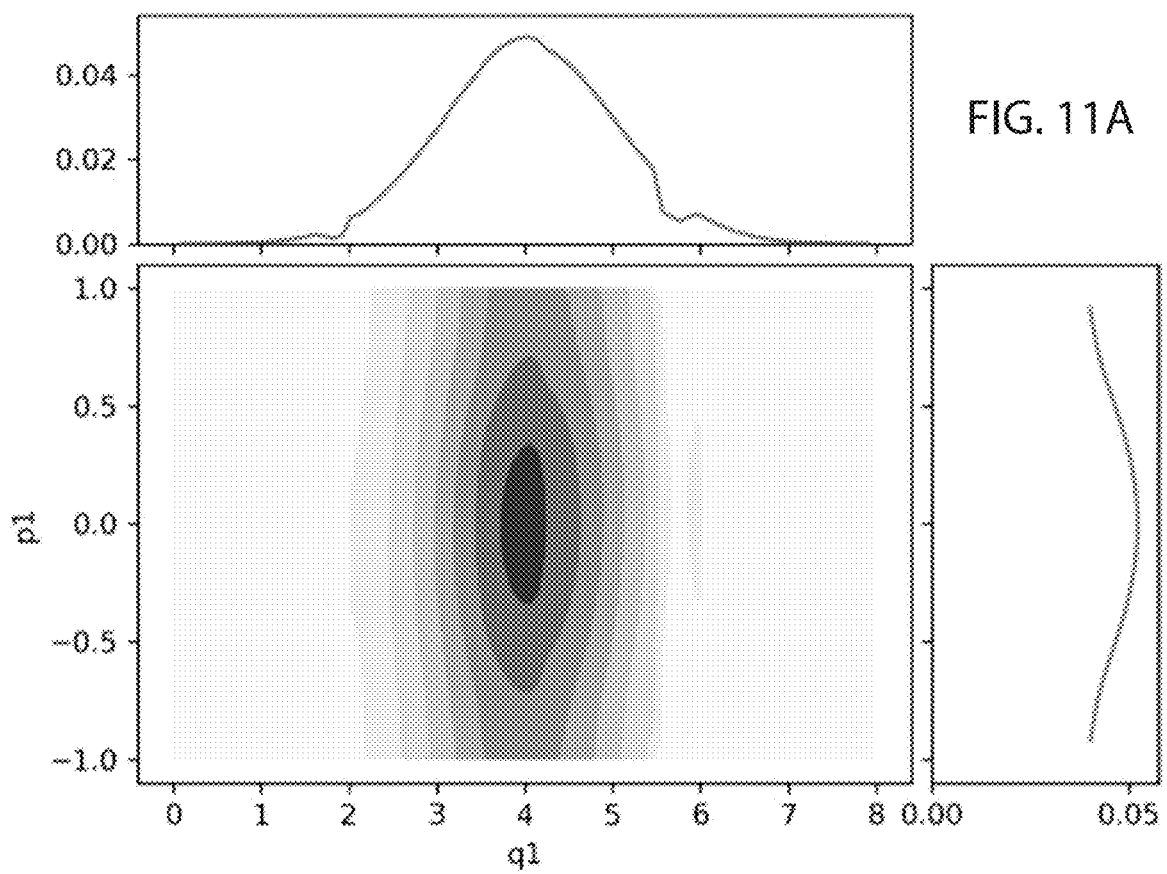
FIGS. 11A-11C illustrate an example of an evolution of a probability density reduced to the $p_1$, $q_1$ space at three different time points, according to some embodiments.
Figure 11B:
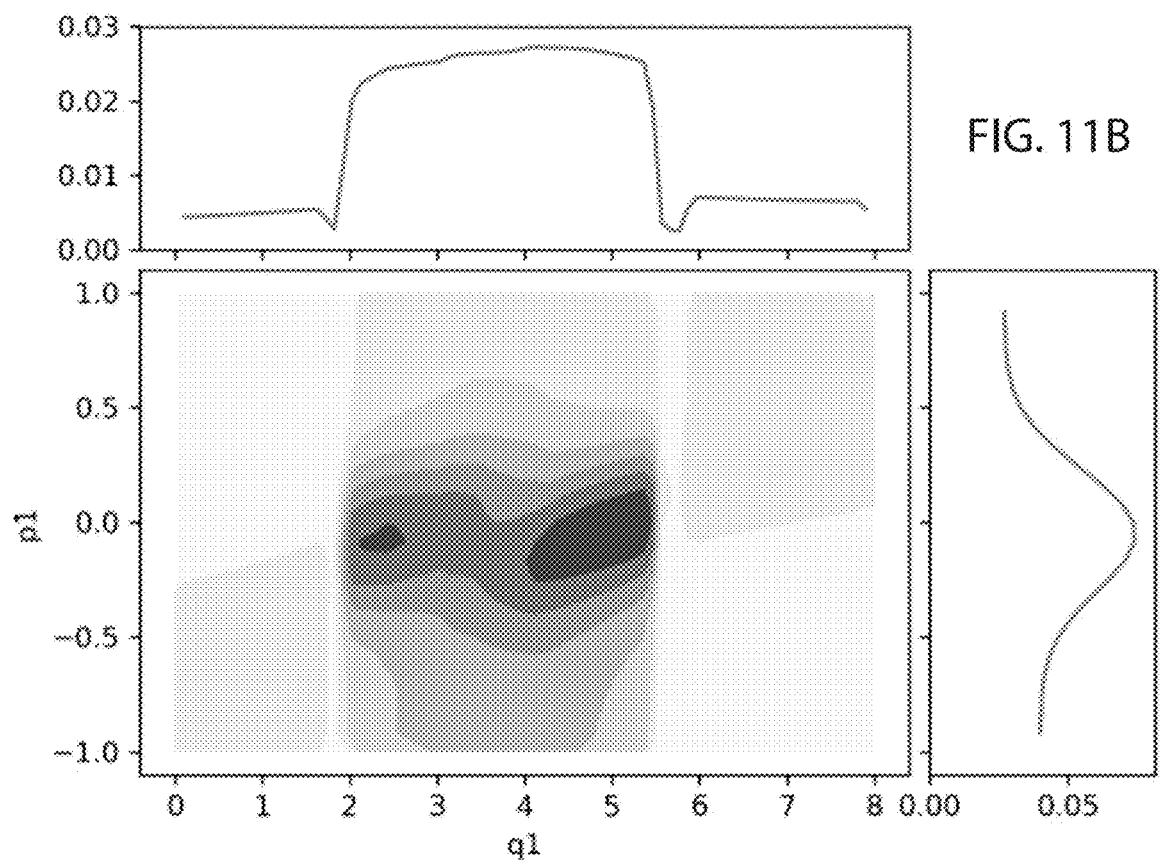
Figure 11C:
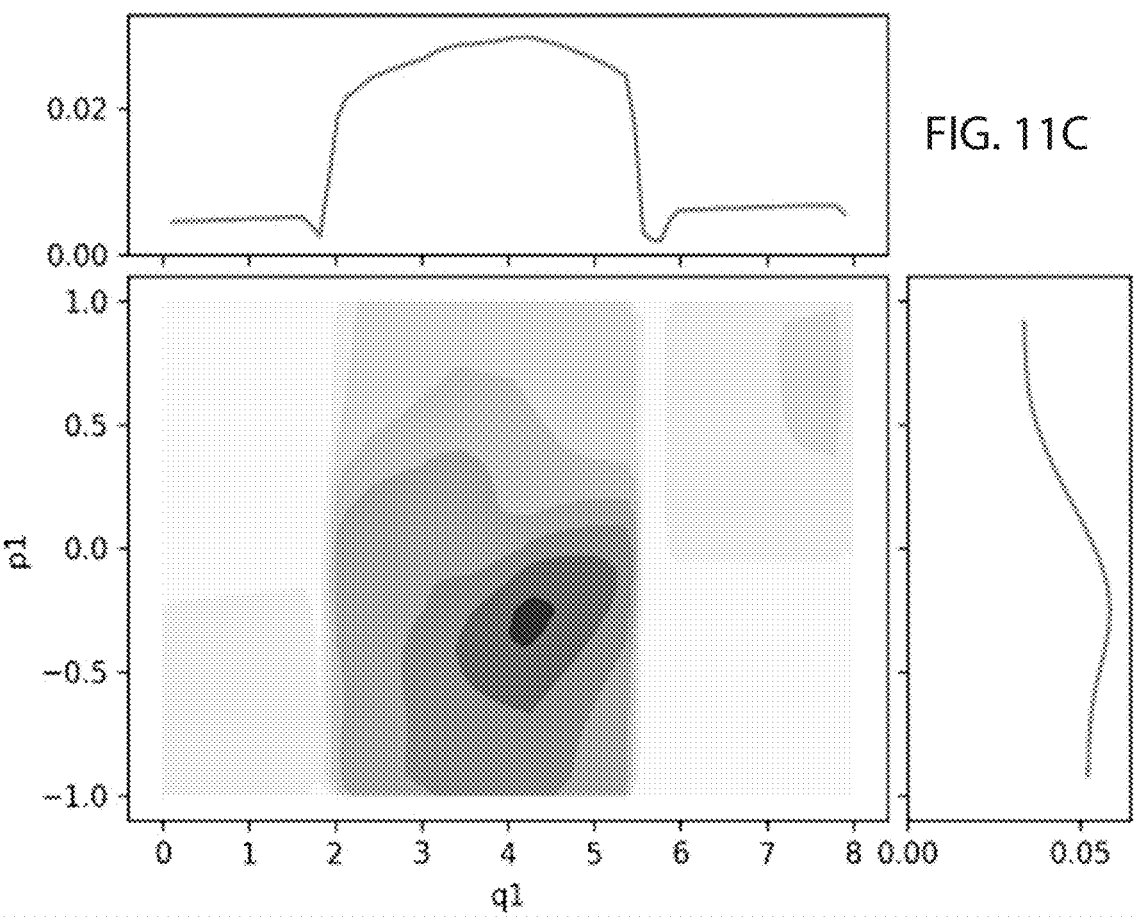
Figure 12A:
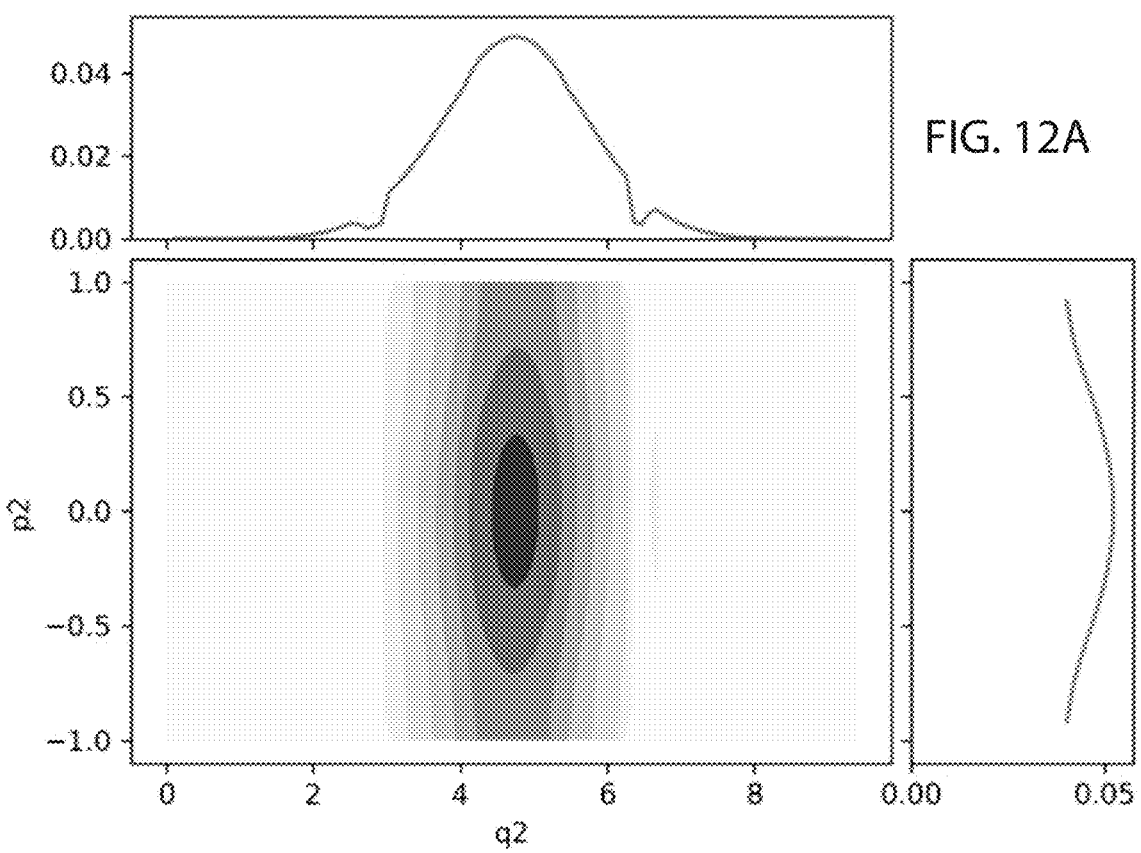
FIGS. 12A-12C illustrate an example of an evolution of a probability density reduced to the $p_2$, $q_2$ space at three different time points, according to some embodiments.
Figure 12B:
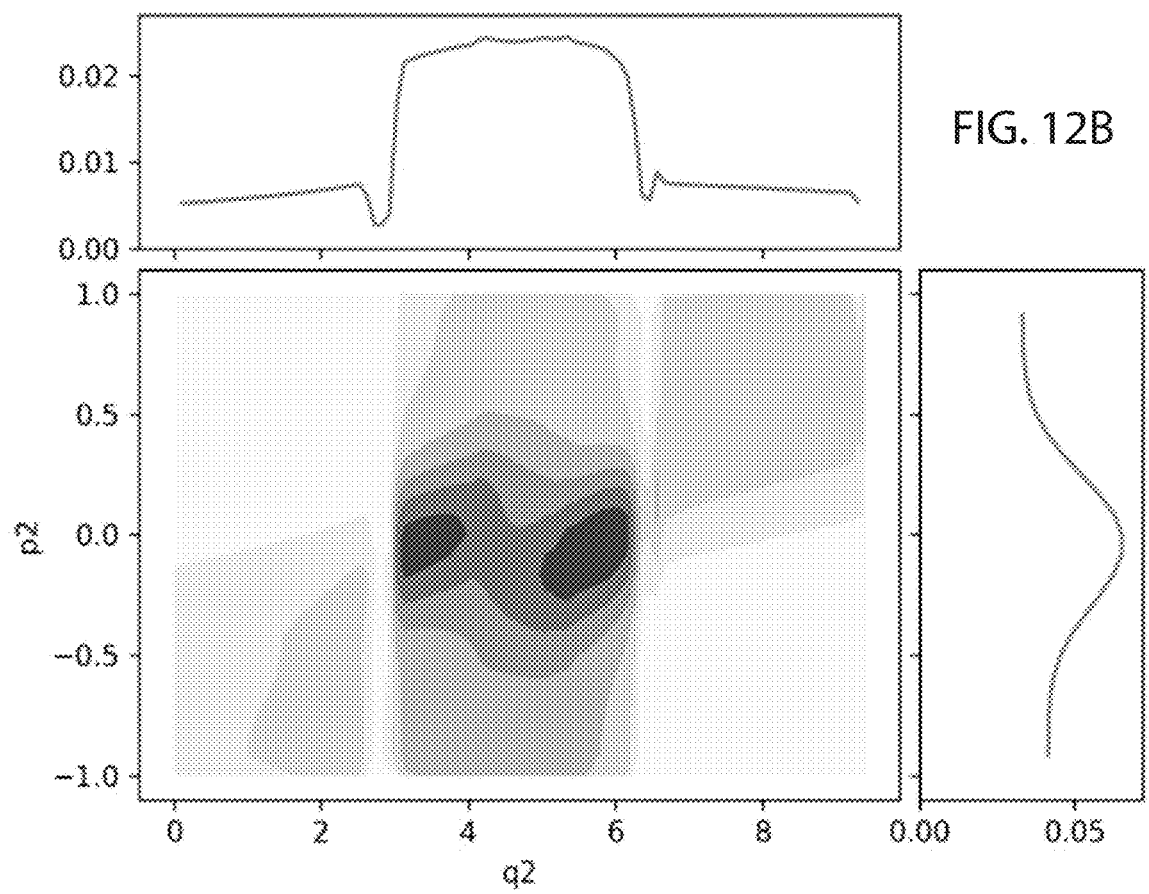
Figure 12C:
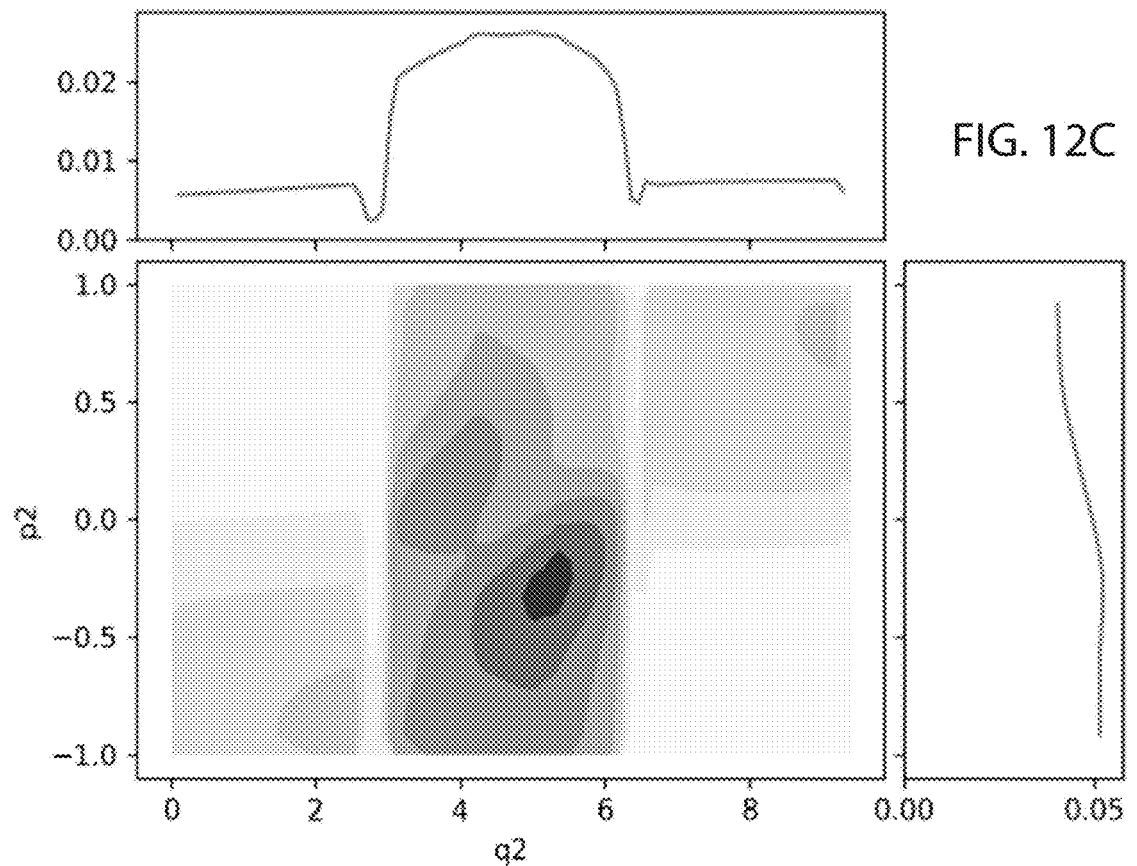
Figure 13:
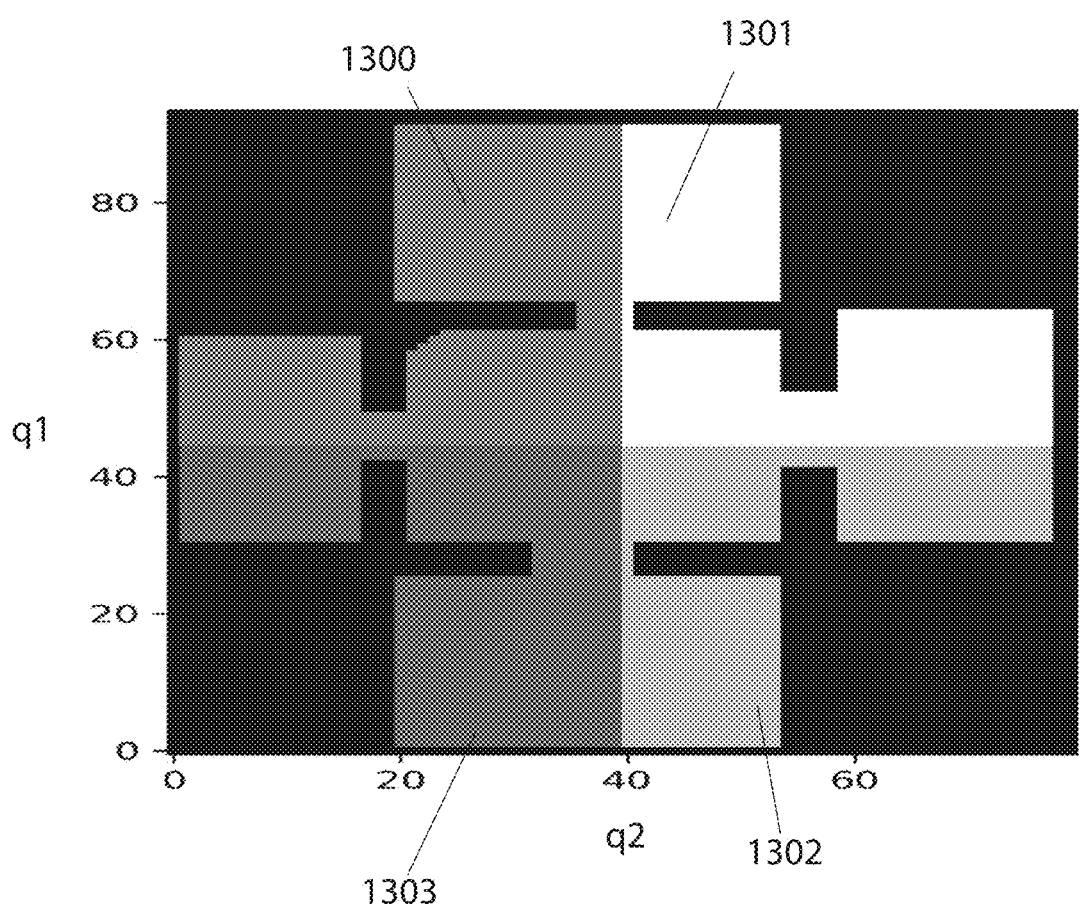
FIG. 13 illustrates an example of a map indicating floor types, according to some embodiments.
Figure 18:
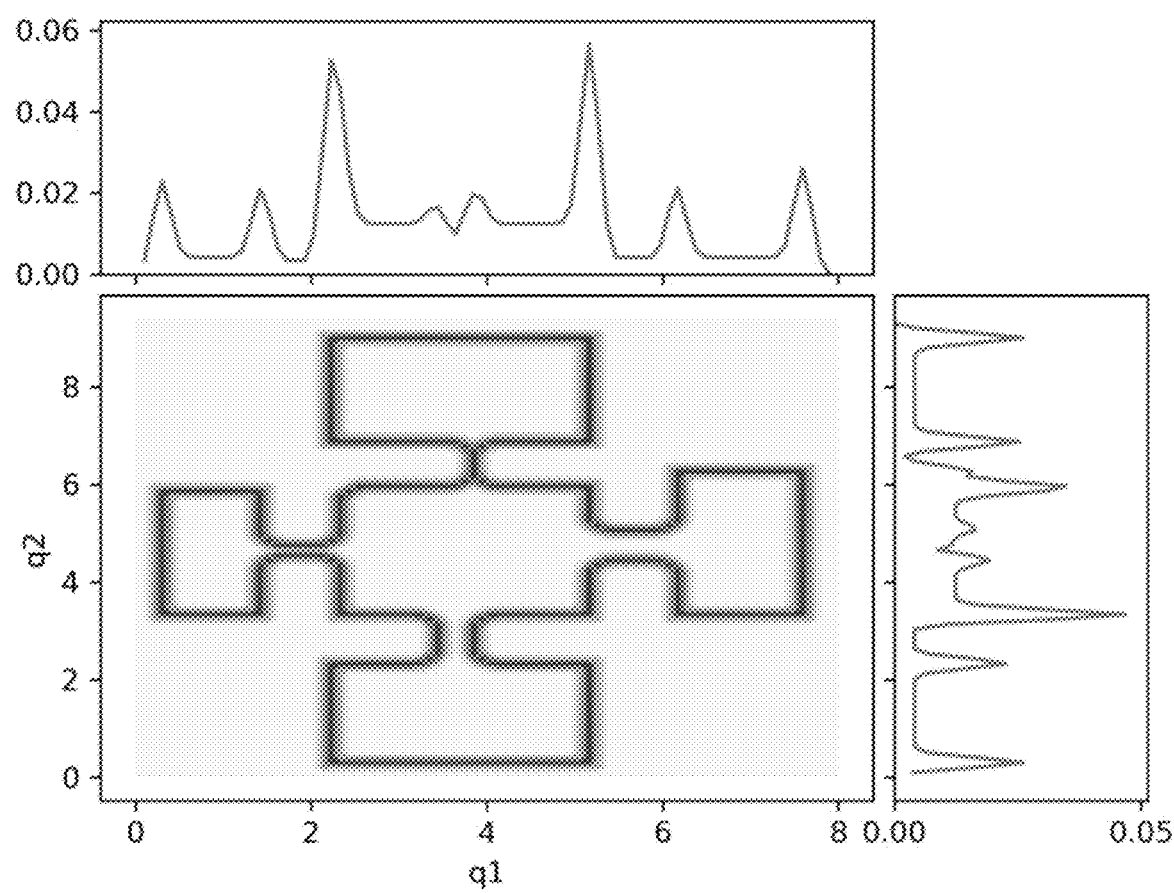
FIG. 18 illustrates an example of an updated probability density after observing distances to a wall, according to some embodiments.

The example described may be extended to a four-dimensional phase space with position q=(x, y) and velocity p=($p_x$, $p_y$). The processor solves this four dimensional example using the Fokker-Planck equation $$\frac{\partial \rho}{\partial T} = -\{\rho, H\} + \nabla_p \cdot (\gamma p \rho) + k_B T \nabla_p \cdot (\gamma M \nabla_p \rho)$$

with M=$I_2$ (2D identity matrix), T=0.1, $\gamma$=0.1, and $k_B$=1. In alternative embodiments, the processor uses the Fokker-Planck equation without Hamiltonian and velocity and applies velocity drift field directly through odometry which reduces the dimension by a factor of two. The map of the environment for this example is given in FIG. 9, wherein the white space is the area accessible to the robotic device. The map describes the domain for $q_1$, $q_2 \in$ D. In this example, the velocity is limited to $p_1, p_2 \in [-1, 1]$. The processor models the initial probability density $\rho(p, q, 0)$ as Gaussian, wherein $\rho$ is a four-dimensional function. FIGS. 10A-10C illustrate the evolution of $\rho$ reduced to the $q_1, q_2$ space at three different time points (i.e., the density integrated over $p_1, p_2$, $\rho_{red} = \iint \rho(p_1, p_2, q_1, q_2) dp_1 dp_2$). It can be seen that with increased time, the initial density focused in the middle of the map starts to flow into other rooms. FIGS. 11A-11C illustrate the evolution of $\rho$ reduced to the $p_1, q_1$ space and 12A-12C illustrate the evolution of $\rho$ reduced to the $p_2, q_2$ space at the same three different time points to show how velocity evolves over time with position. The four-dimensional example is repeated but with the addition of floor sensor data observations. FIG. 13 illustrates a map of the environment indicating different floor types 1300, 1301, 1302, and 1303 with respect to $q_1, q_2$. Given that the sensor has no error, the processor may strongly predict the area within which the robotic device is located based on the measured floor type, at which point all other hypothesized locations of the robotic device become invalid. For example, the processor may use the distribution $m(p_1, p_2, q_1, q_2) = \{const > 0, q_1, q_2$ with the observed floor type 0, else. If the sensor has an average error rate $\epsilon$, the processor may use the distribution $m(p_1, p_2, q_1, q_2) = \{c_1 > 0, q_1, q_2$ with the observed floor type $c_2 > 0$, else with $c_1, c_2$ chosen such that $\int_p \int_{D_{obs}} m d(q_1, q_2) d(p_1, p_2) = 1-\epsilon$ and $\int_p \int_{D_{obs}^c} m d(q_1, q_2) d(p_1, p_2) = \epsilon$. $D_{obs}$ is the $q_1, q_2$ with the observed floor type and $D_{obs}^c$ is its complement. By construction, the distribution m has a probability $1-\epsilon$ for $q_1, q_2 \in D_{obs}$ and probability $\epsilon$ for $q_1, q_2 \in D_{obs}^c$. Given that the floor sensor measures floor type 1302, the processor updates the probability distribution for position as shown in FIG. 14. Note that the corners of the distribution were smoothened by the processor using a Gaussian kernel, which corresponds to an increased error rate near the borders of an area. Next, Wi-Fi signal strength observations are considered. Given a map of the expected signal strength, such as that in FIG. 15, the processor may generate a density describing the possible location of the robotic device based on a measured Wi-Fi signal strength. The darker areas in FIG. 15 represent stronger Wi-Fi signal strength and the signal source at $q_1, q_2 = 4.0, 2.0$. Given that the robotic device measures a Wi-Fi signal strength of 0.4, the processor generates the probability distribution for position shown in FIG. 16. The likely area of the robotic device is larger since the Wi-Fi signal does not vary very much. For wall distance measurements, a wall distance map, such as that shown in FIG. 17 may be used by the processor to approximate the area of the robotic device given a distance measured. Given that the robotic device measures a distance of 3 distance units, the processor generates the probability distribution for position shown in FIG. 18. For example, the processor evolves the Fokker-Planck equation over time and as observations are successively taken, the processor re-weights the density function with each observation wherein parts that do not match the observation are considered less likely and parts that highly match the observations relatively increase in probability. An example of observations over time may be, t=1: observe $p_2=0.75$; t=2: observe $p_2=0.95$ and Wi-Fi signal strength 0.56; t=3: observe wall distance 9.2; t=4: observe floor type 2; t=5: observe floor type 2 and Wi-Fi signal strength 0.28; t=6: observe wall distance 3.5; t=7: observe floor type 4, wall distance 2.5, and Wi-Fi signal strength 0.15; t=8: observe floor type 4, wall distance 4, and Wi-Fi signal strength 0.19; t=8.2: observe floor type 4, wall distance 4, and Wi-Fi signal strength 0.19.

Figure 19:
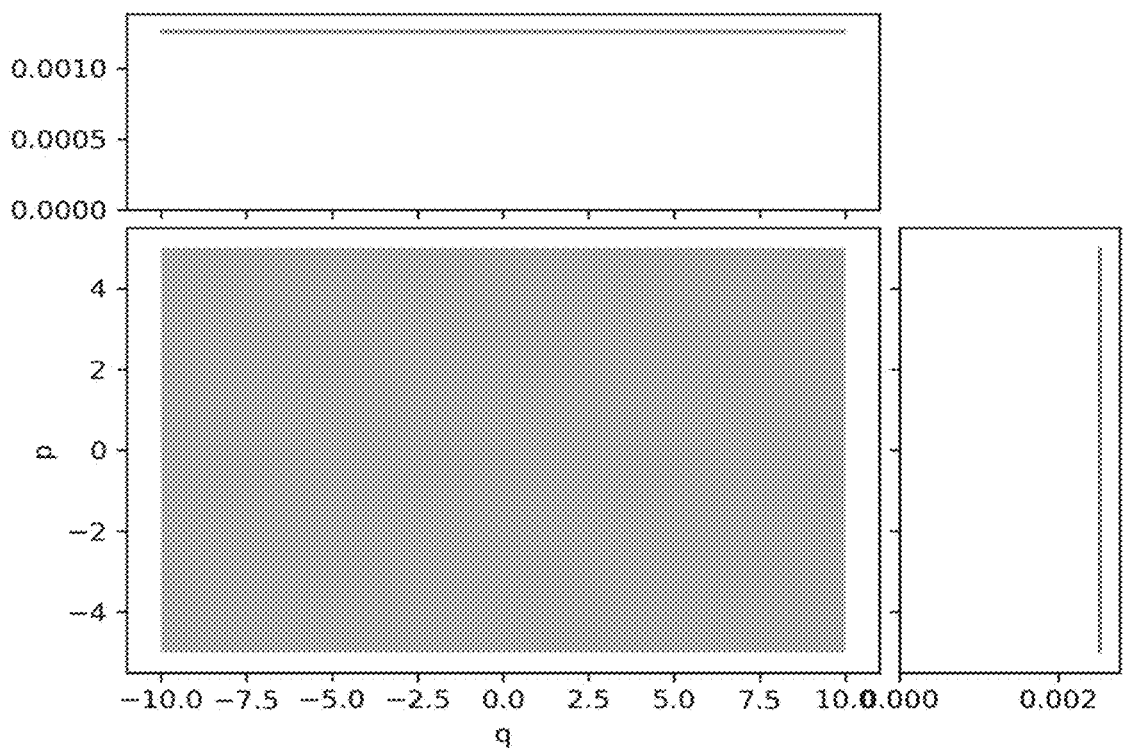
FIGS. 19-22 illustrate an example of an evolution of a probability density of a position of a robotic device as it moves and observes doors, according to some embodiments.
Figure 20:
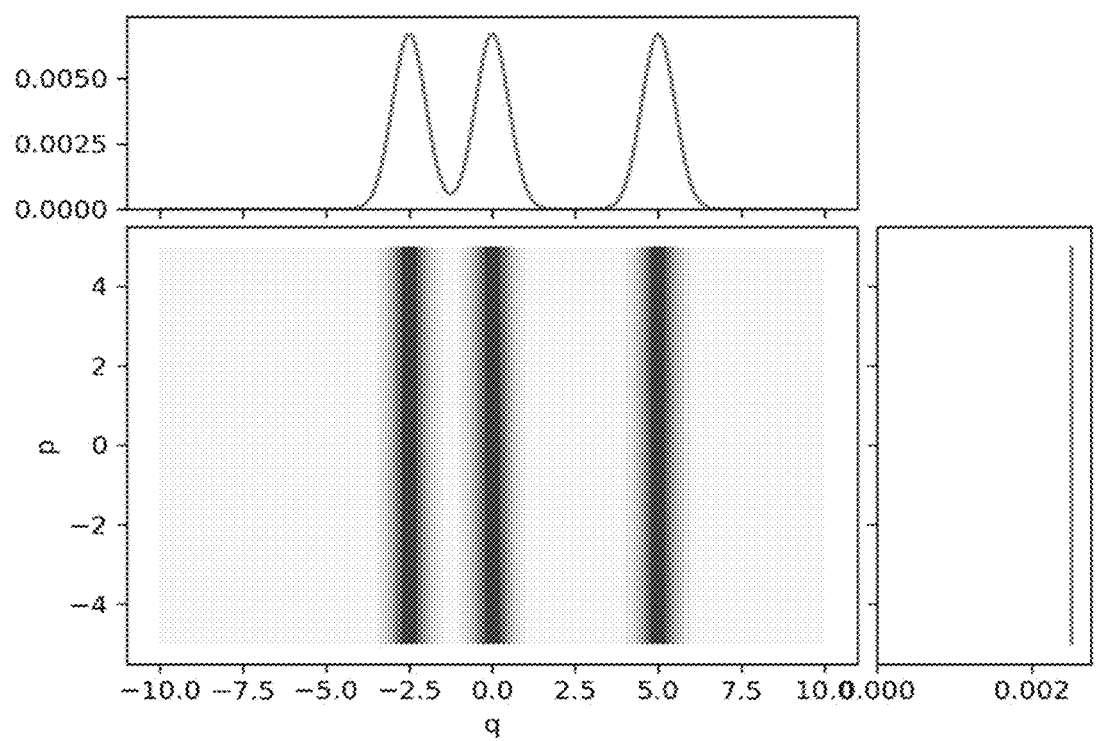
Figure 21:
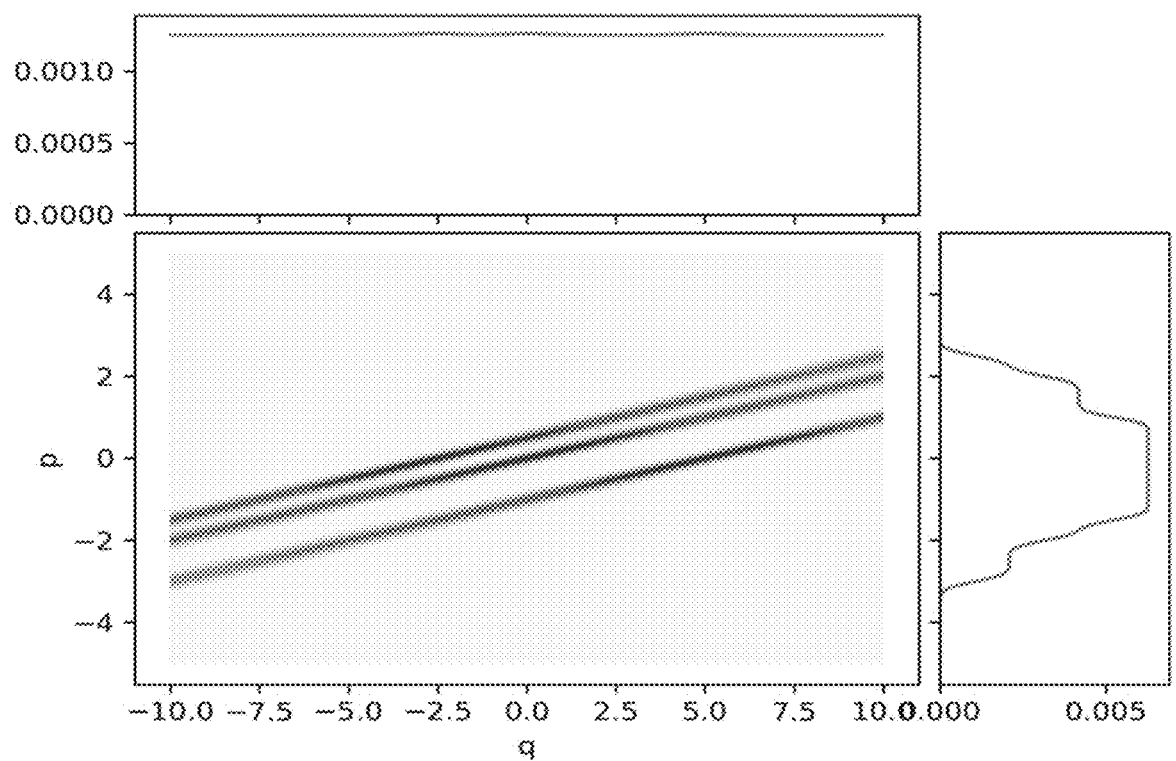
Figure 22:
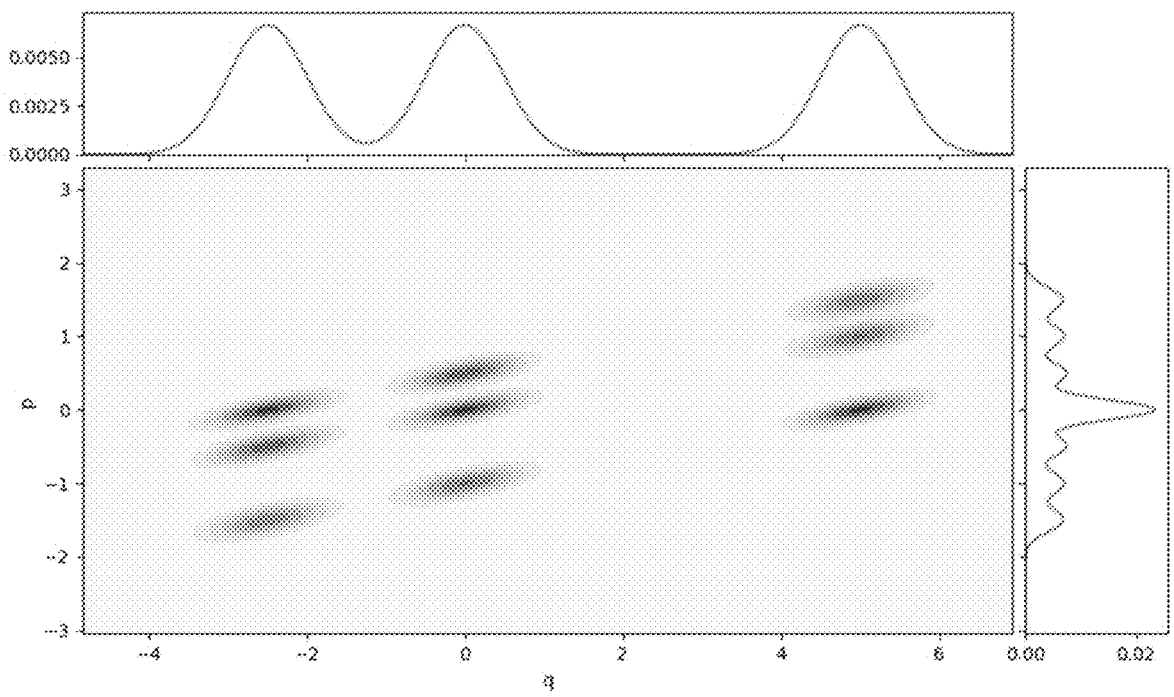

In another example, the robotic device navigates along a long floor (e.g., x-axis, one-dimensional). The processor models the floor using Liouville's equation $$\frac{\partial \rho}{\partial t} = -\{\rho, H\}$$

with Hamiltonian $$H = \frac{1}{2} p^2$$

wherein $q \in [-10, 10]$ and $p \in [-5, 5]$. The floor has three doors at $q_0 = -2.5, q_1 = 0$, and $q_2 = 5.0$ and the processor of the robotic device is capable of determining when it is located at a door based on sensor data observed and the momentum of the robotic device is constant, but unknown. Initially the location of the robotic device is unknown, therefore the processor generates an initial state density such as that in FIG. 19. When the processor determines the robotic device is in front of a door, the possible location of the robotic device is narrowed down, but not the momentum. Therefore, the processor may update the probability density to that shown in FIG. 20. The processor evolves the probability density, and after five seconds the probability is as shown in FIG. 21, wherein the uncertainty in the position space has spread out again given that the momentum is unknown. However, the evolved probability density keeps track of the correlation between position and momentum. When the processor determines the robotic device is in front of a door again, the probability density is updated to FIG. 22, wherein the density has significantly narrowed down, indicating a number of peaks representing possible location and momentum combinations of the robotic device. For the left door, there is equal likelihood for $p=0$, $p=-0.5$, and $p=-1.5$. These momentum values correspond with the robotic device travelling from one of the three doors in five seconds. This is seen for the other two doors as well.

In some embodiments, the processor models motion of the robotic device using equations $\dot{x} = v \cos \cos \omega$, $\dot{y} = v \sin \sin \omega$, and $\dot{\theta} = \omega$, wherein v and $\omega$ are translational and rotational velocities, respectively. In some embodiments, translational and rotational velocities of the robotic device are computed using observed wheel angular velocities $\omega_l$ and $\omega_r$ using $(v\ \omega) = J(\omega_l, \omega_r) = (r_l/2\ r_r/2 - r_l/b\ r_r/b)$, wherein J is the Jacobian, $r_l$ and $r_r$ are the left and right wheel radii, respectively and b is the distance between the two wheels. Assuming there are stochastic forces on the wheel velocities, the processor of the robotic device evolves the probability density $$\rho = (x, y, \theta, \omega_l, \omega_r) \text{ using } \frac{\partial \rho}{\partial t} = -(v \cos \theta\ v \cos \theta \omega) \cdot \nabla_q \rho + \nabla_p \cdot (D \nabla_p \rho)$$

wherein $$D = \frac{1}{2} \sigma_N \sigma_N^T$$

is a 2-by-2 diffusion tensor, $q = (x, y, \theta)$ and $p = (\omega_l, \omega_r)$. In some embodiments, the domain is obtained by choosing x, y in the map of the environment, $\theta \in [0, 2\pi)$, and $\omega_l, \omega_r$ as per the robotic device specifications. In some embodiments, solving the equation may be a challenge given it is five-dimensional. In some embodiments, the model may be reduced by replacing odometry by Gaussian density with mean and variance. This reduces the model to a three-dimensional density $\rho=(x, y, \theta)$. In some embodiments, independent equations may be formed for $\omega_l$, $\omega_r$ by using odometry and inertial measurement unit observations. For example, taking this approach reduces the system to one three-dimensional partial differential equation and two ordinary differential equations. The processor then evolves the probability density over time using $$\frac{\partial \rho}{\partial t} = -(\underline{v} \cos \theta \, \underline{v} \cos \theta \, \underline{\omega}) \cdot \nabla \rho + \nabla \cdot (D \nabla \rho), t > 0$$

wherein D=(dv² θ dv² sin θ cos θ 0 dv² sin θ cos θ dv² θ 0 0 0 dω²), $\underline{v}$, $\underline{\omega}$ represent the current mean velocities, and dv, dω the current deviation. In some embodiments, the processor determines $\underline{v}$, $\underline{\omega}$ from the mean and deviation of the left and right wheel velocities $\omega_L$ and $\omega_R$ using $(\underline{v} \, \underline{\omega})=J(\underline{w}_L \, \underline{\omega}_R)$. In some embodiments, the processor uses Neumann perimeters conditions for x, y and periodic perimeters conditions for θ.

Figure 23:
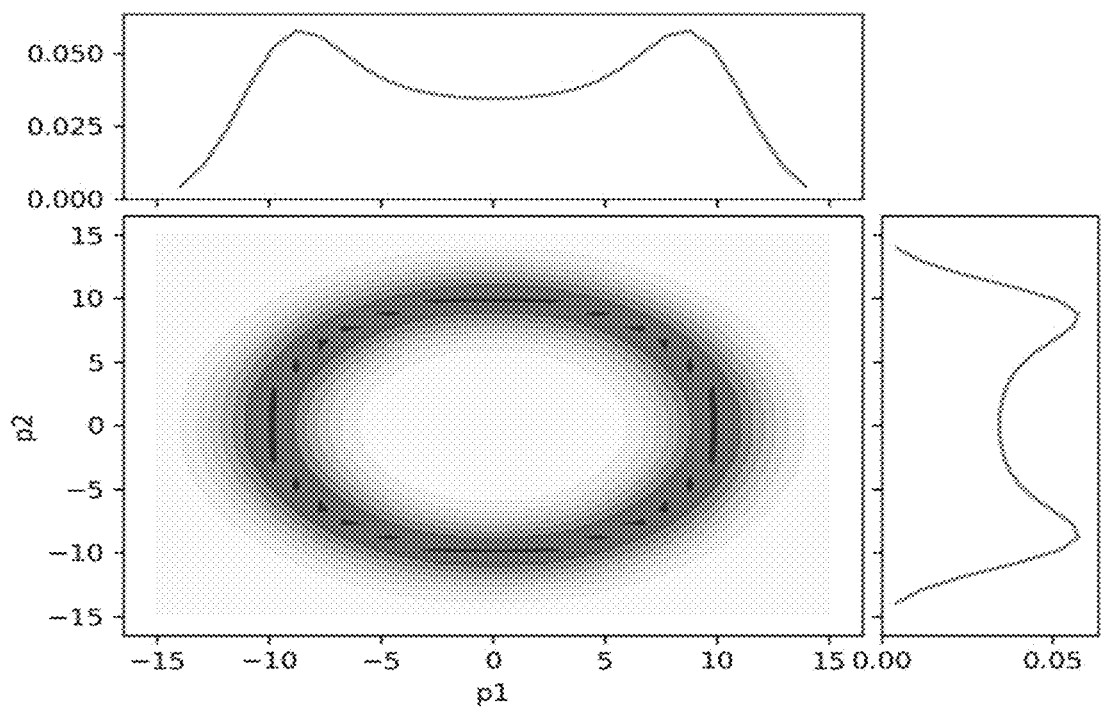
FIG. 23 illustrates an example of a velocity observation probability density, according to some embodiments.
Figure 24:
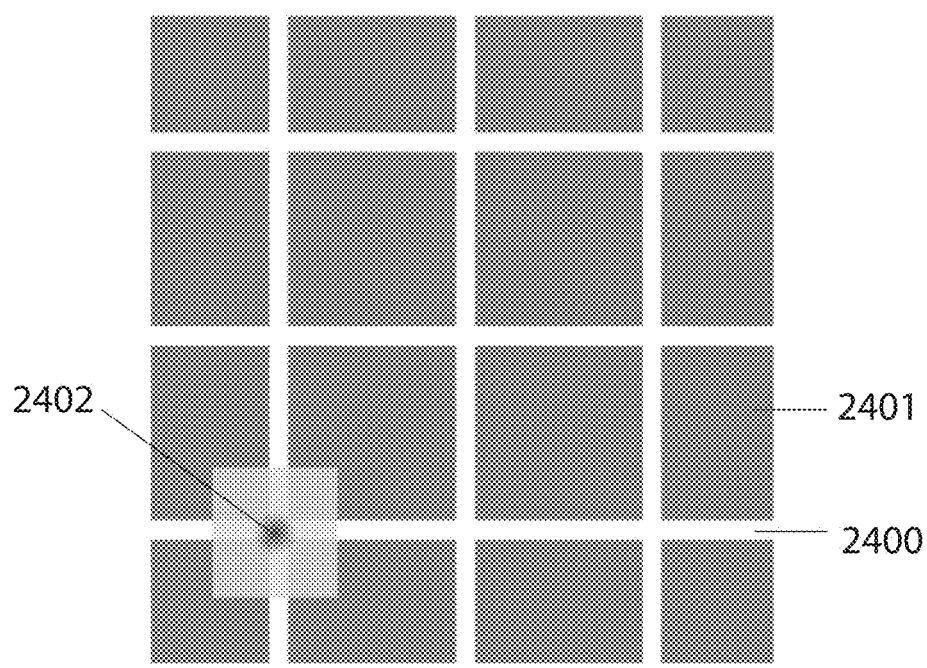
FIG. 24 illustrates an example of a road map, according to some embodiments.

In one example, the processor localizes the robotic device with position coordinate q=(x, y) and momentum coordinate p=($p_x$, $p_y$). For simplification, the mass of the robot is 1.0, the earth is assumed to be planar, and q is a position with reference to some arbitrary point and distance. Thus, the processor evolves the probability density ρ over time according to $$\frac{\partial \rho}{\partial t} = -p \cdot \nabla_q \rho + \nabla_p \cdot (D \nabla_p \rho),$$

wherein D is as defined above. The processor uses a moving grid, wherein the general location of the robot is only known up to a certain accuracy (e.g., 100 m) and the grid is only applied to the known area. The processor moves the grid along as the probability density evolves over time, centering the grid at the approximate center in the q space of the current probability density every couple time units. Given that momentum is constant over time, the processor uses an interval [−15, 15]×[−15, 15], corresponding to maximum speed of 15 m/s in each spatial direction. The processor uses velocity and GPS position observations to increase accuracy of approximated localization of the robotic device. Velocity measurements provide no information on position, but provide information on $p_x^2+p_y^2$, the circular probability distribution in the p space, as illustrated in FIG. 23 with |p|=10 and large uncertainty. GPS position measurements provide no direct momentum information but provides a position density. The processor further uses a map to exclude impossible states of the robot. For instance, it is impossible to drive through walls and if the velocity is high there is a higher likelihood that the robot is in specific areas. FIG. 24 illustrates a map used by the processor in this example, wherein white areas 2400 indicate low obstacle density areas and gray areas 2401 indicate high obstacle density areas and the maximum off speed in high obstacle density areas is ±5 m/s. Position 2402 is the current probability density collapsed to the $q_1$, $q_2$ space. In combining the map information with the velocity observations, the processor determines that it is highly unlikely that with an odometry measurement of |p|=10 that the robot is in a position with high obstacle density. In some embodiments, other types of information may be used to improve accuracy of localization. For example, a map to correlate position and velocity, distance to and probability density of other robots using similar technology, Wi-Fi map to extract position, and video footage to extract position.

In some embodiments, the processor uses finite differences methods (FDM) to numerically approximate partial differential equations of the form $$\frac{\partial \rho}{\partial t} = -\{\rho, H\} + \nabla_p \cdot (D \nabla_p \rho).$$

Numerical approximation has two components, discretization in space and in time. The finite difference method relies on discretizing a function on a uniform grid. Derivatives are then approximated by difference equations. For example, a convection-diffusion equation in one dimension and u(x, t) with velocity v, diffusion coefficient a, $$\frac{\partial u}{\partial t} = a \frac{\partial^2 u}{\partial x^2} - v \frac{\partial u}{\partial x}$$

on a mesh $x_0, \ldots, x_J$, and times $t_0, \ldots, t_N$ may be approximated by a recurrence equation of the form $$\frac{u_j^{n+1} - u_j^n}{k} = a \frac{u_{j+1}^n - 2u_j^n + u_{j-1}^n}{h^2} - v \frac{u_{j+1}^n - u_{j-1}^n}{2h}$$

with space grid size h and time step k and $u_j^n \approx u(x_j, t_n)$. The left hand side of the recurrence equation is a forward difference at time ty, and the right hand side is a second-order central difference and a first-order central difference for the space derivatives at $x_j$, wherein $$\frac{u_j^{n+1} - u_j^n}{k} \approx \frac{\partial u(x_j, t_n)}{\partial t}, \frac{u_{j+1}^n - 2u_j^n + u_{j-1}^n}{h^2} \approx \frac{\partial^2 u(x_j, t_n)}{\partial x^2}, \text{ and}$$

$$\frac{u_{j+1}^n - u_{j-1}^n}{2h} \approx \frac{\partial u(x_j, t_n)}{\partial x}.$$

This is an explicit method, since the processor may obtain the new approximation $u_j^{n+1}$ without solving any equations. This method is known to be stable for $$h < \frac{2a}{v} \text{ and } k < \frac{h^2}{2a}.$$

The stability conditions place limitations on the time step size k which may be a limitation of the explicit method scheme. If instead the processor uses a central difference at time $t_{n+1/2}$, the recurrence equation is $$\frac{u_j^{n+1} - u_j^n}{k} = \frac{1}{2} \left( a \frac{u_{j+1}^{n+1} - 2u_j^{n+1} + u_{j-1}^{n+1}}{h^2} - v \frac{u_{j+1}^{n+1} - u_{j-1}^{n+1}}{2h} + a \frac{u_{j+1}^n - 2u_j^n + u_{j-1}^n}{h^2} - v \frac{u_{j+1}^n - u_{j-1}^n}{2h} \right),$$

know as the Crank-Nicolson method. The processor obtains the new approximation $u_j^{n+1}$ by solving a system of linear equations, thus, the method is implicit and is numerically stable if $$k < \frac{h^2}{a}.$$

In a similar manner, the processor may use a backward difference in time, obtaining a different implicit method $$\frac{u_j^{n+1} - u_j^n}{k} = a \frac{u_{j+1}^{n+1} - 2u_j^{n+1} + u_{j-1}^{n+1}}{h^2} - v \frac{u_{j+1}^{n+1} - u_{j-1}^{n+1}}{2h},$$

which is unconditionally stable for an time step, however, the truncation error may be large. While both implicit methods are less restrictive in terms of time step size, they usually require more computational power as they require solving a system of linear equations at each time step. Further, since the difference equations are based on a uniform grid, the finite difference method places limitations on the shape of the domain.

In some embodiments, the processor uses finite element methods (FEM) to numerically approximate partial differential equations of the form $$\frac{\partial \rho}{\partial t} = -\{\rho, H\} + \nabla_p \cdot (D \nabla_p \rho).$$

In general, the finite element method formulation of the problem results in a system of algebraic equations. This yields approximate values of the unknowns at discrete number of points over the domain. To solve the problem, it subdivides a large problem into smaller, simpler parts that are called finite elements. The simple equations that model these finite elements are then assembled into a larger system of equations that models the entire problem. The method involves constructing a mesh or triangulation of the domain, finding a weak formulation of the partial differential equation (i.e., integration by parts and Green's identity), and deciding for solution space (e.g., piecewise linear on mesh elements). This leads to a discretized version in form of a linear equation. Some advantages over finite differences method includes complicated geometries, more choice in approximation leads, and, in general, to a higher quality of approximation. For example, the processor uses the partial differential equation $$\frac{\partial \rho}{\partial t} = L\rho,$$

with differential operator, e.g., $L=-\{\cdot, H\}+\nabla_p \cdot (D\nabla_p)$. The processor discretizes the abstract equation in space (e.g., by FEM or $$FDM) \frac{\partial \underline{\rho}}{\partial t} = \underline{L}\underline{\rho},$$

wherein $\underline{\rho}$, $\underline{L}$ are the projections of $\rho$, $L$ on the discretized space. The processor discretizes the equation in time using a numerical time integrator (e.g., Crank-Nicolson)

$$\frac{\underline{\rho}^{-n+1} - \underline{\rho}^{-n}}{h} = \frac{1}{2}(\underline{L}\underline{\rho}^{-n+1} + \underline{L}\underline{\rho}^{-n}),$$

leading to the equation $$\left(I - \frac{h}{2}\underline{L}\right)\underline{\rho}^{-n+1} = \left(I + \frac{h}{2}\underline{L}\right)\underline{\rho}^{-n},$$

which the processor solves. In a fully discretized system, this is a linear equation. Depending on the space and discretization, this will be a banded, sparse matrix. In some embodiments, the processor employs alternating direction implicit (ADI) splitting to ease the solving process. In FEM, the processor may discretize the space using a mesh, construct a weak formulation involving a test space, and solve its variational form. In FDM, the processor discretizes the derivatives using differences on a lattice grid of the domain. In some instances, the processor may implement FEM/FDM with backward differential formulation (BDF)/Radau (Marlis recommendation), for example mesh generation then construct and solve variational problem with backwards Euler. In other instances, the processor implements FDM with ADI, resulting in a banded, tri-diagonal, symmetric, linear system. The processor may use an upwind scheme if Peclet number (i.e., ratio advection to diffusion) is larger than 2 or smaller than −2.

Perimeters conditions are essential in solving the partial differential equations. Perimeters conditions are a set of constraints that determine what happens at the perimeters of the domain while the partial differential equation describe the behaviour within the domain. In some embodiments, the processor uses one or more the following perimeters conditions: reflecting, zero-flux (i.e., homogenous Neumann perimeters conditions)

$$\frac{\partial \rho}{\partial \vec{n}} = 0 \text{ for } p, q \in \partial D, \vec{n}$$

unit normal vector on perimeters; absorbing perimeters conditions (i.e., homogenous Dirichlet perimeters conditions) $\rho=0$ for p, $q \in \partial D$; and constant concentration perimeters conditions (i.e., Dirichlet) $\rho=\rho_0$ for p, $q \in \partial D$. To integrate the perimeters conditions into FDM, the processor modifies the difference equations on the perimeters, and when using FEM, they become part of the weak form (i.e., integration by parts) or are integrated in the solution space. In some embodiments, the processor uses Fenics for an efficient solution to partial differential equations.

In some embodiments, the processor uses quantum mechanics to localize the robotic device. In some embodiments, the processor of the robotic device may determine a probability density over all possible states of the robotic device using a complex-valued wave function for a single-particle system $\Psi(\vec{r}, t)$, wherein $\vec{r}$ may be a vector of space coordinates. In some embodiments, the wave function $\Psi(\vec{r}, t)$ is proportional to the probability density that the particle will be found at a position $\vec{r}$, i.e. $\rho(\vec{r}, t)=|\Psi(\vec{r}, t)|^2$. In some embodiments, the processor of the robotic device normalizes the wave function which is equal to the total probability of finding the particle, or in this case the robotic device, somewhere. The total probability of finding the robotic device somewhere adds up to unity $\int |\Psi(\vec{r}, t)|^2 dr = 1$. In some embodiments, the processor of the robotic device may apply Fourier transform to the wave function $\Psi(\vec{r}, t)$ to yield the wave function $\Phi(\vec{p}, t)$ in the momentum space, with associated momentum probability distribution $\sigma(\vec{p}, t) = \Phi|(\vec{p}, t)|^2$. In some embodiments, the processor may evolve the wave function $\Psi(\vec{r}, t)$ using Schrödinger equation $$i\hbar \frac{\partial}{\partial t} \Psi(\vec{r}, t) = \left[-\frac{\hbar^2}{2m}\nabla^2 + V(\vec{r})\right]\Psi(\vec{r}, t),$$

wherein the bracketed object is the Hamilton operator $$\hat{H} = -\frac{\hbar^2}{2m}\nabla^2 + V(\vec{r}),$$

i is the imaginary unit, $\hbar$ is the reduced Planck constant, $\nabla^2$ is the Laplacian, and $V(\vec{r})$ is the potential. An operator is a generalization of the concept of a function and transforms one function into another function. For example, the momentum operator $\hat{p} = -i\hbar\nabla$ and that is why $$-\frac{\hbar^2}{2m}\nabla^2$$

corresponds to kinetic energy. The Hamiltonian function $$H = \frac{p^2}{2m} + V(\vec{r})$$

has corresponding Hamilton operator $$\hat{H} = -\frac{\hbar^2}{2m}\nabla^2 + V(\vec{r}).$$

For conservative systems (constant energy), the time-dependent factor may be separated from the wave function $$\left(\text{e.g., } \Psi(\vec{r}, t) = \Phi(\vec{r})e^{-\frac{iEt}{\hbar}},\right.$$

giving the time-independent Schrodinger equation $$\left[-\frac{\hbar^2}{2m}\nabla^2 + V(\vec{r})\right]\Phi(\vec{r}) = E\Phi(\vec{r}),$$

or otherwise $\hat{H}\Phi = E\Phi$, an eigenvalue equation with eigenfunctions and eigenvalues. The eigenvalue equation provides a basis given by the eigenfunctions $\{\varphi\}$ of the Hamiltonian. Therefore, in some embodiments, the wave function is given by $\Psi(\vec{r}, t) = \Sigma_k c_k(t)\varphi_k(\vec{r})$, corresponding to expressing the wave function in the basis given by energy eigenfunctions. Substituting this equation into the Schrodinger equation, $c_k(t) =$ $$c_k(0)e^{-\frac{iE_k t}{\hbar}}$$

wherein $E_k$ is the eigen-energy to the eigenfunction $\varphi_k$. For example, the probability of measuring a certain energy $E_k$ at time t is given by the coefficient of the eigenfunction $\varphi_k$, $$|c_k(t)|^2 = \left|c_k(0)e^{-\frac{iE_k t}{\hbar}}\right|^2 = |c_k(0)|^2.$$

Thus, the probability for measuring the given energy is constant over time. However, this is only true for the energy eigenvalues, not for other observables. Instead, the probability of finding the system at a certain position $\rho(\vec{r}) = |\Psi(\vec{r}, t)|^2$ may be used.

The wave function $\psi$ is an element of a complex Hilbert space H, which is a complete inner product space. Every physical property is associated with a linear, Hermitian operator acting on that Hilbert space. A wave function, or quantum state, may be regarded as an abstract vector in a Hilbert space. In some embodiments, $\psi$ is denoted by the symbol $|\psi\rangle$ (i.e., ket), and correspondingly, the complex conjugate $\phi^*$ is denoted by $\langle |$ (i.e., bra). The integral over the product of two functions is analogous to an inner product of abstract vectors, $\int \phi^* \psi d\tau = \langle \phi | . | \psi \rangle \equiv \phi|\psi\rangle$. In some embodiments, $\langle \phi|$ and $|\phi\rangle$ are state vectors of a system and the processor determines the probability of finding $\langle \phi |$ in state $|\Psi\rangle$ using $p(\langle \phi|, |\psi\rangle) = |\langle \phi|\Psi\rangle|^2$. For a Hermitian operator $\hat{A}$ eigenkets and eigenvalues are denoted $A|n\rangle = a_n|n\rangle$, wherein $|n\rangle$ is the eigenket associated with the eigenvalue $a_n$. For a Hermitian operator, eigenvalues are real numbers, eigenkets corresponding to different eigenvalues are orthogonal, eigenvalues associated with eigenkets are the same as the eigenvalues associated with eigenbras, i.e. $\langle n|A = \langle n|a_n$. For every physical property (energy, position, momentum, angular momentum, etc.) there exists an associated linear, Hermitian operator $\hat{A}$ (called am observable) which acts on the Hilbert space H. Given A has eigenvalues $a_n$ and eigenvectors $|n\rangle$, and a system in state $|\phi\rangle$, the processor determines the probability of obtaining $a_n$ as an outcome of a measurement of A using $p(a_n) = |\langle n|\phi\rangle|^2$. In some embodiments, the processor evolves the time-dependent Schrodinger equation using $$i\hbar \frac{\partial |\psi\rangle}{\partial t} = \hat{H}|\psi\rangle.$$

Given a state $|\phi\rangle$ and a measurement of the observable A, the processor determines the expectation value of A using $\langle A \rangle = \langle \phi|A|\phi\rangle$, corresponding to $$\langle A \rangle = \frac{\int \phi^* \hat{A} \phi d\tau}{\int \phi^* \phi d\tau}$$

for observation operator $\hat{A}$ and wave function $\phi$. In some embodiments, the processor updates the wave function when observing some observable by collapsing the wave function to the eigenfunctions, or eigenspace, corresponding to the observed eigenvalue.

As described above, for localization of the robotic device, the processor evolves the wave function $\Psi(\vec{r}, t)$ using the Schrödinger equation $$i\hbar \frac{\partial}{\partial t} \Psi(\vec{r}, t) = \left[ -\frac{\hbar^2}{2m} \nabla^2 + V(\vec{r}) \right] \Psi(\vec{r}, t).$$

In some embodiments, a solution is written in terms of eigenfunctions $\psi_n$ with eigenvalues $E_n$ of the time-independent Schrödinger equation $H\psi_n = E_n \psi_n$, wherein $\Psi(\vec{r}, t) = \Sigma_{c_n} c_n e^{-iE_n t/\hbar} \psi_n$ and $c_n = \int \Psi(\vec{r}, 0) \psi^*_n d\vec{r}$. In some embodiments, the time evolution is expressed as a time evolution via a unitary operator $U(t)$, $\Psi(\vec{r}, t) = U(t) \Psi(\vec{r}, 0)$ wherein $U(t) = e^{-iHt/\hbar}$. In some embodiments, the probability density of the Hilbert space may be updated by the processor of the robotic device each time an observation or measurement is received by the processor of the robotic device. For each observation with observation operator A the processor of the robotic device may perform an eigen-decomposition $A\omega_n = a_n \omega_n$, wherein the eigenvalue corresponds to the observed quantity. In some embodiments, the processor observes a value a with probability $0 \leq p \leq 1$. In some embodiments, wherein the operator has a finite spectrum or a single eigenvalue is observed, the processor of the robotic device may collapse to the eigenfunction(s) with corresponding probability $$\Psi(\vec{r}, t) \rightarrow \gamma \sum_{n=1}^{N} p(a_n) d_n \omega_n,$$

wherein $d_n = \int \omega^*_n \Psi d\vec{r}$, $p(a)$ is the probability of observing value a, and $\gamma$ is a normalization constant. In some embodiments, wherein the operator has continuous spectrum, the summation may be replaced by an integration $\Psi(\vec{r}, t) \rightarrow \gamma \int p(a) d_n \omega_n da$, wherein $d_n = \int \omega^*_n d\vec{r}$.

For example, consider a robotic device confined to move within an interval $$\left[ -\frac{1}{2}, \frac{1}{2} \right].$$

For simplicity, the processor sets $\hbar = m = 1$, and an infinite well potential and the regular kinetic energy term are assumed. The processor solves the time-independent Schrödinger equations, resulting in wave functions $$\psi_n = \left\{ \sqrt{2} \sin \sin \left( k_n \left( x - \frac{1}{2} \right) \right) e^{-i\omega_n t}, -\frac{1}{2} < x < \frac{1}{2} \right\} 0,$$

otherwise, wherein $k_n = n\pi$ and $E_n = \omega_n = n^2 \pi^2$. In the momentum space this corresponds to the wave functions $$\phi_n(p, t) = \frac{1}{\sqrt{2\pi}} \int_{-\infty}^{\infty} \psi_n(x, t) e^{-ipx} dx = \frac{1}{\sqrt{\pi}} \frac{n\pi}{n\pi + p} \mathrm{sinc}\left( \frac{1}{2}(n\pi - p) \right).$$

The processor takes suitable functions and computes an expansion in eigenfunctions. Given a vector of coefficients, the processor computes the time evolution of that wave function in eigenbasis. In another example, consider a robotic device free to move on an x-axis. For simplicity, the processor sets $\hbar = m = 1$. The processor solves the time-independent Schrodinger equations, resulting in wave functions $$\psi_E(x, t) = A e^{\frac{i(px - Et)}{\hbar}},$$

wherein energy $$E = \frac{\hbar^2 k^2}{2m}$$

and momentum $p = \hbar k$. For energy E there are two independent, valid functions with $\pm p$. Given the wave function in the position space, in the momentum space, the corresponding wave functions are $$\phi_E(p, t) = e^{\frac{i(px - Et)}{\hbar}},$$

which are the same as the energy eigenfunctions. For a given initial wave function $\psi(x, 0)$, the processor expands the wave function into momentum/energy eigenfunctions $$\phi(p) = \frac{1}{\sqrt{2\pi\hbar}} \int \psi(x, 0) e^{-\frac{ipx}{\hbar}} dx,$$

then the processor gets time dependence by taking the inverse Fourier resulting in $$\psi(x, t) = \frac{1}{\sqrt{2\pi\hbar}} \int \phi(p) e^{\frac{ipx}{\hbar}} e^{-\frac{iEt}{\hbar}} dp.$$

An example of a common type of initial wave function is a Gaussian wave packet, consisting of a momentum eigenfunctions multiplied by a Gaussian in position space $$\psi(x) = A e^{-\left(\frac{x}{a}\right)^2} e^{\frac{ip_0 x}{\hbar}},$$

wherein $p_0$ is the wave function's average momentum value and a is a rough measure of the width of the packet. In the momentum space, this wave function has the form $$\phi(p) = B e^{-\left(\frac{a(p - p_0)}{2\hbar}\right)^2},$$

which is a Gaussian function of momentum, centered on $p_0$ with approximate width $$\frac{2\hbar}{a}.$$

Figure 25A:
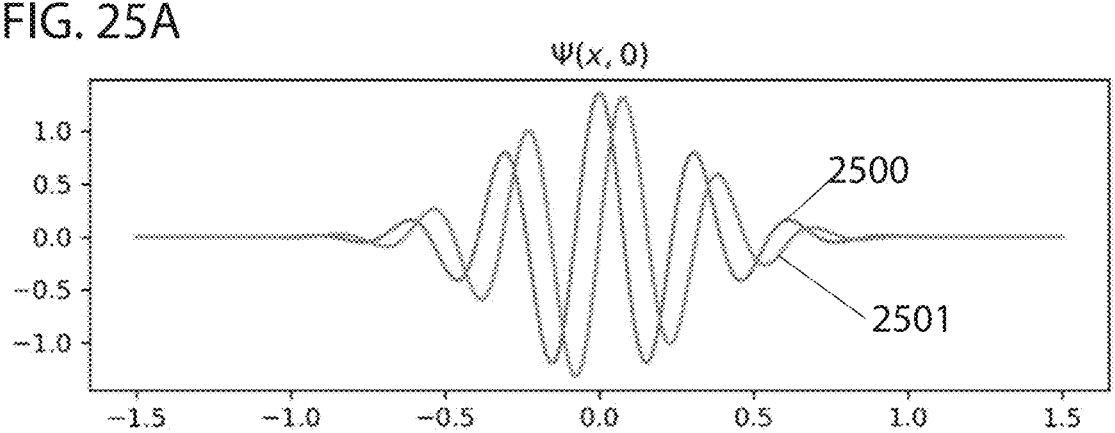
FIGS. 25A-25D illustrate an example of a wave packet, according to some embodiments.
Figure 25B:
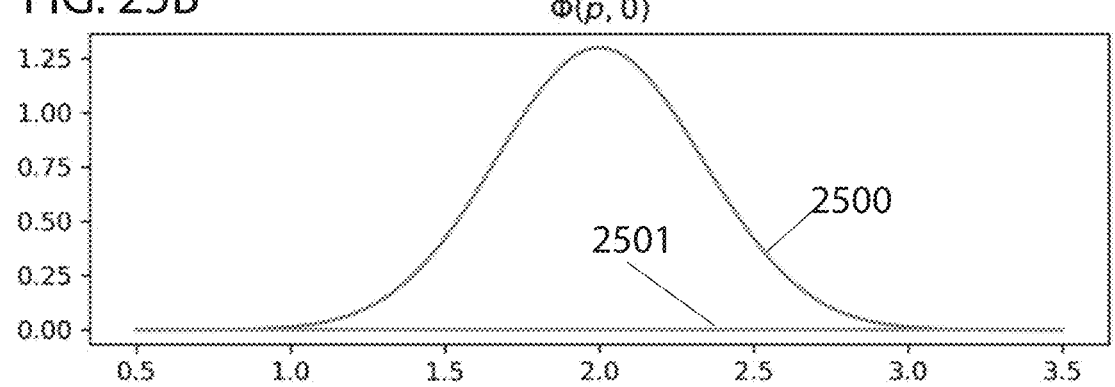
Figure 25C:
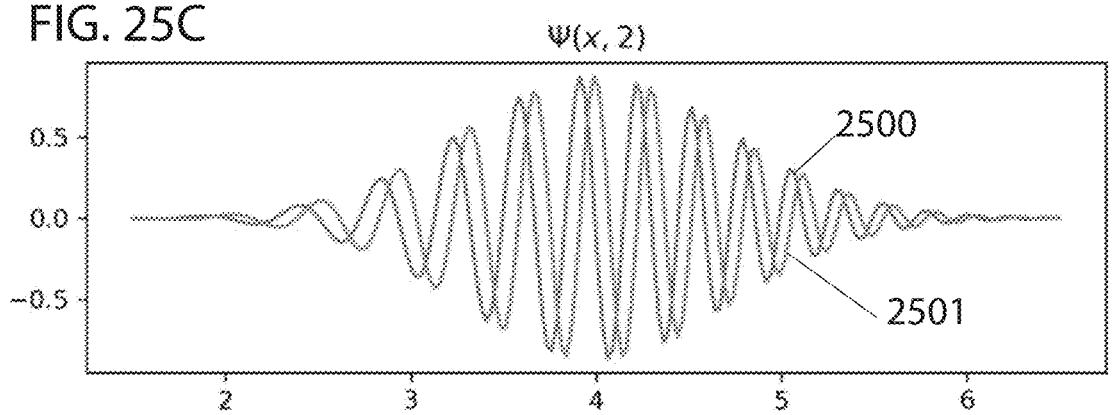
Figure 25D:
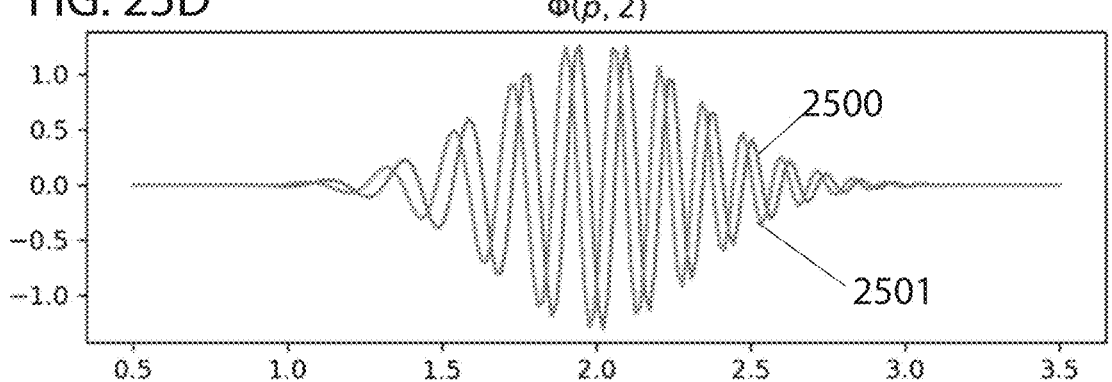
Figure 28A:
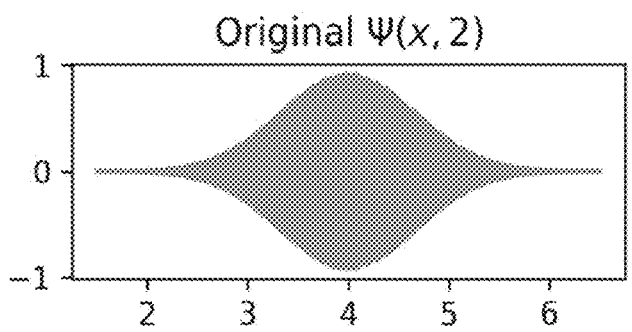
FIGS. 28A-28E illustrate an example of evolution of a wave function in a position and momentum space with observed momentum, according to some embodiments.
Figure 28B:
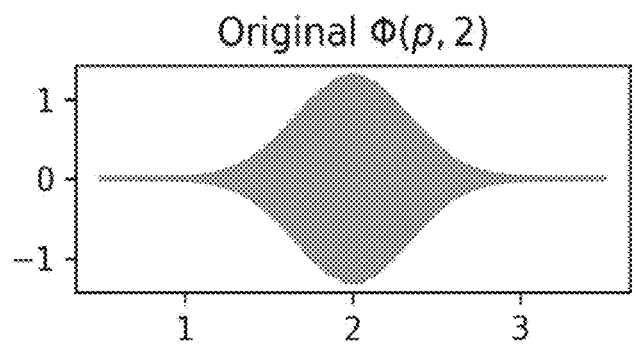
Figure 28C:
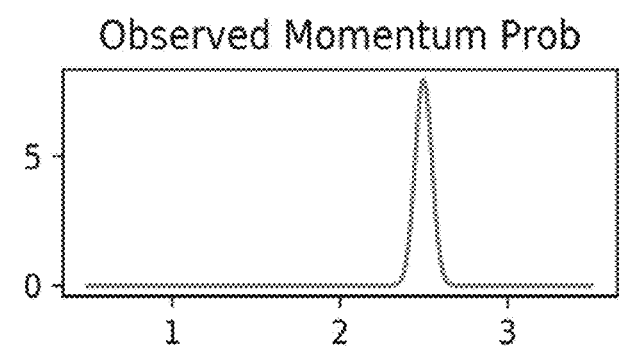
Figure 28D:
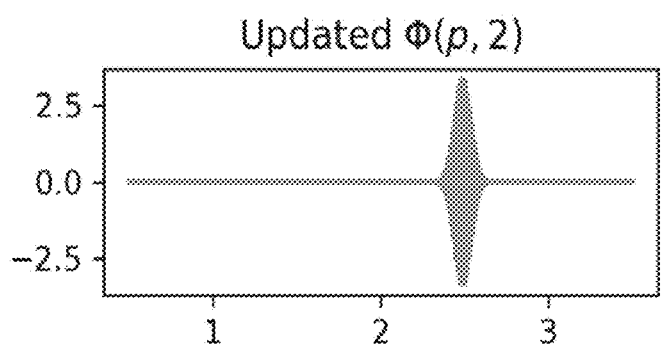
Figure 28E:
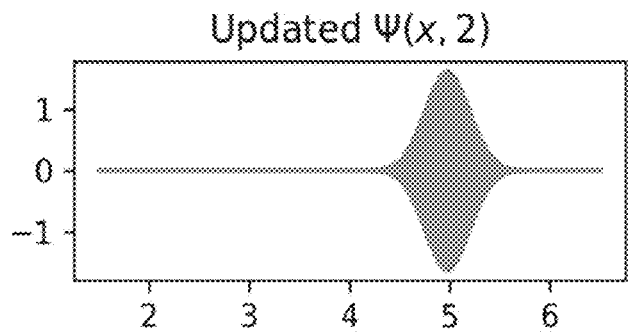
Figure 29A:
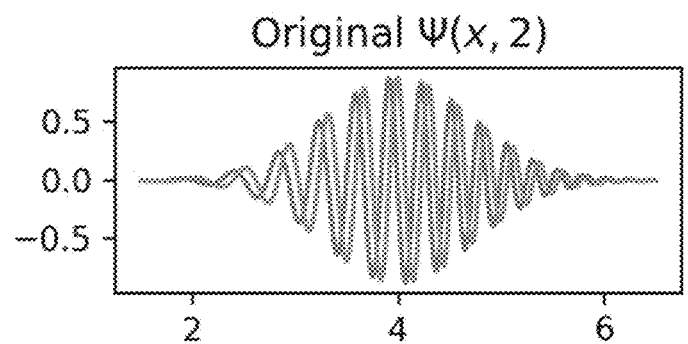
FIGS. 29A-29E illustrate an example of evolution of a wave function in a position and momentum space with observed momentum, according to some embodiments.
Figure 29B:
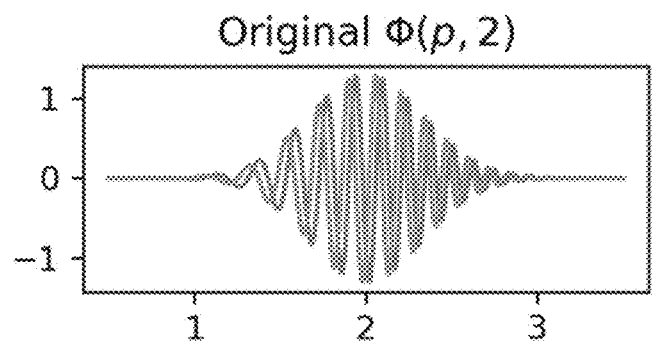
Figure 29C:
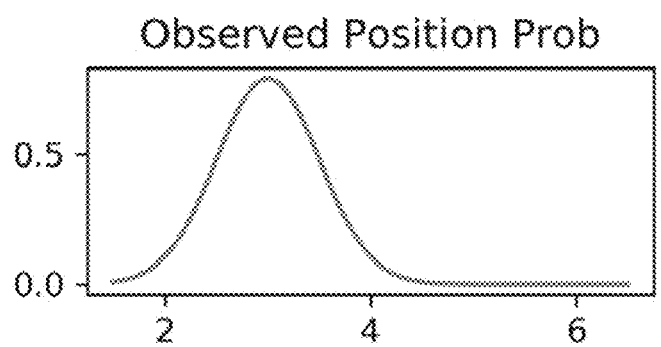
Figure 29D:
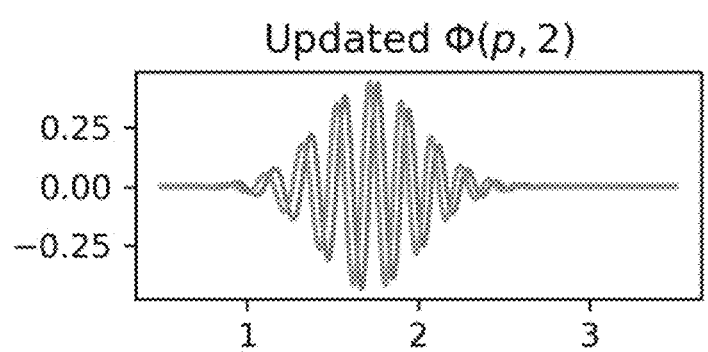
Figure 29E:
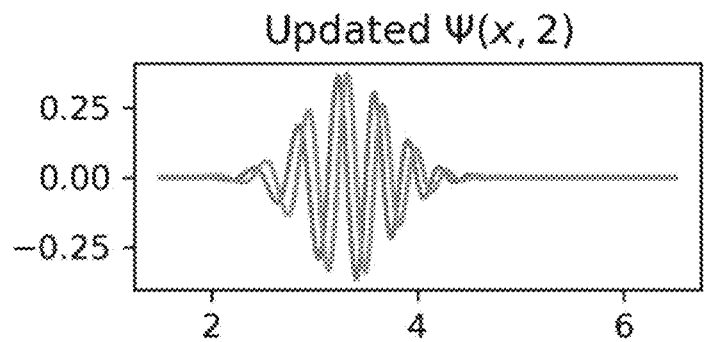

Note Heisenberg's uncertainty principle wherein in the position space width is ~a, and in the momentum space is ~1/a. FIGS. 25A and 25B illustrate an example of a wave packet at a first time point for ψ(x) and φ(p), respectively, with $x_0$, $p_0$=0, 2, $\hbar$=0.1, m=1, and a=3. 2500 are real parts and 2501 are imaginary parts. As time passes, the peak moves with constant velocity $$\frac{p_o}{m}$$

and the width of the wave packet in the position space increases. This happens because the different momentum components of the packet move with different velocities. In the momentum space, the probability density $|\phi(p, t)|^2$ stays constant over time. See FIGS. 25C and 25D for the same wave packet at time t=2.

When modeling the robotic device using quantum physics, and the processor observes some observable, the processor collapses the wave function to the subspace of the observation. For example, consider the case wherein the processor observes the momentum of a wave packet. The processor expresses the uncertainty of the measurement by a function $f(p)$ (i.e., the probability that the system has momentum p), wherein $f$ is normalized. The probability distribution of momentum in this example is given by a Gaussian distribution centered around p=2.5 with σ=0.05, a strong assumption that the momentum is 2.5. Since the observation operator is the momentum operators, the wave function expressed in terms of the eigenfunctions of the observation operator is φ(p, t). The processor projects φ(p, t) into the observation space with probability $f$ by determining $\tilde{\phi}(p, t)=f(p)\phi(p, t)$. The processor normalizes the updated $\tilde{\phi}$ and takes the inverse Fourier transform to obtain the wave function in the position space. FIGS. 26A, 26B, 26C, 26D, and 26E illustrate the initial wave function in the position space ψ(x), the initial wave function in the momentum space φ(p), the observation density in the momentum space, the updated wave function in the momentum space $\tilde{\phi}(p, t)$ after the observation, and the wave function in the position space ψ(x) after observing the momentum, respectively, at time t=2, with $x_0$, $p_0$=0, 2, $\hbar$=0.1, m=1, and a=3. Note that in each figure the darker plots are the real parts while the lighter plots are the imaginary parts. The resulting wave function in the position space (FIG. 26D) may be unexpected after observing a very narrow momentum density (FIG. 26C) as it concludes that the position must have spread further out from the original wave function in the position space (FIG. 26A). This effect is due to Heisenberg's uncertainty principle. With decreasing h this effect diminishes, as can be seen in FIGS. 27A-27E and FIGS. 28A-28E, illustrating the same as FIGS. 26A-26E but with $\hbar$=0.05 and $\hbar$=0.001, respectively. Similar to observing momentum, position may also be observed and incorporated as illustrated in FIGS. 29A-29E which illustrate the initial wave function in the position space ψ(x), the initial wave function in the momentum space φ(p), the observation density in the position space, the updated wave function in the momentum space $\tilde{\phi}(x, t)$ after the observation, and the wave function in the position space ψ(p) after observing the position, respectively, at time t=2, with $x_0$, $p_0$=0, 2, $\hbar$=0.1, m=1, and a=3.

Figure 30A:
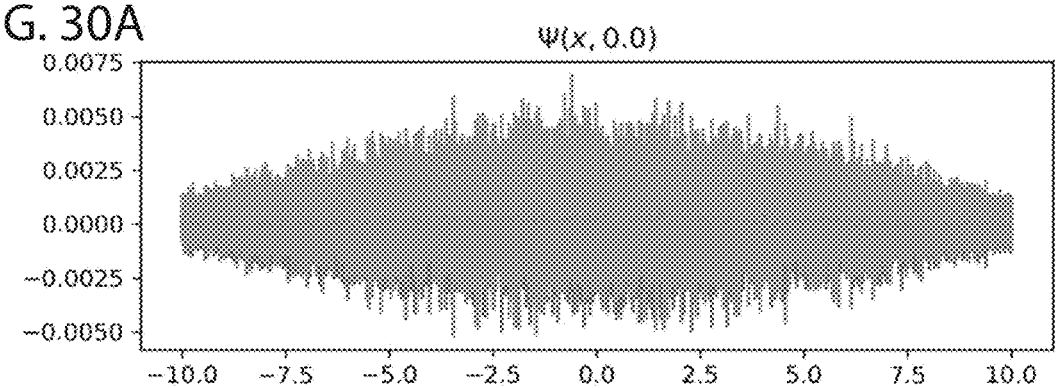
FIGS. 30A and 30B illustrate an example of an initial wave function of a state of a robotic device, according to some embodiments.
Figure 30B:
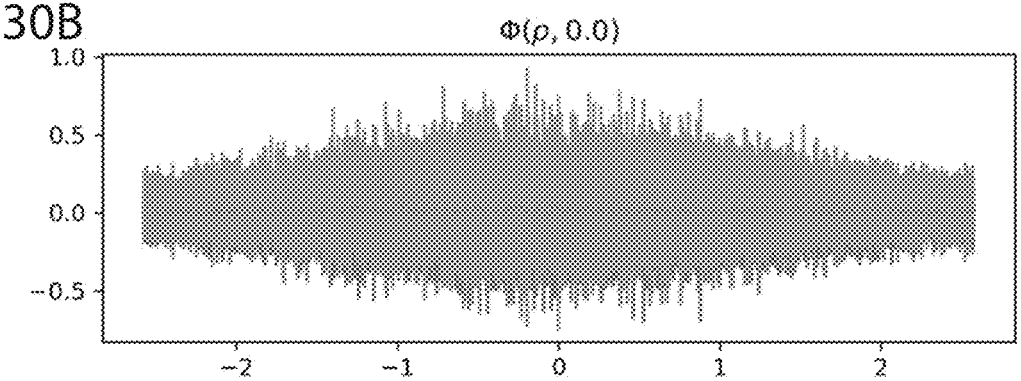
Figure 31A:
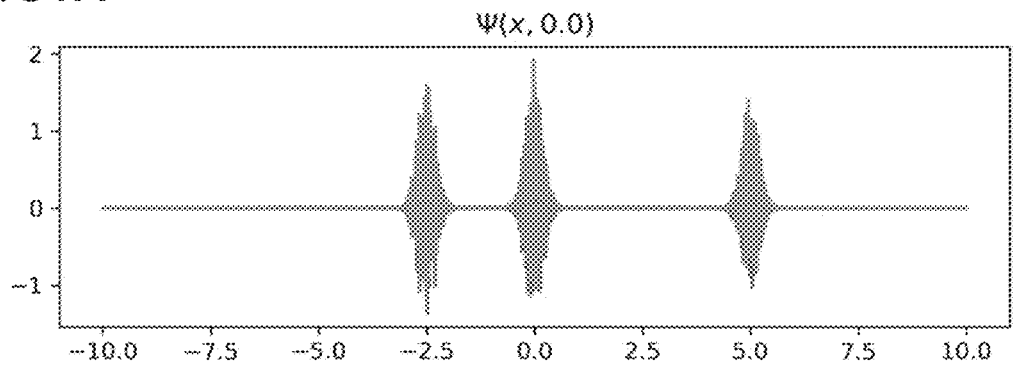
FIGS. 31A and 31B illustrate an example of a wave function of a state of a robotic device after observations, according to some embodiments.
Figure 31B:
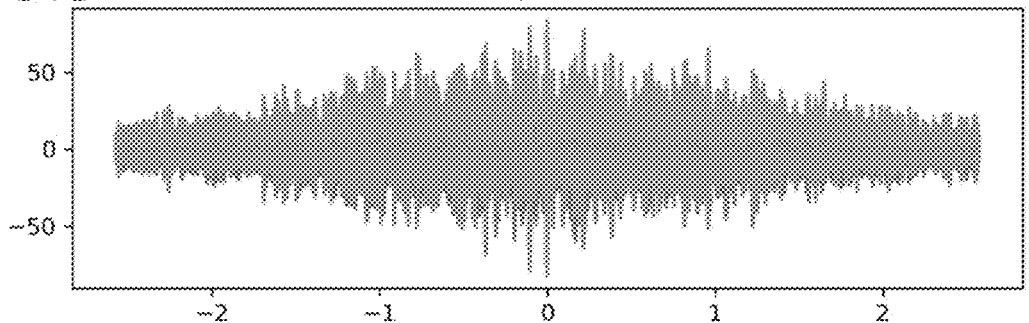
Figure 32A:
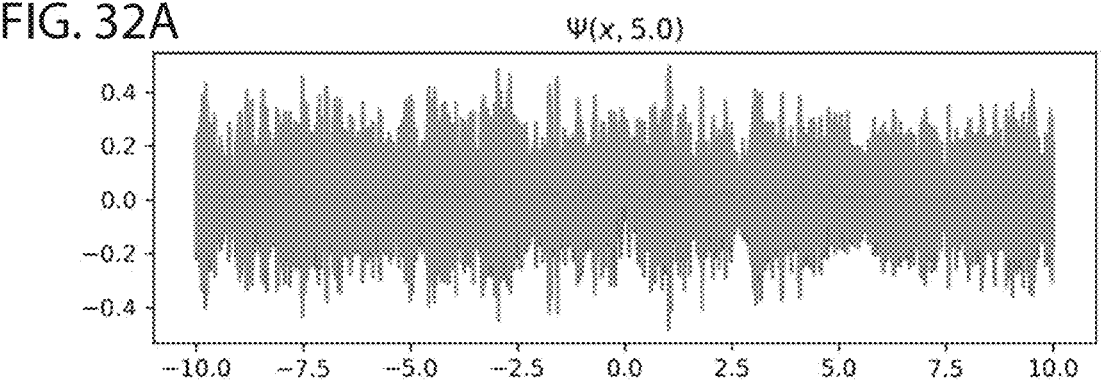
FIGS. 32A and 32B illustrate an example of an evolved wave function of a state of a robotic device, according to some embodiments.
Figure 32B:
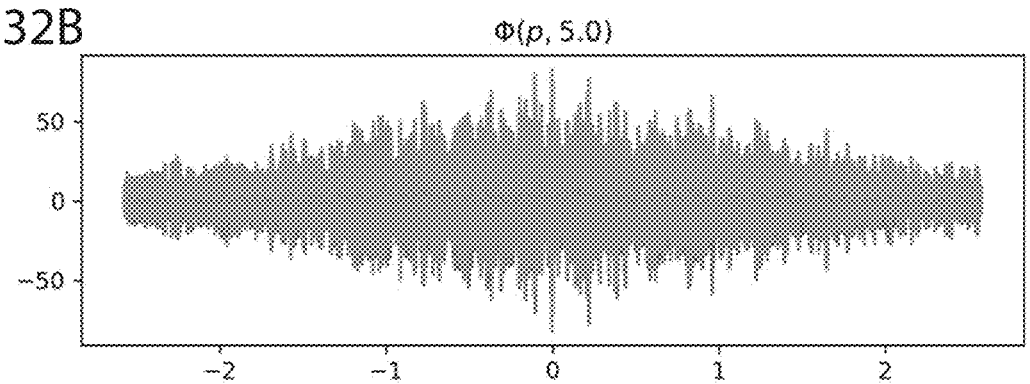
Figure 33A:
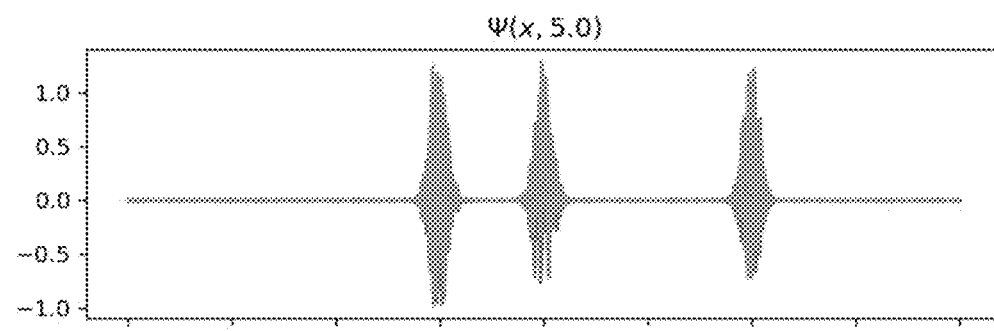
Figure 33B:
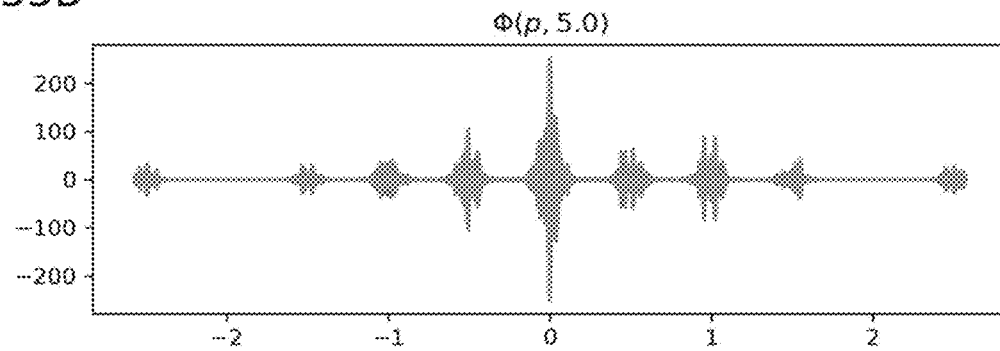
Figure 34A:
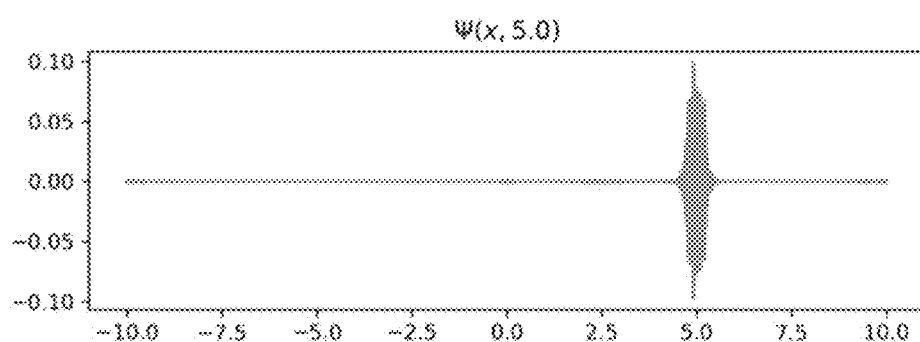
Figure 34B:
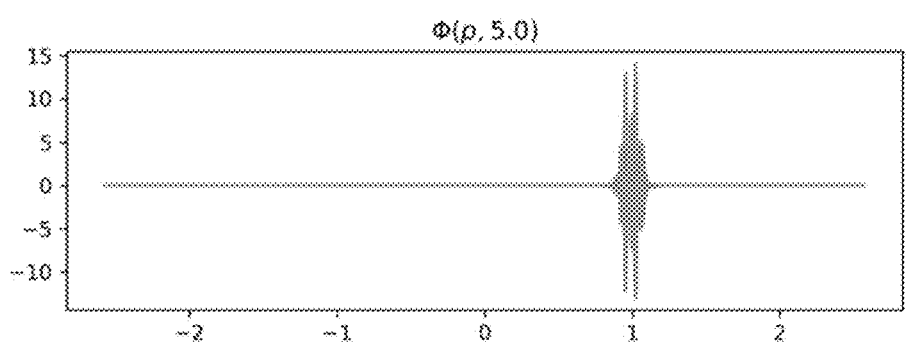
Figure 34C:
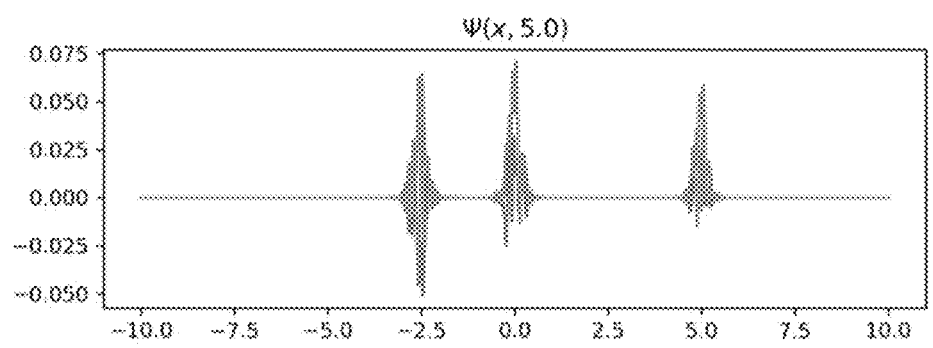
Figure 34D:
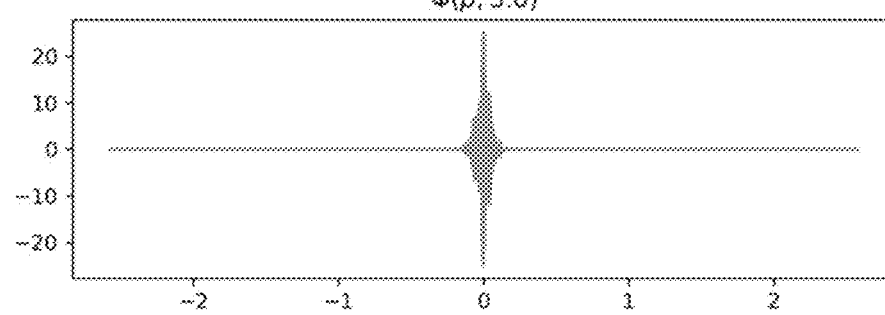
Figure 34E:
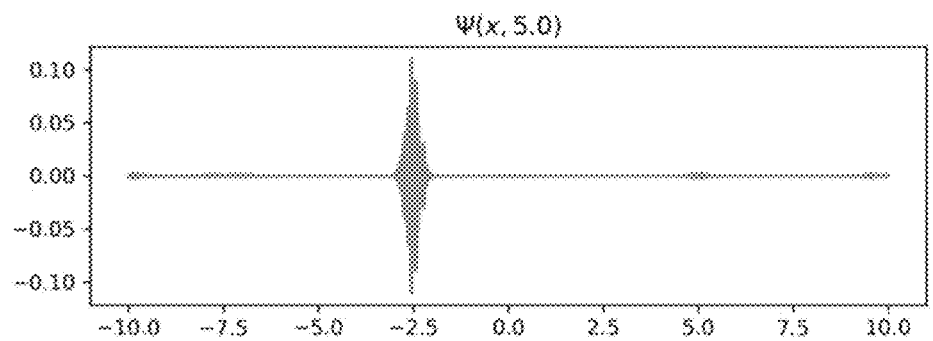
Figure 34F:
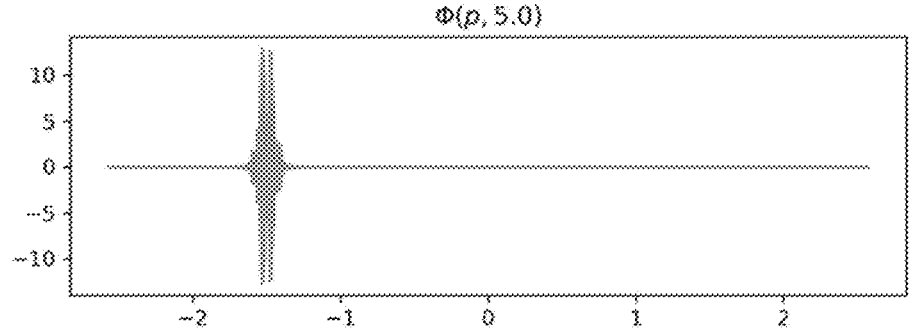
Figure 34G:
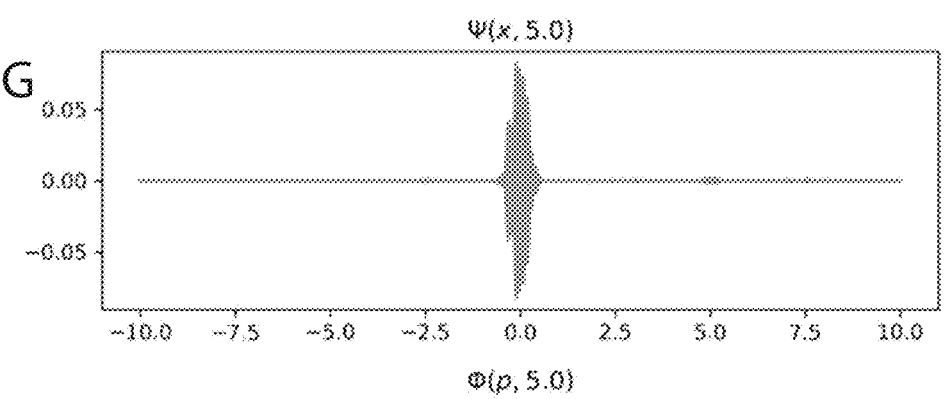
Figure 34H:
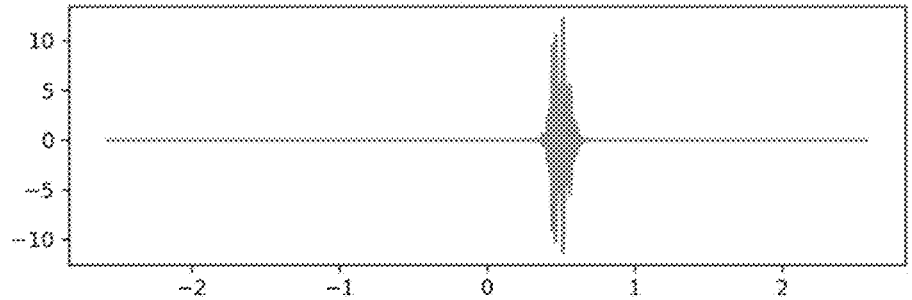
Figure 35A:
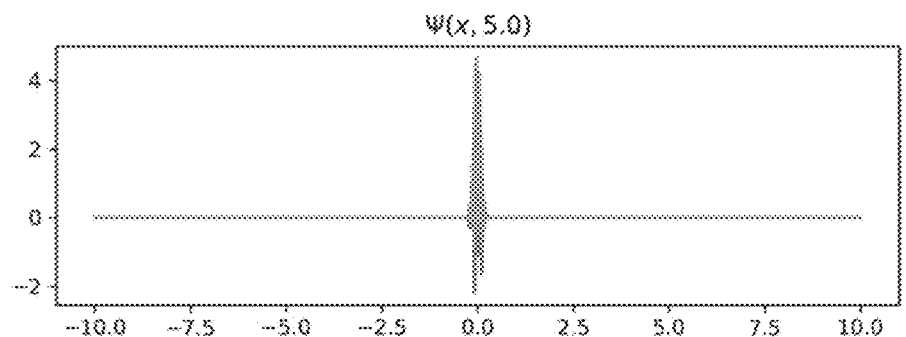
Figure 35B:
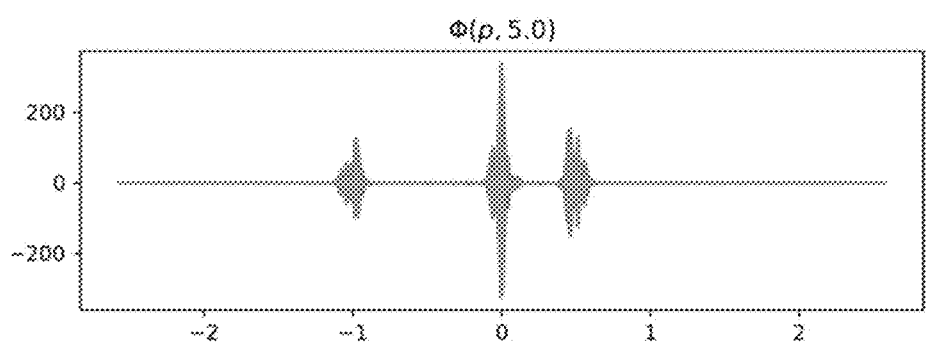
Figure 35C:
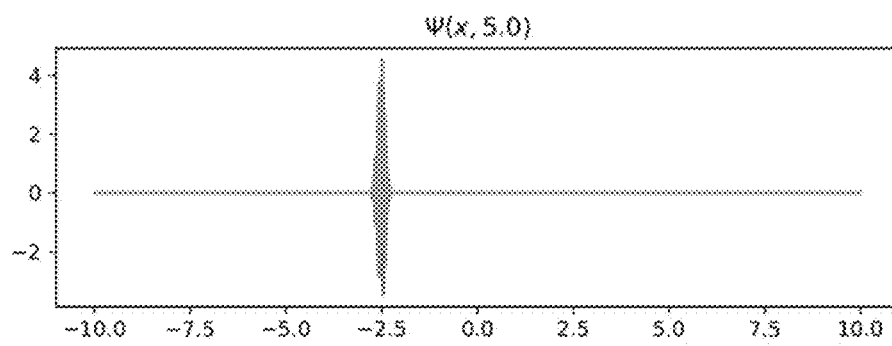
Figure 35D:
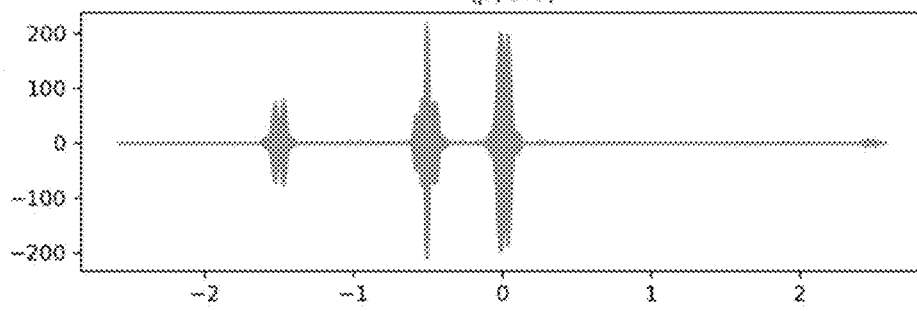

In quantum mechanics, wave functions represent probability amplitude of finding the system in some state. Physical pure states in quantum mechanics are represented as unit-norm vectors in a special complex Hilbert space and time evolution in this vector space is given by application of the evolution operator. Further, in quantum mechanics, any observable should be associated with a self-adjoint linear operator which must yield real eigenvalues, e.g. they must be Hermitian. The probability of each eigenvalue is related to the projection of the physical state on the subspace related to that eigenvalue and observables are differential operators. For example, a robotic device navigates along a one-dimensional floor that includes three doors at doors at $x_0$=−2.5, $x_1$=0, and $x_2$=5.0 and the processor of the robotic device is capable of determining when it is located at a door based on sensor data observed and the momentum of the robotic device is constant, but unknown. Initially the location of the robotic device is unknown, therefore the processor generates initial wave functions of the state shown in FIGS. 30A and 30B. When the processor determines the robotic device is in front of a door, the possible position of the robotic device is narrowed down to three possible positions, but not the momentum, resulting in wave functions shown in FIGS. 31A and 31B. The processor evolves the wave functions with a Hamiltonian operator, and after five seconds the wave functions are as shown in FIGS. 32A and 32B, wherein the position space has spread out again given that the momentum is unknown. However, the evolved probability density keeps track of the correlation between position and momentum. When the processor determines the robotic device is in front of a door again, the wave functions are updated to FIGS. 33A and 33B, wherein the wave functions have significantly narrowed down, indicating a number of peaks representing possible position and momentum combinations of the robotic device. And in fact, if the processor observes another observation, such as momentum p=1.0 at t=5.0, the wave function in the position space also collapses to the only remaining possible combination, the location near x=5.0, as shown in FIGS. 34A and 34B. It can be seen that the processor collapsed the momentum wave function accordingly. Also, the processor reduced the position wave function to a peak at x=5.0. Given constant momentum, the momentum observation of p=1.0, and that the two door observations were 5 seconds apart, the position x=5.0 is the only remaining valid position hypothesis. FIGS. 34C and 34D illustrate the resulting wave function for a momentum observation of p=0.0 at t=5.0 instead. FIGS. 34E and 34F illustrate the resulting wave function for a momentum observation of p=−1.5 at t=5.0 instead. FIGS. 34G and 34H illustrate the resulting wave function for a momentum observation of p=0.5 at t=5.0 instead. Similarly, the processor collapses the momentum wave function when position is observed instead of momentum. FIGS. 35A and 35B illustrate the resulting wave function for a position observation of x=0.0 at t=5.0 instead. FIGS. 35C and 35D illustrate the resulting wave function for a position observation of x=−2.5 at t=5.0 instead. FIGS. 35E and 35F illustrate the resulting wave function for a position observation of x=5.0 at t=5.0 instead.

In some embodiments, the processor of the robotic device considers multiple possible scenarios wherein the robotic device is located in other likely locations in addition to the location estimated by the processor. As the robotic device moves within the environment, the processor gains information of its surroundings from sensory devices which it uses to eliminate less likely scenarios. For example, consider a processor of a robotic device estimating itself to be 100 cm away from a wall. To account for measurement noise the processor considers additional likely scenarios wherein the robotic device is, for example, 102, 101, 99 and 98 cm away from the wall. The processor considers these scenarios as possibly being the actual true distance from the wall and therefore reduces its speed after traveling 98 cm towards the wall. If the robotic device does not bump into the wall after traveling 98 cm towards the wall it eliminates the possibility of it having been 98 cm away from the wall and the likelihood of the robotic device being 99, 100, 101 and 102 cm away from the wall increases. This way as the robotic device travels within the environment, the processor adjusts its confidence of its location with respect to other robotic devices and the environment based on observations and information gained of the surroundings. In some cases, such a method reduces collisions. In an alternative visualization of this approach the processor inflates the surface area occupied by the robotic device such that it is hypothesized that the robotic device occupies all state spaces falling within the borders of the inflated surface area. Since the error of perceived position of the robot increases with movement, the processor inflates the surface area occupied by the robotic device with every movement. The processor deflates the surface area occupied by the robotic device when occupancy of a hypothesized state space falling within the borders of the surface area is proven to be false, thereby reducing the number of state spaces and hence area occupied by the robotic device. In this example, wherein the surface area occupied by the robotic device is equivalent to the integral of all state spaces falling within the borders of the surface area, the occupancy of all state spaces is uniformly distributed. In some embodiments, the inflation and deflation is not the same in all directions. In some embodiments, the amounts of inflation and deflation in different directions depends on the type of motion, noise, sensors, etc.

In some embodiments, the processor initially assumes the robotic device is located somewhere within an area greater than the size of the robot, the location being the seed location of the robotic device. This is due to initial uncertainty in the position and heading of the robotic device and the surroundings. As more data is collected and the processor is more certain of the position of the robotic device relative to its surroundings, the processor reduces the size of area within which the robotic device is assumed to be located. On the other hand, as the robotic device moves and noise, such as movement noise, is introduced, the processor increases the area within which the robotic device is assumed to be located as uncertainty in the position of the robot increases. In some embodiments, the processor adjusts the shape of the area within which the robotic device is assumed to be located within based on deviation between the measured and true heading and translation of the robotic device as it moves. In some embodiments, the processor uses information on linear and angular undershoot and overshoot to help determine the shape of the area within which the robotic device is assumed to be located within. Force is needed to cause linear and angular acceleration and a given amount of force can either be spent on linear overshooting or angular overshooting. If the robotic device overshoots linearly it undershoots angularly and vice versa.

In embodiments, wherein the state of the robotic device within a space is initially unknown, the processor of the robotic device may generate a uniform probability distribution over the space. In other instances, any other probability distribution may be generated depending on the information known about the state of the robotic device and the certainty of the information. Over time and as more measurements and observations are received by the processor of the robotic device, the probability distribution over all possible states of the robotic device in the space evolves.

In some embodiments, the processor uses quantum filtering. In some embodiments, the processor simulates multiple robotic devices located in different possible locations within the environment. In some embodiments, the processor may view the environment from the perspective of each different simulated robotic device. In some embodiments, the collection of simulated robotic devices form an ensemble. In some embodiments, the processor evolves the location of each simulated robotic device or the ensemble over time. In some embodiments, the range of movement of each simulated robotic device may be different. In some embodiments, the processor may view the environment from the field of view (FOV) of each simulated robotic device, each simulated robotic device having a slightly different map of the environment based on their simulated location and FOV. In some embodiments, the collection of simulated robotic devices form an approximate region within which the robotic device is truly located. In some embodiments, the true location of the robotic device is one of the simulated robotic devices. In some embodiments, when a measurement of the environment is taken, the processor checks the measurement of the environment against the map of the environment of each of the simulated robotic devices. In some embodiments, the processor predicts the robotic device is truly located in the location of the simulated robotic device having a map that best matches the measurement of the environment. In some embodiments, the simulated robotic device which the processor believes to be the true robotic device may change or may remain the same as new measurements are taken and the ensemble evolves over time. In some embodiments, the ensemble of simulated robotic devices remain together as the ensemble evolves over time. In some embodiments, the overall energy of the collection of simulated robotic devices remains constant in each timestamp, however the distribution of energy to move each simulated robotic device forward during evolution may not be distributed evenly among the simulated robotic devices. For example, in one instance a simulated robotic device may end up much further away than the remaining simulated robotic devices or too far to the right or left, however in future instances and as the ensemble evolves may become close to the group of simulated robotic devices again. In some embodiments, the ensemble evolves to most closely match the sensor readings, such as a gyroscope or optical sensor. In some embodiments, the evolution of the location of simulated robotic devices is limited based on characteristics of the physical robotic device. For example, a robot may have limited speed and limited rotation of the wheels, therefor it would be impossible for the robot to move two meters, for example, in between time steps. In another example, the robot may only be located in certain areas of an environment, where it may be impossible for the robot to be located in areas where an obstacle is located for example. In some embodiments, this method of quantum filtering may be used to hold back certain elements or modify the overall understanding of the environment. For example, when the processor examines a total of ten simulated robotic devices one by one against a measurement, and selects one simulated robotic device as the true robotic device, the processor filters out nine simulated robotic devices, thus filtering ten quanta to one quantum.

In some embodiments, the FOV of each simulated robotic device may not include the exact same features as one another. In some embodiments, the processor saves the FOV of each of the simulated robotic devices in memory. In some embodiments, the processor combines the FOVs of each simulated robotic device to create a FOV of the ensemble using methods such as least squares methods. This method is described above for creating a map by aligning sensor data to create one representation of the environment, which may be more accurate than each individual FOV. In some embodiments, the processor tracks the FOV of each of the simulated robotic devices individually and the FOV of the entire ensemble. In some embodiments, other methods may be used to create the FOV of the ensemble (or a portion of the ensemble). For example, a classifier AI algorithm may be used, such as Naive Bayes classifier, Least squares support vector machines, k-nearest neighbor, Decision trees, and Neural networks. In some embodiments, more than one FOV of the ensemble (or a portion of the ensemble) may be generated and tracked by the processor, each FOV created using a different method. For example, the processor may track the FOV of ten simulated robotic devices and ten differently generated FOVs of the ensemble. At each measurement timestamp, the processor may examine the measurement against the FOV of the ten simulated robotic devices and/or the ten differently generated FOVs of the ensemble and may choose any of these 20 possible FOVs as the ground truth. In some embodiments, the processor may examine the 20 FOVs instead of the FOVs of the simulated robotic devices and choose a derivative as the ground truth. The number of simulated robotic devices and/or the number of generated FOVs may vary. During mapping for example, the processor may take a first field of view of the camera and calculate a FOV for the ensemble or each individual observer (simulated robotic device) inside the ensemble and combine it with the second field of view captured by the camera for the ensemble or each individual observer inside the ensemble. The processor switches between the FOV of each observer (e.g., like multiple CCTV cameras in an environment that an operator may switch between) and/or one or more FOVs of the ensemble (or a portion of the ensemble) and chooses the FOVs that are more probable to be close to ground truth. At each time iteration, the FOV of each observer and/or ensemble evolves into being closer to ground truth.

In some embodiments, simulated robotic devices may be divided in two or more classes. For example, simulated robotic devices may be classified based on their reliability, such as good reliability, bad reliability, or average reliability or based on their speed, such as fast and slow. Classes that move to a side a lot may be used. Any classification system may be created, such as Linear classifiers like Fisher's linear discriminant, Logistic regression, Naive Bayes classifier and Perceptron, Support vector machines like Least squares support vector machines, Quadratic classifiers, Kernel estimation like k-nearest neighbor, Boosting (meta-algorithm), Decision trees like Random forests, Neural networks, and Learning vector quantization. In some embodiments, each of the classes evolve differently. For example, for fast speed and slow speed classes, each of the classes moves differently wherein the simulated robotic devices in the fast class will move very fast and will be ahead of the other simulated robotic devices in the slow class that move slower and fall behind. For example, given a gyroscope that shows two meters of movement and classes X, Y, and Z, the ensemble may evolve as illustrated in FIG. 36. At each time stamp 3600, 3601, and 3602, class X moves the fastest as it belongs to the fastest speed class. In other words, when a force is applied at each time stamp to evolve the classes over time, the force moves class X more than the rest of the classes. This may be due to class X being lighter than the rest of the simulated robotic devices. The kind and time of evolution may have different impact on different simulated robotic devices within the ensemble. The evolution of the ensemble as a whole may or may not remain the same. The ensemble may be homogenous or non-homogenous.

In some embodiments, samples are taken from the phase space. In some embodiments, the intervals at which samples are taken may be fixed or dynamic or machine learned. In a fixed interval sampling system, a time may be preset. In a dynamic interval system, the sampling frequency may depend on factors such as speed or how smooth the floor is and other parameters. For example, as the speed of the robotic device increases, more samples are taken. Or more samples are taken when the robotic device is traveling on rough terrain. In a machine learned system, the frequency of sampling may depend on predicted drift. For example, if in previous timestamps the measurements taken indicate that the robotic device has reached the intended position fairly well, the frequency of sampling is reduced. In some embodiments, the above explained dynamic system may be equally used to determine the size of the ensemble. If, for example, in previous timestamps the measurements taken indicate that the robotic device has reached the intended position fairly well, a smaller ensemble may be used to correct the knowledge of where the robotic device is. In some embodiments, the ensemble is regenerated at each interval. In some embodiments, a portion of the ensemble is regenerated. In some embodiments, a portion of the ensemble that is more likely to depict ground truth may be preserved and the other portion regenerated. In some embodiments, the ensemble may not be regenerated but one of the observers (simulated robotic devices) in the ensemble that is more likely to be ground truth is chosen as the most feasible representation of the true robotic device. In some embodiments, observers (simulated robotic devices) in the ensemble take part in becoming the most feasible representation of the true robotic device based on how their individual description of the surrounding fits with the measurement taken.

In some embodiments, the processor generates an ensemble of hypothetical positions of various simulated robotic devices within the environment. In some embodiments, the processor generates a simulated representation of the environment for each hypothetical position of the robotic device from the perspective corresponding with each hypothetical position. In some embodiments, the processor compares the measurement against each simulated representation of the environment (e.g., a floor type map, a spatial map, a Wi-Fi map, etc.) corresponding with a perspective of each of the hypothetical positions of the robotic device. In some embodiments, the processor chooses the hypothetical position of the robotic device that makes the most sense as the most feasible position of the robotic device. In some embodiments, the processor selects additional hypothetical positions of the robotic device as a backup to the most feasible position of the robotic device. In some embodiments, the processor nominates one or more hypothetical positions as a possible leader or otherwise a feasible position of the robotic device. In some embodiments, the processor nominates a hypothetical position of the robot as a possible leader when the measurement fits well with the simulated representation of the environment corresponding with the perspective of the hypothetical position. In some embodiments, the processor defers a nomination of a hypothetical position to other hypothetical positions of the robotic device. In some embodiments, the hypothetical positions with the highest numbers of deferrals are chosen as possible leaders. In some embodiments, the process of comparing measurements to simulated representations of the environment corresponding with the perspectives of different hypothetical positions of the robotic device, nominating hypothetical positions as possible leaders, and choosing the hypothetical position that is the most feasible position of the robotic device may be iterative. In some cases, the processor selects the hypothetical position with the lowest deviation between the measurement and the simulated representation of the environment corresponding with the perspective of the hypothetical position as the leader. In some embodiments, the processor stores one or more hypothetical positions that are not elected as leader for another round of iteration after another movement of the robot. In other cases, the processor eliminates one or more hypothetical positions that are not elected as leader or eliminates a portion and stores a portion for the next round of iteration. In some cases, the processor chooses the portion of the one or more hypothetical positions that are stored based on one or more criteria. In some cases, the processor chooses the portion of hypothetical positions that are stored randomly and based on one or more criteria. In some cases, the processor eliminates some of the hypothetical positions of the robotic device that pass the one or more criteria. In some embodiments, the processor evolves the ensemble of hypothetical positions of the robotic device similar to a genetic algorithm. In some embodiments, the processor uses a MDP, as mathematically described below, to reduce the error between the measurement and the representation of the environment corresponding with each hypothetical position over time, thereby improving the chances of each hypothetical position in becoming or remaining leader. In some cases, the processor applies game theory to the hypothetical positions of the robotic devices, such that hypothetical positions compete against one another in becoming or remaining leader. In some embodiments, hypothetical positions compete against one another and the ensemble becomes an equilibrium wherein the leader following a policy (x) remains leader while the other hypothetical positions maintain their current positions the majority of the time.

The multi-dimensionality in quantum localization described above provides robustness that may be useful in various applications. In some embodiments, the processor uses localization for controlling the operation, settings, and functionality of the robotic device. For example, the processor uses localization to control the behavior of the robotic device in different areas, where for instance, certain functions or settings are desired for different environments. These functions or settings may be triggered once the processor has localized the robotic device against the environment. For example, it may be desirable to run the motor at a higher speed when moving over rough surfaces, such as soft flooring as opposed to hardwood, wherein localization against floor type or against a room may trigger the motor speed. As a further example, localization may also be used in controlling the movement of the robotic device. If the processor localizes the robotic device against a perimeter, for example, it may choose to select a path along the perimeter or it may trigger a polymorphic or other type of path planning algorithm. Or, localizing the robotic device against a perimeter may trigger a path planning algorithm.

Further details of localization methods that may be used independently or in combination are described in U.S. Patent Application Nos. 62/748,943, 62/746,688, 16/297,508, 62/740,573, 62/740,580, 15/955,480, 15/425,130, 15/955,344, and 16/427,317, the entire contents of which are hereby incorporated by reference.

In some embodiments, the processor may use data from optoelectronic sensors to help map the environment and localize the robotic device. In some embodiments, one or more optoelectronic sensors including one or more imaging sensors and one or more light emitters are positioned on the underside of the robotic device such that the optoelectronic sensors monitor the surface upon which the device drives. For example, the optoelectronic sensors may include two image sensors and one light emitter or one image sensor and two light emitters or three image sensors and three light emitters. In some embodiments, the light emitters are a laser, an LED or another type of light emitter. In some embodiments, the light emitted in infrared or visible. In some embodiments, the optoelectronic sensors are positioned such that they monitor another portion of the environment, such as the ceiling of the environment or another area. The one or more optoelectronic sensors may be positioned at some distance from one another on the underside of the robotic device. In some instances, the one or more optoelectronic sensors are positioned close together and in other instances, they are positioned far apart from one another. For example, two optoelectronic sensors may be positioned along a line passing through the center of the robotic device, each on opposite sides and at an equal distance from the center of the robotic device. In other instances, the optoelectronic sensors may be positioned differently on the underside of the robotic device, where for example, they may not be at equal distance from the center of the robotic device. The one or more light emitters illuminate the surface upon which the robotic device drives and the imaging sensors capture images of the driving surface as the robotic device moves through the environment. In some embodiments, the images captured are sent to the processor and a technique such as, digital image correlation (DIC), may be used to determine the linear movement of each of the optoelectronic sensors in the x and y directions. Each optoelectronic sensor has an initial starting location that can be identified with a pair of x and y coordinates and using a technique such as DIC, the processor may determine a second location of each optoelectronic sensor by a second pair of x and y coordinates. In some embodiments, the processor detects patterns in images and is able to determine by how much the patterns have moved from one image to another, thereby providing the movement of each optoelectronic sensor in the x and y directions over a time from a first image being captured to a second image being captured. To detect these patterns and movement of each sensor in the x and y directions the processor processes the images using a technique such as cross correlation to determine how much each successive image is offset from the previous one. In some embodiments, finding the maximum of the correlation array between pixel intensities of two images may be used to determine the translational shift in the x-y plane or in the case of a robotic device, its driving surface plane. Cross correlation may be defined in various ways, such as two-dimensional discrete cross correlation $$r_{ij} = \frac{\sum_k \sum_l [s(k+i, l+j) - \underline{s}][q(k, l) - \underline{q}]}{\sqrt{\sum_k \sum_l [s(k, l) - \underline{s}]^2 \sum_k \sum_l [q(k, l) - \underline{q}]^2}},$$

wherein $s(k, l)$ is the pixel intensity at a point $(k, l)$ in a first image and $q(k, l)$ is the pixel intensity of a corresponding point in the translated image. $\underline{s}$ and $\underline{q}$ are the mean values of respective pixel intensity matrices $s$ and $q$. The coordinates of the maximum $r_{ij}$ gives the pixel integer shift $(\Delta x, \Delta y) = \{r\}$. In some embodiments, the correlation array may be determined faster using Fourier Transform techniques or other mathematical methods.

Given the movement of each optoelectronic sensor in the x and y directions, the linear and rotational movement of the robotic device may be determined by the processor. For example, if the robotic device is only moving linearly without any rotation, the translation of each optoelectronic sensor (Δx, Δy) over a time Δt are the same in magnitude and sign and may be assumed to be the translation of the robotic device as well. If the robotic device rotates, the linear translations of each optoelectronic sensor determined from their respective images may be used by the processor to determine the rotation angle of the robotic device. For example, in some instances the robotic device rotates in place, about an instantaneous center of rotation (ICR) located at its center. This may occur when the velocity of one wheel is equal and opposite to the other wheel (i.e. $v_r = -v_l$, wherein r denotes right wheel and l left wheel). In embodiments wherein two optoelectronic sensors, for example, are placed at equal distances from the center of the robotic device along a line passing through its center, the magnitude of the translations in the x and y directions of the two optoelectronic sensors are the same and of opposite sign. The translations of either sensor may be used by the processor to determine the rotation angle of the robotic device about the ICR by applying Pythagorean theorem, given the distance of the sensor to the ICR is known. In embodiments wherein the optoelectronic sensors are placed along a line passing through the center of the robotic device and are not of equal distance from the center of the robotic device, translations of each sensor will not be of the same magnitude however, any set of translations corresponding to an optoelectronic sensor, will result in the same angle of rotation when applying Pythagorean theorem.

Figure 37A:
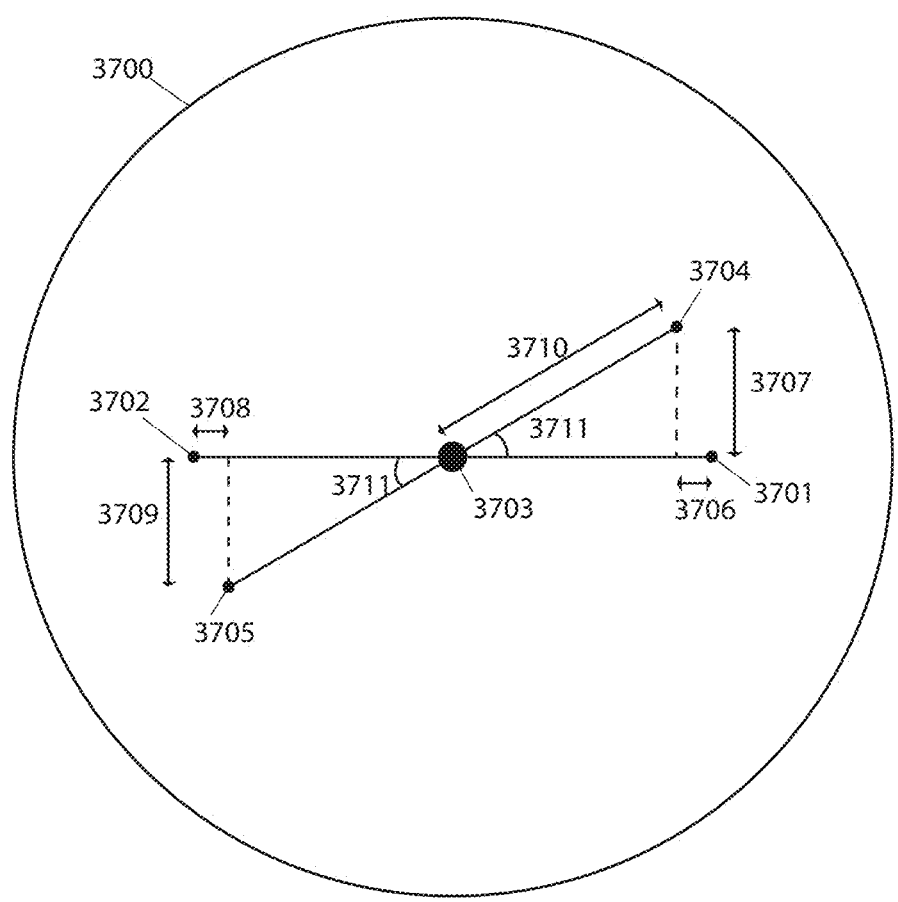
FIGS. 37A-37C illustrate a method for determining a rotation angle of a robotic device, according to some embodiments.

The offset amounts at each optoelectronic sensor location may be used by the processor to determine the amount that the robotic device turned. FIG. 37A illustrates a top view of robotic device 3700 with a first optoelectronic sensor initially positioned at 3701 and a second optoelectronic sensor initially positioned at 3702, both of equal distance from the center of robotic device 3700. The initial and end position of robotic device 3700 is shown, wherein the initial position is denoted by the dashed lines. Robotic device 3700 rotates in place about ICR 3703, moving first optoelectronic sensor to position 3704 and second optoelectronic sensor to position 3705. As robotic device 3700 rotates from its initial position to a new position optoelectronic sensors capture images of the surface illuminated by an LED (not shown) and send the images to a processor for DIC. After DIC of the images is complete, translation 3706 in the x direction (Δx) and 3707 in the y direction (Δy) are determined for the first optoelectronic sensor and translation 3708 in the x direction and 3709 in the y direction for the second sensor. Since rotation is in place and the optoelectronic sensors are positioned symmetrically about the center of robotic device 3700 the translations for both optoelectronic sensors are of equal magnitude. The translations (Δx, Δy) corresponding to either optoelectronic sensor together with the respective distance 3710 of either sensor from ICR 3703 of robotic device 4400 may be used to calculate rotation angle 3711 of robotic device 3700 by forming a right-angle triangle as shown in FIG. 37A and applying Pythagorean theorem $$\sin \sin \theta = \frac{\text{opposite}}{\text{hypotneuse}} = \frac{\Delta y}{d},$$

wherein θ is rotation angle 3711 and d is known distance 3710 of the sensor from ICR 3703 of robotic device 3700.

Figure 37B:
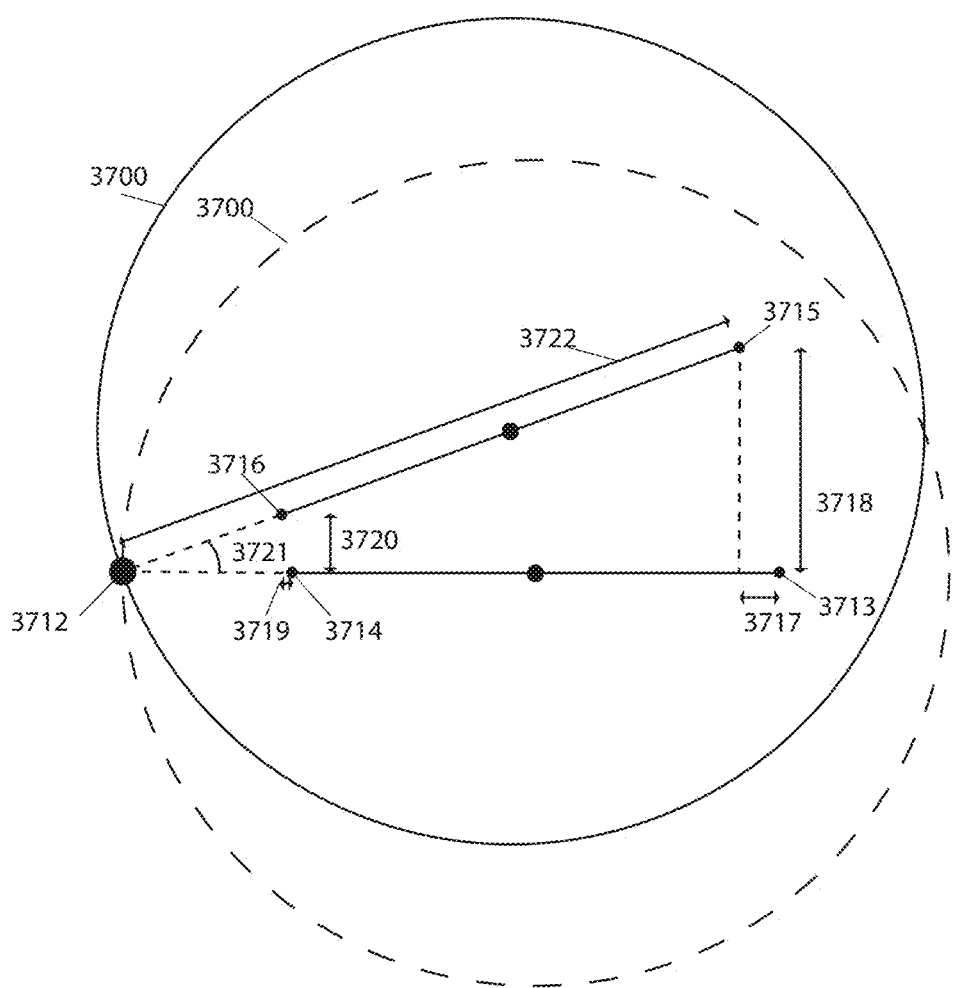

In some embodiments, the rotation of the robotic device may not be about its center but about an ICR located elsewhere, such as the right or left wheel of the robotic device. For example, if the velocity of one wheel is zero while the other is spinning then rotation of the robotic device is about the wheel with zero velocity and is the location of the ICR. The translations determined by images from each of the optoelectronic sensors may be used to estimate the rotation angle about the ICR. For example, FIG. 37B illustrates rotation of robotic device 3700 about ICR 3712. The initial and end position of robotic device 3700 is shown, wherein the initial position is denoted by the dashed lines. Initially first optoelectronic sensor is positioned at 3713 and second optoelectronic sensor is positioned at 3714. Robotic device 3700 rotates about ICR 3712, moving first optoelectronic sensor to position 3715 and second optoelectronic sensor to position 3716. As robotic device 3700 rotates from its initial position to a new position optoelectronic sensors capture images of the surface illuminated by an LED (not shown) and send the images to a processor for DIC. After DIC of the images is complete, translation 3717 in the x direction (Δx) and 3718 in the y direction (Δy) are determined for the first optoelectronic sensor and translation 3719 in the x direction and 3720 in the y direction for the second sensor. The translations (Δx, Δy) corresponding to either optoelectronic sensor together with the respective distance of the sensor to the ICR, which in this case is the left wheel, may be used to calculate rotation angle 3721 of robotic device 3700 by forming a right-angle triangle, such as that shown in FIG. 37B. Translation 3718 of the first optoelectronic sensor in the y direction and its distance 3722 from ICR 3712 of robotic device 3700 may be used to calculate rotation angle 3721 of robotic device 3700 by Pythagorean theorem $$\sin \sin \theta = \frac{\text{opposite}}{\text{hypotneuse}} = \frac{\Delta y}{d},$$

wherein θ is rotation angle 3721 and d is known distance 3722 of the first sensor from ICR 3712 located at the left wheel of robotic device 3700. Rotation angle 3721 may also be determined by forming a right-angled triangle with the second sensor and ICR 3712 and using its respective translation in the y direction.

Figure 37C:
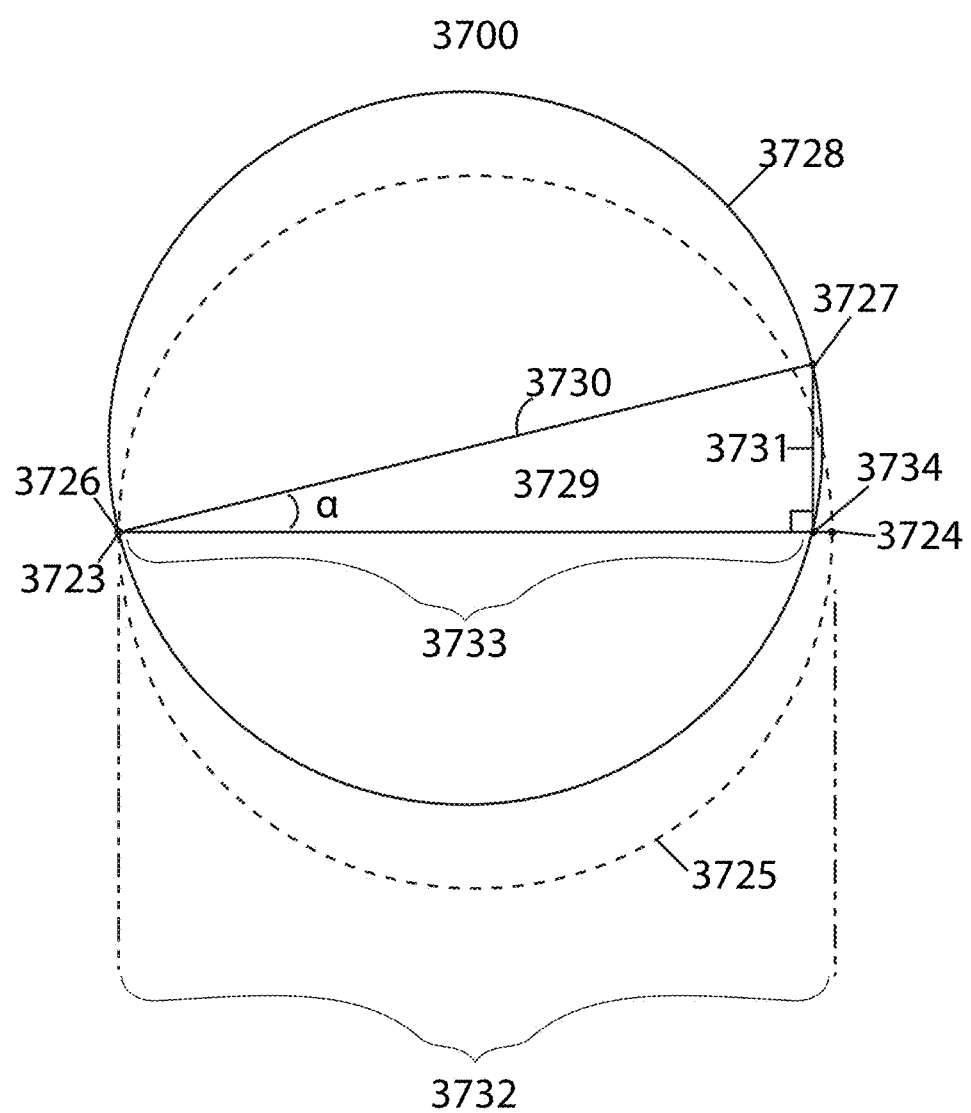

In another example, the initial position of robotic device 3700 with two optoelectronic sensors 3723 and 3724 is shown by the dashed line 3725 in FIG. 37C. A secondary position of the robotic device 3700 with two optoelectronic sensors 3726 and 3727 after having moved slightly is shown by solid line 3728. Because the secondary position of optoelectronic sensor 3726 is substantially in the same position 3723 as before the move, no difference in position of this sensor is shown. In real time, analyses of movement may occur so rapidly that the robotic device may only move a small distance in between analyses and only one of the two optoelectronic sensors may have moved substantially. The rotation angle of robotic device 3700 may be represented by the angle α within triangle 3729. Triangle 3729 is formed by the straight line 3730 between the secondary positions of the two optoelectronic sensors 3726 and 3727, the line 3731 from the second position 3727 of the optoelectronic sensor with the greatest change in coordinates from its initial position to its secondary position to the line 3732 between the initial positions of the two optoelectronic sensors that forms a right angle therewith, and the line 3733 from the vertex 3734 formed by the intersection of line 3731 with line 3732 to the initial position 3723 of the optoelectronic sensor with the least amount of (or no) change in coordinates from its initial position to its secondary position. The length of side 3730 is fixed because it is simply the distance between the two sensors, which does not change. The length of side 3731 may be determined by the processor by finding the difference of the y coordinates between the position of the optoelectronic sensor at position 3727 and at position 3724. It should be noted that the length of side 3733 does not need to be known in order to find the angle α. The trigonometric function $$\sin \sin \theta = \frac{\text{opposite}}{\text{hypotneuse}}$$

only requires that the length of sides 3731 (opposite) and 3730 (hypotenuse) are known. In applying the above trigonometric relationship, the processor obtains the angle α, which is the turning angle of the robotic device.

Figure 38:
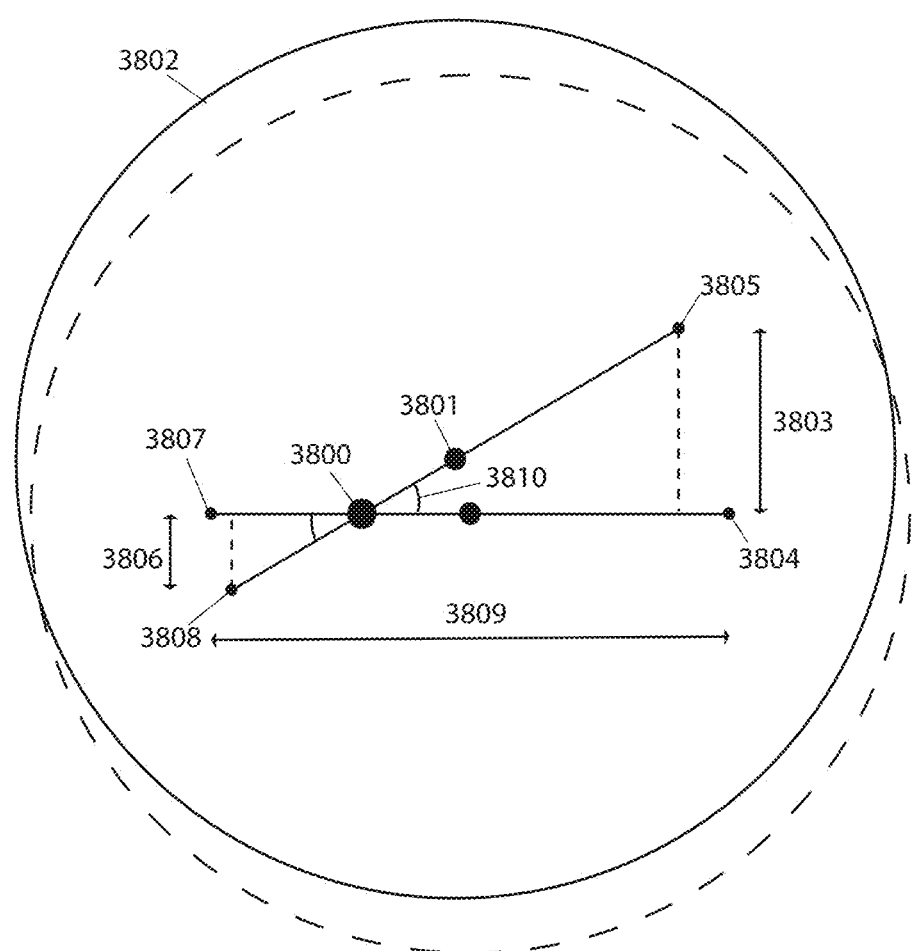
FIG. 38 illustrates a method for calculating a rotation angle of a robotic device, according to some embodiments.

In a further example, wherein the location of the ICR relative to each of the optoelectronic sensors is unknown, translations in the x and y directions of each optoelectronic sensor may be used together to determine rotation angle about the ICR. For example, in FIG. 38 ICR 3800 is located to the left of center 3801 and is the point about which rotation occurs. The initial and end position of robotic device 3802 is shown, wherein the initial position is denoted by the dashed lines. While the distance of each optoelectronic sensor to center 3801 or a wheel of robotic device 3802 may be known, the distance between each sensor and an ICR, such as ICR 3800, may be unknown. In these instances, translation 3803 in the y direction of first optoelectronic sensor initially positioned at 3804 and translated to position 3805 and translation 3806 in the y direction of second optoelectronic sensor initially position at 3807 and translated to position 3808, along with distance 3809 between the two sensors may be used by the processor to determine rotation angle 3810 about ICR 3800 using $$\sin \theta = \frac{\Delta y_1 + \Delta y_2}{b},$$

wherein θ is rotation angle 3810, $\Delta y_1$ is translation 3803 in the y direction of first optoelectronic sensor, $\Delta y_2$ is translation 3806 in the y direction of second optoelectronic sensor and b is distance 3809 between the two sensors.

The methods of tracking linear and rotational movement of the robotic device described herein may be supplemental to other methods used for tracking movement and localizing the robotic device. For example, this method may be used with an optical encoder, gyroscope, IMU, or both to improve accuracy of the estimated movement or may be used independently in other instances.

In some embodiments, given that the time Δt between captured images is known, the linear velocities in the x ($v_x$) and y ($v_y$) directions and angular velocity (ω) of the robotic device may be estimated by the processor using $$v_x = \frac{\Delta x}{\Delta t}, v_y = \frac{\Delta y}{\Delta t}, \text{ and } \omega = \frac{\Delta \theta}{\Delta t},$$

wherein Δx and Δy are the translations in the x and y directions, respectively, that occur over time Δt and Δθ is the rotation that occurs over time Δt.

In some embodiments, one optoelectronic sensor may be used to determine linear and rotational movement of the robotic device using the same methods as described above. The use of at least two optoelectronic sensors is particularly useful when the location of ICR is unknown or the distance between each sensor and the ICR is unknown. However, rotational movement of the robotic device may be determined using one optoelectronic sensor when the distance between the sensor and ICR is known, such as in the case when the ICR is at the center of the robotic device and the robotic device rotates in place (illustrated in FIG. 37A) or the ICR is at a wheel of the robotic device and the robotic device rotates about the wheel (illustrated in FIGS. 37B and 37C).

In some embodiments, the one or more optoelectronic sensors may be a standalone device with an embedded processor or may be connected to any other separate processor, such as that of the robotic device. In some embodiments, each optoelectronic sensor has its own one or more light emitters and in other embodiments the one or more optoelectronic sensors may share the one or more light emitters. In some embodiments, a dedicated image processor may be used to process images and in other embodiments a separate processor coupled to the one or more optoelectronic sensors may be used, such as the processor of the robotic device. In some embodiments, each optoelectronic sensor and processor may be installed as separate units. In some embodiments, a light emitter may not be used. In some embodiments, separate components of the optoelectronic sensor, such as an imaging sensor, a light emitter and a processor, may be combined to create a standalone optoelectronic sensor or may be built into the robotic device.

In some embodiments, two-dimensional optoelectronic sensors may be used. In other embodiments, one-dimensional optoelectronic sensors may be used. In some embodiments, one-dimensional optoelectronic sensors may be combined to achieve readings in more dimensions. For example, to achieve similar results as two-dimensional optoelectronic sensors, two one-dimensional optoelectronic sensors may be positioned perpendicularly to one another. In some instances, one-dimensional and two dimensional optoelectronic sensors may be used together.

In some embodiments, the image output from the one or more optoelectronic sensors may be in the form of a traditional picture or may be an image of another form, such as an image from a CMOS imaging sensor. In some embodiments, the output data from the optoelectronic sensors are provided to a Kalman filter and the Kalman filter determines how to integrate the output data with other information, such as odometry data, gyroscope data, IMU data, compass data, accelerometer data, etc.

In some embodiments, the optoelectronic system is useful in determining slippage. For example, if the robotic device rotates in position a gyroscope may provide angular displacement while the optoelectronic system may be used to determine any linear displacement that occurred during the rotation due to slippage. In some embodiments, the processor adjusts sensor readings, such as depth readings of a distance sensor, based on the linear displacement determined. In some embodiments, the processor adjusts sensor readings after the desired rotation is complete. In some embodiments, the processor adjusts sensor readings incrementally. For example, the processor may adjust sensor readings based on the displacement determined after every degree, two degrees, or five degrees of rotation.

In some embodiments, displacement determined from the output data of the optoelectronic system may be useful when the robotic device has a narrow field of view and there is minimal or no overlap between consecutive readings captured during mapping and localization. For example, the processor may use displacement from the optoelectronic system and rotation from a gyroscope, to help localize the robotic device. In some embodiments, the displacement determined may be used by the processor in choosing the most likely possible locations of the robotic device from an ensemble of simulated possible positions of the robotic device within the environment. For example, if the displacement determined is a one meter displacement in a forward direction the processor may choose the most likely possible locations of the robotic device in the ensemble as those being close to one meter from the current location of the robotic device.

In some embodiments, the one or more light emitters of the optoelectronic sensor includes at least one LED and at least one laser. In some embodiments, the processor determines which light emitter to use based on an image quality value of an image captured. In some embodiments, the processor alternates the light emitter used when the image quality value of an image is below a predetermined threshold. In some embodiments, the processor alternates the light emitter used when the image quality value of a predetermined number of consecutive images is below a predetermined threshold. In some embodiments, the processor discards data with image quality value below a predetermined threshold. In some embodiments, the processor determines which light emitter to use based on a floor type detected. In some embodiments, the processor uses the LED on soft surface types such as carpet and the laser on hard surface types such as hardwood or tile. In some embodiments, the processor determines the floor type of the driving surface based on the image quality value of one or more captured images. In some embodiments, the processor determines the floor type based on the light in the captured image. For example, the reflect light is more dispersed for soft surface types such as carpet due to the texture and is sharper for hard surface types due to the evenness of the surface. In some embodiments, the processor adjusts settings of the robotic device based on the floor type detected, as described in further detail below.

Figure 39A:
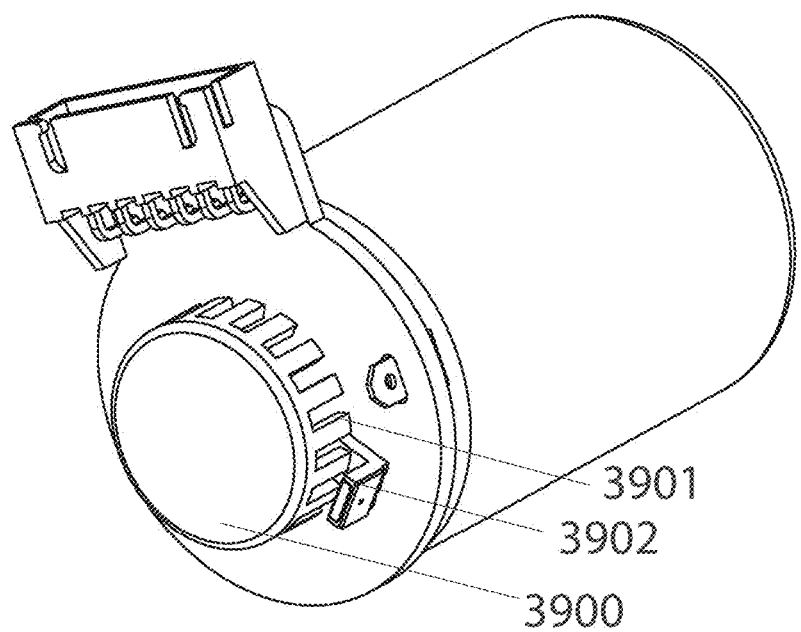
FIGS. 39A-39D illustrate an example of an optical encoder, according to some embodiments.
Figure 39B:
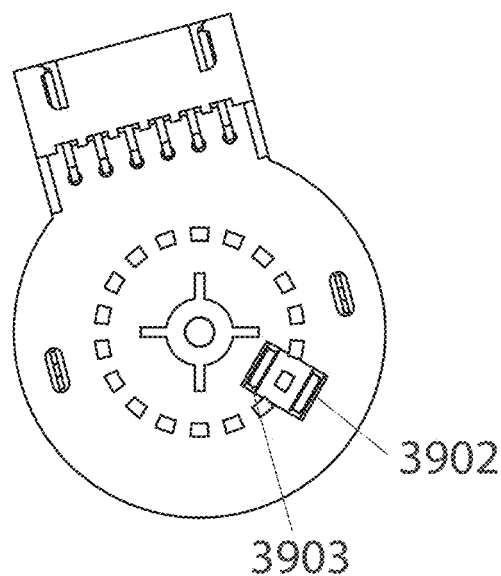
Figure 39C:
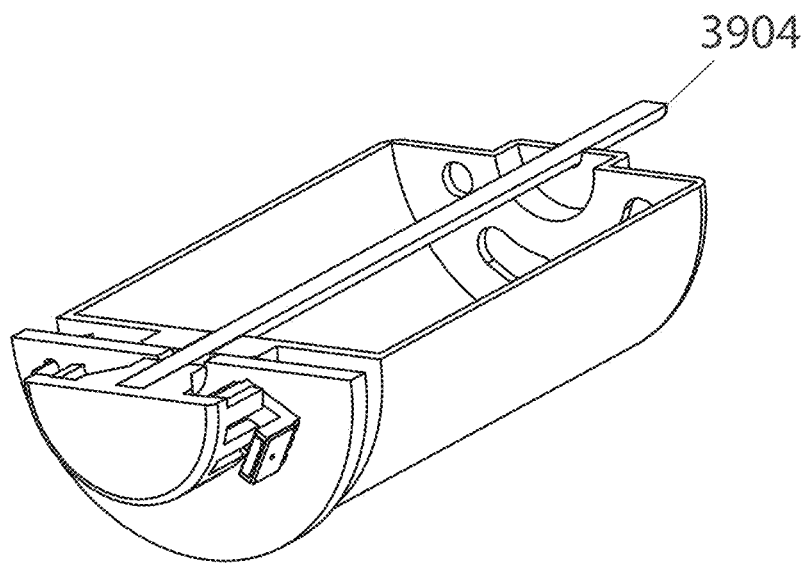
Figure 39D:
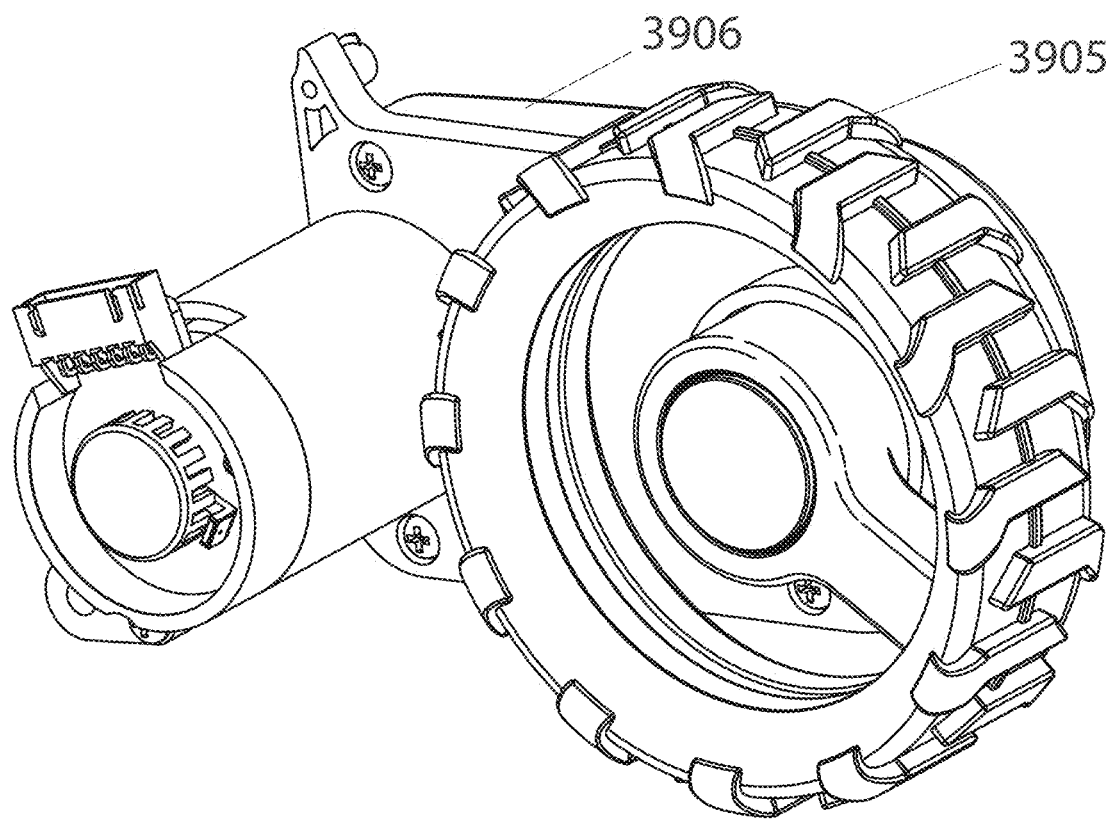

In some embodiments, the processor uses sensor data from one or more wheel encoders to help map and localize the robotic device. In some embodiments, the processor uses data from the encoder and optoelectronic sensors simultaneously to improve mapping and localization of the robotic device. In some embodiments, the data from the optoelectronic sensors is used to verify the data output by the encoder or vice versa. For example, if the robotic device becomes stuck and the wheels continue to rotate the data output from the encoder shows movement when in fact the robot is static. Verifying the encoder data with the optoelectronic sensor data will reveal that there is no displacement of the robotic device and avoids localization error from accumulating. In some embodiments, the data output from the optoelectronic sensors and encoder are combined to improve mapping and localization. In some embodiments, the distance travelled may be measured with a variety of techniques, e.g., by visual odometry or by an encoder or by optoelectronic sensor system or by IMU. FIGS. 39A and 39B illustrate an encoder wheel 3900 with square slots 3901 that, when aligned with LED transmitter 3902 and LED receiver 3903, allow IR light transmitted by LED transmitter 3902 to be received by LED receiver 3903. LED transmitter 3902 and receiver 3903 are stationary, while encoder wheel 3900 rotates when power is provided to motor 3904, shown in FIG. 39C. In FIG. 39D motor 3904 interfaces with wheel 3905 of the robotic device through gears contained within enclosure 3906, such that rotation of the motor causes rotation of encoder wheel 3900 and wheel 3905 of the robotic device. As encoder wheel 3900 rotates, IR light transmitted by LED transmitter 3902 is able to be received by LED receiver 3903 each time square slot 3901 is in line with IR transmitter 3902 and receiver 3903. The number of times IR light is received by receiver 3903 is counted, where each time receiver 3903 receives IR light is referred to as a tick. In embodiments, the number of times the IR light is blocked may alternatively be counted. The number of slots 3901 on encoder wheel 3900 define the resolution of the encoder, a constant referred to as encoder resolution. The encoder resolution can be used to specify the amount of encoder wheel rotations given the number of times IR light is received. The amount of rotations of encoder wheel 3900 is correlated with the amount of displacement of wheel 3904 of the robotic device on the working surface. Therefore, given the number of slots 3901 on encoder wheel 3900, the number of ticks counted, and the ratio of size between encoder wheel 3900 and wheel 3904 of the robotic device, the distance travelled can be determined. Further, given the time, the speed may also be determined. A tick resolution may be defined as the amount of distance travelled between two counted ticks or two instances of receiving light by the IR receiver. In order to calculate the total distance travelled the total number of ticks is multiplied by the tick resolution. In addition to the optoelectronic system and encoder, a gyroscope, such as L3GD20 gyroscope by STMicroelectronics, or an IMU may also be used by the robotic device either independently or in combination with the optoelectronic system and/or the encoder. The gyroscope may use an $I^2C$ (inter-integrated-circuit) interface with two pins or an SPI (serial peripheral interface) with four pins to communicate with the processor. The IMU may include a gyroscope, accelerometer, and compass and may provide linear and angular movement. In some embodiments, the processor assigns different weights to data output from different sensors based on the quality and/or accuracy of the sensor readings. For example, the processor may determine possible locations of the robotic device based on movement data collected by an optoelectronic sensor and may do the same but with encoder data. Based on the depth sensor readings the processor may determine which sensor provides movement data that places the robotic device in more likely possible locations. The processor may then assign higher weight to movement data that better predicts most likely possible locations of the robotic device when localizing the robotic device at future instances. In some embodiments, the processor may discontinue the use of a sensor if readings provided by the sensor are unreliable. For example, the readings may be unreliable if the sensor is damage or in some cases the reliability of readings may depend on the environmental surroundings (e.g., brightness, weather conditions, etc.).

Due to imperfection in analog motors, gears, tiny spikes in voltage, measurement errors and such, a difference between the desired traveled distance and the actual traveled distance is expected. When the navigation algorithm (such as that above) determines the next action, in some embodiments, the corresponding linear and angular velocities and displacement requested to achieve said action is passed from the velocity controller, to the differential driver controller, then to the embedded motor driver to actuate movement of the wheels and complete the action. In some embodiments, an encoder and/or optoelectronic sensor system measures the distance travelled by the robotic device. The traveled distance measured may not necessarily be the same as the desired target displacement. In some embodiments, an adaptive processor is used to record the difference between the target value and actual value of the displacement over one time step, i.e. the absolute error error=|target value−actual value|. As the robotic device moves, the processor calculates the absolute error sum by summating the absolute error for each time step using $$\text{error sum} = \sum\nolimits_{t=1}^{\infty} \text{error}_t.$$

In some embodiments, the processor of the robotic devices uses a control loop feedback mechanism to minimize the difference between the target value and actual value by correcting the future number of voltage pulses provided to each motor based on previous results, wherein the number of voltage pulses per second controls the rotational speed of the motor and hence measured displacement over one time step. In some embodiments, the future number of voltage pulses provided is corrected by using a proportional adjustment. For example, if a wheel is receiving 100 pulses per second and previously measured displacement is ten percent more than the target displacement desired, a proportional adjustment $P=K_p*\text{error}$ is applied to the future number of voltage pulses such that 90 pulses per second are provided in order to attempt to achieve the target displacement, wherein $K_p$ is the proportional gain constant. This helps smoothen the trajectory of the Robotic device, however since the adjustment is applied at a time when the wheel is already faster than desired, the initial velocity of the wheel prior to the adjustment still has an impact on the trajectory which is affected by the original overshoot. An integral $$I = K_i \int_0^\tau$$

error dt of past errors over time may be applied as a further correction to eliminate residual error, wherein $K_i$ is the integral gain constant. The processor determines the integral by summating the absolute error for each time step over a period of time. The integral correction helps reduce systematic errors, such as errors created due to, for example, a wheel being slightly larger or a motor being slightly more powerful or a motor receiving slightly higher voltage than expected. The integral may have a limit, where only a limited portion of the history is considered. The processor may also determine a derivative $$D = K_d \frac{\Delta \text{error}}{\Delta \text{time}}$$

to apply a correction to the variable controlling the target value in order to reduce the error, wherein $K_d$ is the derivative gain constant. The derivative is the best estimate of the future trend of the error based on its current rate of change. The three constants $K_p$, $K_i$, and $K_d$ may be tuned to the specific application such that the difference between the target value and actual value is minimized. The proportional, integral and derivative corrections may be combined by the processor to produce an output=P+I+D which may be applied as a correction to the variable controlling the desired outcome in order to reduce the overall error. In this case, for example, the correction may be applied to the number of voltage pulses per second provided to the motor in order to achieve the desired displacement and thereby reduce the error between target and actual displacement. At startup, the accumulated error is reduced by the gradual acceleration of the robotic device. This allows the displacement and corresponding adjustment of the motor speed to be applied before the robotic device reaches maximum speed resulting in smaller displacements while only limited feedback is available.

The implementation of a feedback processor is beneficial in some cases as a differential drive mechanism, comprised of two independently driven drive wheels mounted on a common axis, used by robotic devices may be highly sensitive to slight changes in velocity in each of the wheels. The small errors in relative velocities between the wheels may affect the trajectory of the robotic device. For rolling motion the robotic device rotates about an instantaneous center of curvature (ICC) located along the common axis. To control the trajectory of the robotic device the velocities of the two wheels may be varied. The angular velocity ω about the ICC may be related to the velocities $v_l$ and $v_r$ of the left and right wheels by the processor using $$\omega\left(R + \frac{l}{2}\right) = v_r$$

and $$\omega\left(R - \frac{l}{2}\right) = v_l,$$

wherein l is the length of the axle connecting the two wheels and R is the distance from the ICC to the midpoint of the axle connecting the two wheels. If $v_l=v_r$, then there is only forward linear motion in a straight line. If $v_l=-v_r$, then the ICC is at the midpoint of the axle and there is only rotation in place. If $$v_l = 0\frac{m}{s},$$

then the ICC is at the left wheel, i.e. rotation is about the left wheel. The same applies for the right wheel if $$v_r = 0\frac{m}{s}.$$

To navigate the robotic device, assume the robotic device centered at the midpoint between the two wheels and is at a position (x, y), headed in a direction θ with respect to the horizontal x-axis. By adjusting $v_l$ and $v_r$ the robotic device may move to different positions and orientations. The processor determines the position of the ICC using ICC=[$ICC_x$, $ICC_y$]=[x−R sin θ, y+R cos θ]. At time t+δt the pose of the robotic device (x', y', θ') is [x' y' θ']=[cos(ωδt)−sin (ωδt) 0 sin(ωδt) cos(ωδt) 0 0 0 1] [x−$ICC_x$ y−$ICC_y$ θ]+[$ICC_x$ $ICC_y$ ωδt]. For a differential drive, the navigation strategy of the robotic device is to move in a straight line, rotate in place, then move in a straight line again in order to reach desired (x, y, θ). For motion in a straight line where $v_l=v_r=v$, the equation used by the processor to determine the pose of the robotic device reduces to [x' y' θ']=[x+v cos θδt y+v sin θδt θ]. And for rotation in place where $v_l=-v_r$, the equation used by the processor to determine the pose of the robotic device reduces to $$[x'\ y'\ \theta'] = \left[x\ y\ \theta + \frac{2v\delta t}{l}\right].$$

The techniques described herein, e.g., such as localization, mapping, and depth perceiving techniques, may be implemented in software, in hardware, in a system on a chip, a module, a combination with other hardware on a PCB, in a single silicon chip, a combination of software and one or more silicon chips, a combination of software and a multipurpose chip, or a specific application chip with built in mapping capabilities. In some embodiments, the implementations may include built-in circuitry for easier and faster processing and GPUs and TPUs capabilities. In some embodiments, a localization chip or a processing chip with a localization processing unit may be used. In some embodiments, a localization and mapping chip or a processing chip such as a CPU or MCU with a localization and mapping processing unit may be used.

In some embodiments, various bumps on a path of the robotic device may affect the map or localization. In some embodiments, an IMU may be used to measure a bump in the z-axis. In some embodiments, the processor detects a bump when the values in the z-axis suddenly increase beyond a predetermined threshold. In some embodiments, the processor filters out the readings captured while the robot was traversing across the bump. In some embodiments, the processor uses the last known good mapping and localization prior to the robot traversing the bump, generates an ensemble of eight (or another number) hypothesized robots, each hypothesized robot being approximately half a diameter of the robot apart from one another and located within the last known good map around the last known good localization, and determines which hypothesized robot fits best with readings collected after fully traversing over the bump. In some embodiments, the number of hypothesized robots and the distance between the hypothesized robots may vary. In some embodiments, the processor may choose a particular hypothesized robot and generate an ensemble around the hypothesized robot in iterative process until gaining localization back. In some embodiments, these methods may be performed in parallel or done in an iterative process. In some embodiments, the processor of the robot adjusts all of its motors, etc. to on, off, then maximum speed intermittently when the robot becomes stuck. In some embodiments, the processor stops its motors and announces an error code. In some embodiments, the graphical user interface (GUI) of the robot or an application of a communication device paired with the processor of the robot may suggest that the robot either abort the sweeping or drive back to the dock when the robot is stuck. In some embodiments, the processor adjusts all motors to maximum speed and drives at full speed to overcome being stuck and drives back to the dock when drive back to the dock is selected.

In some embodiments, the robotic device may attempt to make a determination as to whether or not it has visited a work area previously based on, for example, features of an environment. In some embodiments, a unique characteristic may appear slightly different when identified a second time, and the processor of a robotic device may need to manipulate the data of the unique characteristic captured in order to determine whether or not the characteristic accurately matches what was previously captured when determining whether or not a work area has previously been operated in. In some embodiments, if the processor of the robotic device recognizes an area as having been previously visited, the processor may alter the operations or path of the robotic device. In some embodiments, the robotic device may be ordered to skip operations in a work area. For example, a button on a user interface of the robotic device, or an application of a communications device that is paired with the robotic device may be used to command the processor of the robotic device to skip operations in a given work area. An example of a communications device includes, but is not limited to, a smart phone, smart watch, laptop, tablet, remote control, or the like. In some embodiments, if the robotic device enters a work area, the robotic device may be commanded to leave the work area. In some embodiments, the robotic device may attempt to return to the work area for operations at a later time. In some embodiments, the robotic device may be commanded to execute an action at a particular point in a working session. In some embodiments, a selection may be made as to when a work area is to be operated in based on the number of times a button is pressed commanding the robot to skip a work area. In some embodiments, the robotic device may be commanded to leave an area, where after the robotic device may attempt to operate in the area during a different operational cycle. In some embodiments, the robotic device may store data regarding commands to leave a work area and use this data for future operational cycles. In some embodiments, the robotic device may alter a schedule it has set for recurring services based on commands received to vacate an area. In some embodiments, a command may be set for the robotic device to vacate an area but to return at an unspecified future time. In some embodiments, a command may be set for the robotic device to vacate an area but to return at a specified predetermined time. In some embodiments, if a first robotic device obtains a command to leave a work area, the processor of the first robotic device may communicate with additional robotic devices for the purposes of sharing this data in order to indicate that other robotic devices should not operate in a given area at a particular time or for the purposes of sharing other data. In some embodiments, the processor of the robotic device may use historical data with regards to prior work operations when planning an operational session.

In some embodiments, the processor of the robotic device may fail in a localization capacity and not recognize where it is located in a work environment. In some embodiments, if localization fails, the robotic device may begin a new mapping of the working environment, operating in a new functional and mapping capacity, visiting each work area, such as, each room, and mapping these areas beginning with the work area in which localization first failed. In some embodiments, the failure of localization may include the loss of data pertaining to the location of the robotic device's initial navigational starting point, such as the location of a docking or base station of the robotic device to which the robotic device returns following each work session. In some embodiments, when localization fails the processor of the robotic device may immediately begin to search for the base station. In some embodiments, when localization fails the robotic device may operate and map work areas while simultaneously searching for the base station. In some embodiments, when localization fails the robotic device may complete a work session, mapping the environment as it does so, and return to each work area after the work session to search for the base station. In some embodiments, the processor of the robotic device may search for the base station by searching for an IR light emitted by a transmitter of the base station to be received by the robotic device which will signal the robotic device to return to the base station. In some embodiments, the processor of the robotic device may search for a base station by rotating in 360 degrees in each work area until a signal from the base station is received by the robotic device. In some embodiments, if the robotic device does not detect a signal from the base station in a work area, the robotic device may automatically navigate to a different work area. In some embodiments, if the robotic device detects a signal from the base station in a work area, the robotic device may automatically cease operations and navigate directly to the base station. In some embodiments, if the robotic device detects a signal from the base station in a work area, the robotic device may navigate to a new work area before navigating back to the base station. In some embodiments, if the base station is detected by the robotic device, and the robotic device thereafter navigates to a new work area, a path plan may be set by the processor for navigating back to the base station. In some embodiments, if a first robotic device's localization fails, a processor of the first robotic device may communicate with a centralized control system, a base station, other devices or processors of other robotic devices to assist with the processor recovering a localization capacity. For example, if a first robotic device's localization fails, a processor of the first robotic device may send out, for example, a distress signal indicating that it has lost localization, and a processor of a second robotic device, may share data such as maps or other beneficial data with the processor of the first robotic device to assist the with recovering some form of a localization capacity. In an additional example, if the localization capacity of the processor of the robotic device fails, the processor may communicate with a centralized control system, base station, other devices or processors of other robotic devices to attempt to recover data such as maps or other beneficial data to assist the with recovering some form of a localization capacity. In some embodiments, the signal transmitter used may be an omni-directional signal emitter such as, for example, an IR signal emitter. In some embodiments, the signal transmitter may be located on the robotic device and the signal may be received by the base station. In some embodiments, when localization fails, the robotic device may detect and mark obstacles encountered in the environment within a new map generated during the operational cycle as the robotic device navigates in the work environment. In some embodiments, features on the base station may be used for the processor of the robotic device to easily distinguish when searching for the base station. For example, unique angles or physical characteristics of a base station may be implemented in memory of the processor to help the processor easily identify the base station. Further, characteristics of a surface of a base station such as printing, painting, patterns, and the like may be used by the processor to easily identify the base station. Further details of methods for recognizing prior rooms and skipping prior rooms visited are disclosed in U.S. Patent Application No. 62/740,558, the entire contents of which is hereby incorporated by reference.

In some embodiments, the processor of the robotic device generates a movement path in real-time based on the observed environment. In some embodiments, the processor of the robotic devices determines a movement path in real-time based on sensor observations captured by sensors. In some embodiments, a topological graph represents the movement path and is described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the robotic device as it follows along edges linked at vertices. While executing the movement path, in some embodiments, rewards may be assigned by the processor as the robotic device takes actions to transition between states and uses the net cumulative reward to evaluate a particular movement path comprised of actions and states. A state-action value function may be iteratively calculated during execution of the movement path based on the current reward and maximum future reward at the next state. One goal is to find optimal state-action value function and optimal policy by identifying the highest valued action for each state. As different topological graphs including vertices and edges with different properties are executed over time, the number of states experienced, actions taken from each state, and transitions increase. The path devised by the processor of the robotic device iteratively evolves to become more efficient by choosing transitions that result in most favorable outcomes and by avoiding situations that previously resulted in low net reward. After convergence, the evolved movement path is determined to be more efficient than alternate paths that may be devised using real-time sensory input of the working environment. In some embodiments, the reward is determined individually for the robotic device, or the reward is a cumulative reward of each of the two or more robotic devices collaborating with another. For example, the movement path chosen for each of the two or more robotic devices collectively maximizes the cumulative reward. Further, the states, actions, and outcomes experienced by one robotic device may be shared with other robotic devices operating within the same environment such that actions that resulted in poor outcome may be avoided. For example, if one robotic device finds that the action of transitioning to a particular state results in the robotic device becoming stuck, this information may be shared with other processors of other robotic devices such that they may avoid that particular action.

In some embodiments, the properties of the vertices and edges of the topological graph describing the movement path of the robotic device may be provided at run-time as an argument based on sensory input of the robotic device or other collaborating robotic devices or from external sensors. A property of a vertex may be, for example, its position and the number and position of vertices linked via edges. A property of an edge may be, for example, edge type such as a line or arc, edge length or radius depending on edge type, angular orientation and connecting vertices. In some embodiments, vertices and edges may also include other properties such as driving surface type (e.g., gravel, paved, hard wood floor, carpet, tile, etc.), area identifier (e.g., excavation area, soil dump site, parking lot, highway, bedroom, kitchen, etc.) and/or driving conditions (e.g., maximum speed). In some embodiments, the number of roots or nodes of the topological graph is limited to one. A vertex designated as a root within the topological graph by the processor of the robotic device is capable of reaching the whole graph from the designated vertex, i.e. there is a path from the root to all other vertices and edges within the graph.

As the processor receives sensory input (from a local or remote sources), in some embodiments, it creates a representation of the map in a taxicab coordinate system and begins to devise a topological path within discovered areas, i.e. areas for which sensory input has been collected, the edges of the path being lines following along the gridlines of the taxicab coordinate system. Sensory input may be, for example, a collection of distance measurements. In some embodiments, distance measurements may be taken using distance measurement devices such as LIDAR, camera, laser, sonar, ultrasonic, stereo vision, structured light vision devices or chip-based depth sensors using CMOS or CCD imagers, IR sensors, and such. In some embodiments, other sensory input may be used, for example, data indicating driving surface type or obstacle detection. For example, optical driving surface sensors may detect a pattern of reflected light emitted onto the driving surface, which upon multiple stages of signal processing and machine learning embodiments may determine to a degree of certainty the type of driving surface upon which the robotic device drives. As a further example, obstacles may be detected by embodiments based on a sensed reflection of emitted light from an obstacle sensor. Tactile sensors may also be used by embodiments to provide sensory input to the processor when physical contact is made with an object. The devised topological path may be based on estimates of suitable properties for vertices and edges based on sensory input received. The next action or movement of the robotic device may be along a path defined by the estimated properties of the vertices and edges. As the robotic device executes the action, it transitions from its current state to a new state. After completing each action and transitioning to a new state, in embodiments, a reward may be assigned by the processor and a state-action value function may be iteratively calculated based on the current reward and the maximum future reward at the next state. In some embodiments, e.g., where time is not considered discrete, the value of the reward may be dependent on sequential time required to complete the action and transition to the new state, where a greater negative reward is assigned for longer times. As such, in some embodiments, the robotic device incurs a negative reward at all times. Since the robotic device is penalized for time, any event that may reduce the efficiency of the robotic device in terms of time to complete its task increases its overall penalty. These events may include collisions with obstacles, number of U-turns, repeat actions, driving distance, and driving on particular types of driving surfaces. In some embodiments, the processor uses these events to directly assign negative reward thereby acting as optimization factors themselves. In some embodiments, the processor uses other efficiency metrics, such as percentage or level of task completion. Once the robotic device completes its task and hence the topological movement path required to complete the task, a positive reward value (e.g., predetermined or dynamically determined) may be assigned. A net reward value for the executed movement path, consisting of a sequence of states and actions, may then be calculated as the sum of the cumulative negative reward from the multiple actions taken while transitioning from one state to another and the positive reward upon completion of the task. In some embodiments, the state is a collection of current states of two or more robotic devices collaborating with one another and the reward is a cumulative reward of each of the two or more robotic devices collaborating.

As multiple work sessions are executed over time, in embodiments, optimal state-action value function and optimal policy from which actions from different states are selected may be determined. From a single state, there may be several actions that may be executed. The sequence of states and actions that result in the maximum net reward, in some embodiments, provides the optimal state-action value function. The action from a state which results in the highest reward provides the optimal policy for the given state. As different movement paths are executed over time, the number of states experienced, actions taken from each state, and transitions increase. In some embodiments, the processor devises a path for the robotic device iteratively over multiple work sessions, evolving to become more efficient by choosing transitions that result in most favorable outcomes and by avoiding situations that previously resulted in low net reward. In some embodiments, properties for each movement path are selected within an assigned work cycle such that the cumulative penalty value for consecutive work cycles have a lowering trend over time. In some embodiments, convergence to a particular movement path may be executed by the processor of the robotic device when the reward is maximized or a target reward is achieved or a period of time has passed after which the processor may converge the movement path to the path with highest reward. After convergence, assuming the system did not fall into a local minimum or is able to get out of a local minimum, the evolved movement path may be deemed by the processor of the robotic device to likely be more efficient than alternate paths that may possibly be devised using real-time sensory input of the working environment.

The states and actions of the robotic device devising and executing the movement path may be represented by a Markov Chain comprised of a sequence of random variables $s_1, s_2, s_3, \ldots$. The random variables are states the robotic device may experience and form a set S called the state space. The topological graph defining the movement path of the robotic device may therefore be thought of as a sequence of states $s \in S$, where states are connected by paths and are each defined with a discrete time stamp $t \in T$. For the robotic device to transition from a current state s to next state s', the robotic device performs an action $a \in A$ over a time span of t to t', displacing a distance d along an edge of the topological graph. When the state space is defined by a taxicab coordinate system, the distance d is given by the rectilinear distance or L1 norm and displacement is along a line. For a Markov chain, having Markov property, the probability of moving to a next state P(s'|s). is dependent only on the present state. A Markov chain may, therefore, be represented by a topological graph, where the edges of graph t are labelled by the probabilities of transitioning from one state at time t to another at time t'. A Markov chain may be extended to a Markov Decision Process (MDP) through the addition of actions (choices) and rewards (motivation), such that there are multiple actions that may be chosen from a single state and a different reward associated with each action. MDP is a five-tuple comprising a finite set of states S, a finite set of actions A, the probability that action a will lead to state s' at time t' given by P(s'|s), the immediate reward after transitioning from state s to state s' given by r, and the discount factor $\gamma$, representing the difference in importance between future and present rewards. The goal of the MDP is to find an optimal state-action value function by identifying sequence of states and actions with highest net reward. Since multiple actions may be taken from each state, the goal is to also find an optimal policy that indicates the action from each state with the highest reward value.

In a MDP actions are taken to transition from one state to another and after transitioning to each new state a reward is assigned. For a sequence of states and actions, the net reward is the sum of rewards received for the sequence of states and actions, with future rewards discounted. The expected net reward for the execution of a sequence of states and actions is given by a state-action value function. The goal is to find an optimal state-action value function by identifying sequence of states and actions with highest net reward. Since multiple actions can be taken from each state, the goal is to also find an optimal policy that indicates the action from each state with the highest reward value. Consider a sequence of states s and actions a followed by rewards r, $s_t$, $a_t$, $r_{t+1}$, $s_{t+1}$, $a_{t+1}$, $r_{t+2}$, $s_{t+2}$, $a_{t+2}$, $r_{t+3}$, ... $a_T$, $r_T$, $s_T$. The net return $R_T = r_{t+1} + \gamma^1 r_{t+2} + \ldots + \gamma^{T-t-1} r_T$ to be expected in the future is the sum of the rewards received for the sequence of states and actions beginning from state $s_t$ and ending with terminal state $s_T$, wherein $0 \leq \gamma < 1$ is a discount factor applied as distant rewards are less important. The value of a state-action pair $Q(s, a) = E[R_T | s_t = s, a_t = a]$ is defined as equivalent to the expected return $R_T$ for the sequence of states and actions beginning with state $s_t$ and action $a_t$ and ending with terminal state $s_T$. By finding the sequence of states and actions which maximize the state-action value function $Q(s, a)$, the optimal value function $Q^*(s, a) = \max E[R_T | s_t = s, a_t = a]$ is identified. And the optimal policy $\pi^*(s) = \arg\max Q^*(s, a)$ for each state may be derived by identifying the highest valued action which can be taken from each state. To iteratively calculate the state-action value function for a given state s and action a, the Bellman Optimality equation may be applied. The optimal value function obeys Bellman Optimality equation and may be expressed as $Q^*(s, a) = E[r + \gamma \max Q^*(s', a')]$. The equation expresses that the value for a given state s and action a should represent the current reward r observed at state s plus the maximum discounted y future reward for the next state s' the robotic device would end up in. This equation can be used by the processor to iteratively calculate the state-action value $Q_{i+1}(s, a) = E[r + \gamma Q_i(s', a')]$ for a given state s and action a as the sequence of states and action are executed. i is the iteration number and begins at i=0, with $Q_0(s', a')$ being initially assumed based, for example, on previous experience, the midpoint of the min and max value possible, or an arbitrary value. Based on the definition of an expected value, the equation is equivalent to $Q_{i+1}(s, a) = \Sigma P(s'|s) [r + \gamma \max Q_i(s', a')]$, wherein $P(s'|s)$ is the probability that action a will lead to state s', as previously described above. In the particular application of determining optimal movement path, the sequence of states and actions corresponds to the states visited and actions taken while executing the movement path from start to finish, where actions are defined by the properties of vertices and edges chosen based on sensory input from sensors of the robotic device or sensors of other robotic devices or fixed sensing devices. Over time, as more states are visited and different actions from each state are evaluated the system will converge to find the most optimal action to take from each state thereby forming an optimal policy. Further, as different sequences of states and actions, i.e. movement paths, are evaluated over time, the system will converge to the most optimal sequence of states and actions.

Path planning methods that may be used are described in U.S. patent application Ser. Nos. 16/041,286, 16/422,234, 15/406,890, 15/676,888, and 14/673,633, the entire contents of which are hereby incorporated by reference. For example, in some embodiments, the processor of a robot may learn a path, such as a path between a first location and a second location, in a variety of ways. In some embodiments, the processor of the robot may be taught a path by directing the robot along the desired path by physically moving the robot or by using a remote control or an application of a communication device paired with the processor of the robot. Other methods of moving the robot along the desired path may also be used, such as voice commands. In some embodiments, a live video feed (or real-time images) of a camera mounted on the robot is transmitted to a remote operator that controls movement of the robot using an input device (e.g., joystick, keyboard, mouse, touchscreen of communication device, etc.). In some embodiments, the processor of the robot may be taught a path between the first location and second location by physically wheeling the robot from the first location, through the environment, to the second location. In some embodiments, the first location is the same as the second location. In some embodiments, the processor of the robotic device is taught the same path or different paths multiple times in the same area. In some embodiments, the processor of the robot is taught one or more paths for one or more different areas (e.g., kitchen, bathroom, bedroom, etc.) and paths to navigate between one or more areas. Over time, as the processor learns more and more paths, the processor becomes more efficient at covering areas or navigating between two areas or locations. In some embodiments, the processor collects data using one or more sensors during learning one or more paths and uses data collected to learn most efficient coverage of an area or navigation between areas or locations. In some embodiments, the processor of the robot uses similar methods and techniques as those described above for learning and converging to the most efficient movement path during manual training, wherein the robot is controlled to move along a particular path. In another example, a user may remotely guide the robot using an input device based on a live video feed from a camera of the robot transmitted to a communication device (e.g., laptop, smartphone, tablet, etc.) of the operator. In some embodiments, the operator directs the robot, from a first location to a second location. In some embodiments, the robot is manually navigated to a specific location a predetermined amount of times before it autonomously navigates to the specific location. In some embodiments, the details learned by a processor during path learning may be shared with one or more other processors of one or more robots, such that details learned by a single processor may improve SLAM of other processors of other robots. For example, during manual training a processor may learn to avoid a particular area due to high obstacle density and may mark it in the map. This may be shared with processors of other robots operating in the same environment.

In some embodiments path learning may be initiated by, for example, a user pressing a start button on the robot or on any other device capable of communicating with the processor of the robot, voice activation or autonomously upon startup, prior to beginning the process of teaching a path to a processor of the robot. In some embodiments, path learning may be completed by, for example, pressing an end button on the robot or on any other device capable of communicating with the processor of the robot, voice activation, or autonomously upon detecting no movement of the robot for a predetermined amount of time. Path learning may be initiated when the robot is positioned at a first location and completed after the robot has navigated along the desired path and returned back to the first location or any other location. In some embodiments, path learning may be initiated when the robot is positioned at a first location and completed after the robot has navigated along the desired path to the second location. Alternatively, in some embodiments, path learning may be initiated and completed using an application of a communication device, such as a mobile device, laptop or smart phone, capable of communicating with the robot. In some embodiments, an application of a communication device may be used to mark a path of the robot within a map of the working environment that may be shared with the processor of the robot and the processor actuates the robot to move along the path. During path learning, the processor of the robot may determine its location within an internal map of the working environment while simultaneously mapping the environment. In some instance, the processor of the robot may mark observed obstacles in the working environment within an internal map of the environment. In some embodiments, the robot includes an extendable handle that a user may use to physically wheel the robot along a path. In some embodiments, a communication device may be used to manually direct the robot along a path. In some embodiments, the communications device is part of the robot and it detachable and wireless. In some embodiments, the communication device is a personal device that executes an application paired with the processor of the robot. In some embodiments, the communication device is a user interface built into the robot.

In some embodiments, the robotic device executes a wall or perimeter follow path or another type of path that includes segments parallel to one or more walls or perimeters within the environment (e.g., boustrophedon). In some embodiments, the processor estimates a major wall-angle of a room to align the path of the robot with a wall in the room. In some embodiments, the processor determines a set of all obstacle locations (e.g., walls, furniture, etc.) in a current map of the environment (e.g., partial or full map) and divides the set of all obstacles locations into subsets including contiguous obstacle locations (i.e., connected obstacle locations). For example, a portion of obstacle locations within the set of all obstacle locations may correspond with a wall. The portion of obstacle locations corresponding with the wall of the environment may be contiguous as they are positioned immediately adjacent to one another and collectively form the wall, and thus may be a subset. In another example, a portion of obstacle locations corresponding with a piece of furniture may form a subset. In some embodiments, the processor determines the largest subset of contiguous obstacle locations and orders the obstacle locations within that subset (e.g., such that the contiguous obstacle locations are ordered from right to left or vice versa). In some embodiments, the processor executes a simplification algorithm (e.g., Ramer/Douglas/Puecker algorithm) over the ordered obstacle locations that eliminates obstacle locations from the subset that are within a predetermined distance from the line connecting a previous and next obstacle location. In some embodiments, the processor connects the obstacle locations remaining in the subset, resulting in one or more line segments. In some embodiments, the processor determines the angle of the longest line segment with respect to the coordinate system of the robot to estimate the room orientation such that it may follow a path parallel to one or more walls.

In some embodiments, the processor may divide the environment into zones and order zones for coverage to improve efficiency. Examples of methods for dividing an environment into zones for coverage are described in U.S. patent application Ser. Nos. 14/817,952, 15/619,449, 16/198,393, 14/673,633, and 15/676,888, the entire contents of which are hereby incorporated by reference.

In some embodiments, the processor of the robotic device autonomously adjust settings based on environmental characteristics observed using one or more environmental sensors (e.g., sensors that sense attributes of a driving surface, a wall, or a surface of an obstacle in an environment). Examples of methods for adjusting settings of a robot based on environmental characteristics observed are described in U.S. Patent Application No. 62/735,137 and Ser. No. 16/239,410. For example, processor may increase the power provided to the wheels when driving over carpet as compared to hardwood such that a particular speed may be maintained despite the added friction from the carpet. The processor may determine driving surface type using sensor data, wherein, for example, distance measurements for hard surface types are more consistent over time as compared to soft surface types due to the texture of grass. In some embodiments, the environmental sensor is communicatively coupled to the processor of the robotic device and the processor of the robotic device processes the sensor data (a term which is used broadly to refer to information based on sensed information at various stages of a processing pipeline). In some embodiments, the sensor includes its own processor for processing the sensor data. Examples of sensors include, but are not limited to (which is not to suggest that any other described component of the robotic cleaning device is required in all embodiments), floor sensors, debris sensors, obstacle sensors, cliff sensors, acoustic sensors, cameras, optical sensors, distance sensors, motion sensors, tactile sensors, electrical current sensors, and the like. In some embodiments, the optoelectronic system described above may be used to detect floor types based on, for example, the reflection of light. For example, the reflection of light from a hard surface type, such as hardwood flooring, is sharp and concentrated while the reflection of light from a soft surface type, such as carpet, is dispersed due to the texture of the surface. In some embodiments, the floor type may be used by the processor to identify the rooms or zones created as different rooms or zones include a particular type of flooring. In some embodiments, the optoelectronic system may simultaneously be used as a cliff sensor when positioned along the sides of the robotic device. For example, the light reflected when a cliff is present is much weaker than the light reflected off of the driving surface. In some embodiments, the optoelectronic system may be used as a debris sensor as well. For example, the patterns in the light reflected in the captured images may be indicative of debris accumulation, a level of debris accumulation (e.g., high or low), a type of debris (e.g., dust, hair, solid particles), state of the debris (e.g., solid or liquid) and a size of debris (e.g., small or large). In some embodiments, Bayesian techniques are applied. In some embodiments, the processor may use data output from the optoelectronic system to make a priori measurement (e.g., level of debris accumulation or type of debris or type of floor) and may use data output from another sensor to make a posterior measurement to improve the probability of being correct. For example, the processor may select possible rooms or zones within which the robotic device is located a priori based on floor type detected using data output from the optoelectronic sensor, then may refine the selection of rooms or zones posterior based on door detection determined from depth sensor data. In some embodiments, the output data from the optoelectronic system is used in methods described above for the division of the environment into two or more zones.

The one or more environmental sensors may sense various attributes of one or more of these features of an environment, e.g., particulate density, rolling resistance experienced by robot wheels, hardness, location, carpet depth, sliding friction experienced by robot brushes, hardness, color, acoustic reflectivity, optical reflectivity, planarity, acoustic response of a surface to a brush, and the like. In some embodiments, the sensor takes readings of the environment (e.g., periodically, like more often than once every 5 seconds, every second, every 500 ms, every 100 ms, or the like) and the processor obtains the sensor data. In some embodiments, the sensed data is associated with location data of the robotic device indicating the location of the robotic device at the time the sensor data was obtained. In some embodiments, the processor infers environmental characteristics from the sensory data (e.g., classifying the local environment of the sensed location within some threshold distance or over some polygon like a rectangle as being with a type of environment within a ontology, like a hierarchical ontology). In some embodiments, the processor infers characteristics of the environment in real-time (e.g., during a cleaning or mapping session, with 10 seconds of sensing, within 1 second of sensing, or faster) from real-time sensory data. In some embodiments, the processor adjusts various operating parameters of actuators, like speed, torque, duty cycle, frequency, slew rate, flow rate, pressure drop, temperature, brush height above the floor, or second or third order time derivatives of the same. For instance, some embodiments adjust the speed of components (e.g., main brush, peripheral brush, wheel, impeller, lawn mower blade, etc.) based on the environmental characteristics inferred (in some cases in real-time according to the preceding sliding windows of time). In some embodiments, the processor activates or deactivates (or modulates intensity of) functions (e.g., vacuuming, mopping, UV sterilization, digging, mowing, salt distribution, etc.) based on the environmental characteristics inferred (a term used broadly and that includes classification and scoring). In other instances, the processor adjusts a movement path, operational schedule (e.g., time when various designated areas are operated on or operations are executed), and the like based on sensory data. Examples of environmental characteristics include driving surface type, obstacle density, room type, level of debris accumulation, level of user activity, time of user activity, etc.

In some embodiments, the processor of the robotic device marks inferred environmental characteristics of different locations of the environment within a map of the environment based on observations from all or a portion of current and/or historical sensory data. In some embodiments, the processor modifies the environmental characteristics of different locations within the map of the environment as new sensory data is collected and aggregated with sensory data previously collected or based on actions of the robotic device (e.g., operation history). For example, in some embodiments, the processor of a street sweeping robot determines the probability of a location having different levels of debris accumulation (e.g., the probability of a particular location having low, medium and high debris accumulation) based on the sensory data. If the location has a high probability of having a high level of debris accumulation and was just cleaned, the processor reduces the probability of the location having a high level of debris accumulation and increases the probability of having a low level of debris accumulation. Based on sensed data, some embodiments may classify or score different areas of a working environment according to various dimensions, e.g., classifying by driving surface type in a hierarchical driving surface type ontology or according to a dirt-accumulation score by debris density or rate of accumulation.

In some embodiments, the map of the environment is a grid map wherein the map is divided into cells (e.g., unit tiles in a regular or irregular tiling), each cell representing a different location within the environment. In some embodiments, the processor divides the map to form a grid map. In some embodiments, the map is a Cartesian coordinate map while in other embodiments the map is of another type, such as a polar, homogenous, or spherical coordinate map. In some embodiments, the environmental sensor collects data as the robotic device navigates throughout the environment or operates within the environment as the processor maps the environment. In some embodiments, the processor associates each or a portion of the environmental sensor readings with the particular cell of the grid map within which the robotic device was located when the particular sensor readings were taken. In some embodiments, the processor associates environmental characteristics directly measured or inferred from sensor readings with the particular cell within which the robotic device was located when the particular sensor readings were taken. In some embodiments, the processor associates environmental sensor data obtained from a fixed sensing device and/or another robot with cells of the grid map. In some embodiments, the robotic device continues to operate within the environment until data from the environmental sensor is collected for each or a select number of cells of the grid map. In some embodiments, the environmental characteristics (predicted or measured or inferred) associated with cells of the grid map include, but are not limited to (which is not to suggest that any other described characteristic is required in all embodiments), a driving surface type, a room or area type, a type of driving surface transition, a level of debris accumulation, a type of debris, a size of debris, a frequency of encountering debris accumulation, day and time of encountering debris accumulation, a level of user activity, a time of user activity, an obstacle density, an obstacle type, an obstacle size, a frequency of encountering a particular obstacle, a day and time of encountering a particular obstacle, a level of traffic, a driving surface quality, a hazard, etc. In some embodiments, the environmental characteristics associated with cells of the grid map are based on sensor data collected during multiple working sessions wherein characteristics are assigned a probability of being true based on observations of the environment over time.

In some embodiments, the processor associates (e.g., in memory of the robotic device) information such as date, time, and location with each sensor reading or other environmental characteristic based thereon. In some embodiments, the processor associates information to only a portion of the sensor readings. In some embodiments, the processor stores all or a portion of the environmental sensor data and all or a portion of any other data associated with the environmental sensor data in a memory of the robotic device. In some embodiments, the processor uses the aggregated stored data for optimizing (a term which is used herein to refer to improving relative to previous configurations and does not require a global optimum) operations within the environment by adjusting settings of components such that they are ideal (or otherwise improved) for the particular environmental characteristics of the location being serviced or to be serviced.

In some embodiments, the processor generates a new grid map with new characteristics associated with each or a portion of the cells of the grid map at each work session. For instance, each unit tile may have associated therewith a plurality of environmental characteristics, like classifications in an ontology or scores in various dimensions like those discussed above. In some embodiments, the processor compiles the map generated at the end of a work session with an aggregate map based on a combination of maps generated during each or a portion of prior work sessions. In some embodiments, the processor directly integrates data collected during a work session into the aggregate map either after the work session or in real-time as data is collected. In some embodiments, the processor aggregates (e.g., consolidates a plurality of values into a single value based on the plurality of values) current sensor data collected with all or a portion of sensor data previously collected during prior working sessions of the robotic device. In some embodiments, the processor also aggregates all or a portion of sensor data collected by sensors of other robotic devices or fixed sensing devices monitoring the environment.

In some embodiments, the processor (e.g., of a robot or a remote server system, either one of which (or a combination of which) may implement the various logical operations described herein) determines probabilities of environmental characteristics (e.g., an obstacle, a driving surface type, a type of driving surface transition, a room or area type, a level of debris accumulation, a type or size of debris, obstacle density, level of traffic, driving surface quality, etc.) existing in a particular location of the environment based on current sensor data and sensor data collected during prior work sessions. For example, in some embodiments, the processor updates probabilities of different driving surface types existing in a particular location of the environment based on the currently inferred driving surface type of the particular location and the previously inferred driving surface types of the particular location during prior working sessions of the robotic device and/or of other robots or fixed sensing devices monitoring the environment. In some embodiments, the processor updates the aggregate map after each work session. In some embodiments, the processor adjusts speed of components and/or activates/deactivates functions based on environmental characteristics with highest probability of existing in the particular location of the robotic device such that they are ideal for the environmental characteristics predicted. For example, based on aggregate sensory data there is an 85% probability that the type of driving surface in a particular location is hardwood, a 5% probability it is carpet, and a 10% probability it is tile. The processor adjusts the speed of components to ideal speed for hardwood flooring given the high probability of the location having hardwood flooring. Some embodiments may classify unit tiles into a flooring ontology, and entries in that ontology may be mapped in memory to various operational characteristics of actuators of the robotic device that are to be applied.

In some embodiments, the processor uses the aggregate map to predict areas with high risk of stalling, colliding with obstacles and/or becoming entangled with an obstruction. In some embodiments, the processor records the location of each such occurrence and marks the corresponding grid cell(s) in which the occurrence took place. For example, the processor uses aggregated obstacle sensor data collected over multiple work sessions to determine areas with high probability of collisions or aggregated electrical current sensor of a peripheral brush motor or motor of another device to determine areas with high probability of increased electrical current due to entanglement with an obstruction. In some embodiments, the processor causes the robotic device to avoid or reduce visitation to such areas.

In some embodiments, the processor uses the aggregate map to determine a navigational path within the environment, which in some cases, may include a coverage path in various areas (e.g., areas including collections of adjacent unit tiles, like rooms in a multi-room work environment). Various navigation paths may be implemented based on the environmental characteristics of different locations within the aggregate map. For example, the processor may generate a movement path that covers areas only requiring low impeller motor speed (e.g., areas with low debris accumulation, areas with hardwood floor, etc.) when individuals are detected as being or predicted to be present within the environment to reduce noise disturbances. In another example, the processor generates (e.g., forms a new instance or selects an extant instance) a movement path that covers areas with high probability of having high levels of debris accumulation, e.g., a movement path may be selected that covers a first area with a first historical rate of debris accumulation and does not cover a second area with a second, lower, historical rate of debris accumulation.

In some embodiments, the processor of the robotic device uses real-time environmental sensor data (or environmental characteristics inferred therefrom) or environmental sensor data aggregated from different working sessions or information from the aggregate map of the environment to dynamically adjust the speed of components and/or activate/deactivate functions of the robotic device during operation in an environment. For example, an electrical current sensor may be used to measure the amount of current drawn by a motor of a main brush in real-time. The processor may infer the type of driving surface based on the amount current drawn and in response adjusts the speed of components such that they are ideal for the particular driving surface type. For instance, if the current drawn by the motor of the main brush is high, the processor may infer that a robotic vacuum is on carpet, as more power is required to rotate the main brush at a particular speed on carpet as compared to hard flooring (e.g., wood or tile). In response to inferring carpet, the processor may increase the speed of the main brush and impeller (or increase applied torque without changing speed, or increase speed and torque) and reduce the speed of the wheels for a deeper cleaning. Some embodiments may raise or lower a brush in response to a similar inference, e.g., lowering a brush to achieve a deeper clean. In a similar manner, an electrical current sensor that measures the current drawn by a motor of a wheel may be used to predict the type of driving surface, as carpet or grass, for example, requires more current to be drawn by the motor to maintain a particular speed as compared to hard driving surface. In some embodiments, the processor aggregates motor current measured during different working sessions and determines adjustments to speed of components using the aggregated data. In another example, a distance sensor takes distance measurements and the processor infers the type of driving surface using the distance measurements. For instance, the processor infers the type of driving surface from distance measurements of a time-of-flight ("TOF") sensor positioned on, for example, the bottom surface of the robotic device as a hard driving surface when, for example, when consistent distance measurements are observed over time (to within a threshold) and soft driving surface when irregularity in readings are observed due to the texture of for example, carpet or grass. In a further example, the processor uses sensor readings of an image sensor with at least one IR illuminator or any other structured light positioned on the bottom side of the robotic device to infer type of driving surface. The processor observes the signals to infer type of driving surface. For example, driving surfaces such as carpet or grass produce more distorted and scattered signals as compared with hard driving surfaces due to their texture. The processor may use this information to infer the type of driving surface.

In some embodiments, the processor infers presence of users from sensory data of a motion sensor (e.g., while the robotic device is static, or with a sensor configured to reject signals from motion of the robotic device itself). In response to inferring the presence of users, the processor may reduce motor speed of components (e.g., impeller motor speed) to decrease noise disturbance. In some embodiments, the processor infers a level of debris accumulation from sensory data of an audio sensor. For example, the processor infers a particular level of debris accumulation and/or type of debris based on the level of noise recorded. For example, the processor differentiates between the acoustic signal of large solid particles, small solid particles or air to determine the type of debris and based on the duration of different acoustic signals identifies areas with greater amount of debris accumulation. In response to observing high level of debris accumulation, the processor of a surface cleaning robot, for example, increases the impeller speed for stronger suction and reduces the wheel speeds to provide more time to collect the debris. In some embodiments, the processor infers level of debris accumulation using an IR transmitter and receiver positioned along the debris flow path, with a reduced density of signals indicating increased debris accumulation. In some embodiments, the processor infers level of debris accumulation using data captured by an imaging device positioned along the debris flow path. In other cases, the processor uses data from an IR proximity sensor aimed at the surface as different surfaces (e.g. clean hardwood floor, dirty hardwood floor with thick layer of dust, etc.) have different reflectance thereby producing different signal output. In some instances, the processor uses data from a weight sensor of a dustbin to detect debris and estimate the amount of debris collected. In some instances, a piezoelectric sensor is placed within a debris intake area of the robotic device such that debris may make contact with the sensor. The processor uses the piezoelectric sensor data to detect the amount of debris collected and type of debris based on the magnitude and duration of force measured by the sensor. In some embodiments, a camera captures images of a debris intake area and the processor analyzes the images to detect debris, approximate the amount of debris collected (e.g. over time or over an area) and determine the type of debris collected. In some embodiments, an IR illuminator projects a pattern of dots or lines onto an object within the field of view of the camera. The camera captures images of the projected pattern, the pattern being distorted in different ways depending the amount and type of debris collected. The processor analyzes the images to detect when debris is collected and to estimate the amount and type of debris collected. In some embodiments, the processor infers a level of obstacle density from sensory data of an obstacle sensor. For example, in response to inferring high level of obstacle density, the processor reduces the wheel speeds to avoid collisions. In some instances, the processor adjusts a frame rate (or speed) of an imaging device and/or a rate (or speed) of data collection of a sensor based on sensory data.

In some embodiments, a memory of the robotic device includes an internal database of types of debris likely to be encountered within the environment. In some embodiments, the processor identifies the type of debris collected in the environment by using the data of various sensors capturing the features of the debris (e.g., camera, pressure sensor, acoustic sensor, etc.) and comparing those features with features of different types of debris stored in the internal database. In some embodiments, the processor determines the likelihood of collecting a particular type of debris in different areas of the environment based on, for example, current and historical data. For example, a robotic device encounters accumulated dog hair on the surface. Image sensors of the robotic device capture images of the debris and the processor analyzes the images to determine features of the debris. The processor compares the features to those of different types of debris within the internal database and matches them to dog hair. The processor marks the region in which the dog hair was encountered within a map of the environment as a region with increased likelihood of encountering dog hair. The processor increases the likelihood of encountering dog hair in that particular region with increasing number of occurrences. In some embodiments, the processor further determines if the type of debris encountered may be cleaned by a cleaning function of the robotic device. For example, a processor of a robotic vacuum determines that the debris encountered is a liquid and that the robotic device does not have the capabilities of cleaning the debris. In some embodiments, the processor of the robotic device incapable of cleaning the particular type of debris identified communicates with, for example, a processor of another robotic device capable of cleaning the debris from the environment. In some embodiments, the processor of the robotic device avoids navigation in areas with particular type of debris detected.

In some embodiments, the processor adjusts speed of components, selects actions of the robotic device, and adjusts settings of the robotic cleaning device, each in response to real-time or aggregated sensor data (or environmental characteristics inferred therefrom). For example, the processor may adjust the speed or torque of a main brush motor, an impeller motor, a peripheral brush motor or a wheel motor, activate or deactivate (or change luminosity or frequency of) ultraviolet (UV) treatment from a UV light configured to emit below a robot, steam and/or liquid mopping (e.g., modulating flow rate of soap or water), sweeping, or vacuuming (e.g., modulating pressure drop or flow rate), set a cleaning schedule, adjust a cleaning path, etc. in response to real-time or aggregated sensor data (or environmental characteristics inferred therefrom). In one instance, the processor of the robotic cleaning device may determine a cleaning path based on debris accumulation data of the aggregate map such that the cleaning path first covers areas with high likelihood of high levels of debris accumulation (relative to other areas of the work environment), then covers areas with high likelihood of low levels of debris accumulation. Or the processor may determine a cleaning path based on cleaning all areas having a first type of flooring before cleaning all areas having a second type of flooring. In another instance, the processor of the robotic cleaning device may determine the speed of an impeller motor based on most likely debris size or floor type marked in the aggregate map such that higher speeds are used in areas with high likelihood of large sized debris or carpet and lower speeds are used in areas with high likelihood of small sized debris or hard flooring. In another example, the processor of the robotic devices determines when to use UV treatment based on data indicating debris type of the aggregate map such that areas with high likelihood of having debris that can cause sanitary issues, such as food, receive UV or other type of specialized treatment.

In a further example, the processor identifies a user in a particular area of the environment using obstacle sensor data collected during an operational session. In response, the processor reduces the speed of noisy components when operating within the particular area or avoids the particular area to reduce noise disturbances to the user. In some embodiments, the processor controls operation of one or more components of the robotic device based on environmental characteristics inferred from sensory data. For example, the processor deactivates one or more peripheral brushes of a surface cleaning device passing over locations with high obstacle density to avoid entanglement with obstacles. In another example, the processor activates the one or more peripheral brushes passing over location with high level of debris accumulation. In some instances, the processor adjusts the speed of the one or more peripheral brushes according to the level of debris accumulation.

In some embodiments, the processor of the robotic device determines speed of components and actions of the robotic device at a location based on different environmental characteristics of the location within an environment. In some embodiments, the processor assigns certain environmental characteristics a higher weight (e.g., importance or confidence) when determining speed of components and actions of the robotic device. In some embodiments, input into the application of the communication device specifies or modifies environmental characteristics of different locations within the map of the environment. For example, driving surface type of locations, locations likely to have high and low levels of debris accumulation, locations likely to have a specific type or size of debris, locations with large obstacles, etc. are specified or modified using the application of the communication device.

In some embodiments, the processor may use machine learning techniques to predict environmental characteristics using sensor data such that adjustments to speed of components of the robotic device may be made autonomously and in real-time to accommodate the current environment. Examples can include, but are not limited to, adjustments to the speed of components (e.g., a cleaning tool such a main brush or side brush, wheels, impeller, cutting blade, digger, salt or fertilizer distributor, or other component depending on the type of robot), activating/deactivating functions (e.g., UV treatment, sweeping, steam or liquid mopping, vacuuming, mowing, ploughing, salt distribution, fertilizer distribution, digging, and other functions depending on the type of robot), adjustments to movement path, adjustments to the division of the environment into subareas, and operation schedule, etc. In some embodiments, the processor may use a classifier such as a convolutional neural network to classify real-time sensor data of a location within the environment into different environmental characteristic classes such as driving surface types, room or area types, levels of debris accumulation, debris types, debris sizes, traffic level, obstacle density, human activity level, driving surface quality, and the like. In some embodiments, the processor dynamically and in real-time may adjust the speed of components of the robotic device based on the current environmental characteristics. Initially, the processor may train the classifier such that it can properly classify sensor data to different environmental characteristic classes. In some embodiments, training may be executed remotely and trained model parameter may be downloaded to the robotic device, which is not to suggest that any other operation herein must be performed on-robotic device. The processor may train the classifier by, for example, providing the classifier with training and target data that contains the correct environmental characteristic classifications of the sensor readings within the training data. For example, the processor may train the classifier to classify electric current sensor data of a wheel motor into different driving surface types. For instance, if the magnitude of the current drawn by the wheel motor is greater than a particular threshold for a predetermined amount of time, the classifier may classify the current sensor data to a carpet driving surface type class (or other soft driving surface depending on the environment of the robotic device) with some certainty. In other embodiments, the processor may classify sensor data based on the change in value of the sensor data over a predetermined amount of time or using entropy. For example, the processor may classify current sensor data of a wheel motor into a driving surface type class based on the change in electrical current over a predetermined amount of time or entropy value. In response to predicting an environmental characteristic, such as a driving type, the processor adjusts the speed of components such that they are optimal for operating in an environment with the particular characteristics predicted, such as a predicted driving surface type. In some embodiments, adjusting the speed of components includes adjusting the speed of the motors driving the components. In some embodiments, the processor also chooses actions and/or settings of the robotic device in response to predicted (or measured or inferred) environmental characteristics of a location. In other examples, the processor inputs distance sensor data, audio sensor data, or optical sensor data into the classifier to classify the sensor data into different environmental characteristic classes (e.g., different driving surface types, room or area types, levels of debris accumulation, debris types, debris sizes, traffic level, obstacle density, human activity level, driving surface quality, etc.).

In some embodiments, the processor may use environmental sensor data from more than one type of sensor to improve predictions of environmental characteristics. Different types of sensors may include, but are not limited to, obstacle sensors, audio sensors, image sensors, TOF sensors, and/or current sensors. In some embodiments, the processor may provide the classifier with different types of sensor data and over time the weight of each type of sensor data in determining the predicted output is optimized by the classifier. For example, a processor of a robotic device may use both electrical current sensor data of a wheel motor and distance sensor data to predict driving type, thereby increasing the confidence in the predicted type of driving surface.

In some embodiments, the processor may use thresholds, change in sensor data over time, distortion of sensor data, and/or entropy to predict environmental characteristics. In other instances, the processor uses other approaches for predicting (or measuring or inferring) environmental characteristics of locations within the environment. In some embodiments, to increase confidence in predictions (or measurements or inferences) of environmental characteristics in different locations of the environment, the processor uses a first set of environmental sensor data collected by a first environmental sensor to predict (or measure or infer) an environmental characteristic of a particular location a priori to using a second set of environmental sensor data collected by a second environmental sensor to predict an environmental characteristic of the particular location.

In some embodiments, the robotic device may initially operate with default settings for various components. For example, the wheels may initially operate at a predetermined speed, resulting in a predetermined speed of the robotic device. In another example, the main brush, peripheral brush, and impeller of a surface cleaning device may initially operate at a predetermined speed and the vacuum function may initially be activated while the mopping function is deactivated; however, if activated at a later time, the UV light may be activated by default. In some embodiments, default settings may be chosen during manufacturing based on what is suitable for most environments and/or users, or may be chosen by a user to suit a particular environment or their preferences. For example, for an outdoor road sweeper robot setting a default slow speed for a sweeper brush generally conserves energy, slow speed for an impeller of a leaf blower typically reduces sound, high speed for an impeller is usually more effective for leaf blowing, etc.

In some instances, different default settings are set by a user using an application of a communication device (as described above) or an interface of the robotic device for different areas within an environment. For example, a user or a surface cleaning device may prefer reduced impeller speed in bedrooms to reduce noise or high impeller speed in areas with soft floor types (e.g., carpet) or with high levels of dust and debris. As the robotic device navigates throughout the environment and sensors collect data, the processor may use the classifier to predict real-time environmental characteristics of the current location of the robotic device such as driving surface type, room or area type, debris accumulation, debris type, debris size, traffic level, human activity level, obstacle density, etc. In some embodiments, the processor assigns the environmental characteristics to the corresponding grid cell of the map of the environment. In some embodiments, the processor may adjust the default speed of components to best suit the environmental characteristics of the location predicted.

In some embodiments, the processor may adjust the speed of components by providing more or less power to the motor driving the components. For example, for grass, the processor decreases the power supplied to the wheel motors to decrease the speed of the wheels and the robotic device and increases the power supplied to the cutting blade motor to rotate the cutting blade at an increased speed for thorough grass trimming.

In some embodiments, the processor records all or a portion of the real-time decisions corresponding to a particular location within the environment in a memory of the robotic device. In some embodiments, the processor marks all or a portion of the real-time decisions corresponding to a particular location within the grid map of the environment. For example, a processor marks the particular cell within the grid map corresponding with the location of the robotic device when increasing the speed of wheel motors because it predicts a particular driving surface type. In some embodiments, data may be saved in ASCII or other formats to occupy minimal memory space.

In some embodiments, the processor represents and distinguishes environmental characteristics using ordinal, cardinal, or nominal values, like numerical scores in various dimensions or descriptive categories that serve as nominal values. For example, the processor may denote different driving surface types, such as carpet, grass, rubber, hardwood, cement, and tile by numerical categories, such as 1, 2, 3, 4, 5 and 6, respectively. In some embodiments, numerical or descriptive categories may be a range of values. For example, the processor may denote different levels of debris accumulation by categorical ranges such as 1-2, 2-3, and 3-4, wherein 1-2 denotes no debris accumulation to a low level of debris accumulation, 2-3 denotes a low to medium level of debris accumulation, and 3-4 denotes a medium to high level of debris accumulation. In some embodiments, the processor combines the numerical values with a 2D coordinate map of the environment forming a multi-dimensional coordinate map describing environmental characteristics of different locations within the environment, e.g., in a multi-channel bitmap. In some embodiments, the processor updates the grid map with new sensor data collected and/or information inferred from the new sensor data in real-time or after a work session. In some embodiments, the processor generates an aggregate map of all or a portion of the maps generated during each work session wherein the processor uses the environmental characteristics of the same cell predicted in each map to determine probabilities of each environmental characteristic existing in the particular cell.

In some embodiments, the processor uses environmental characteristics of the environment to infer additional information such as boundaries between rooms or areas, transitions between different types of driving surfaces, and types of areas. For example, the processor may infer that a transition between different types of driving surfaces exists in a location of the environment where two adjacent cells have different predicted type of driving surface. In another example, the processor may infer with some degree of certainty that a collection of adjacent cells of the grid map with combined surface area below some threshold and all having hard driving surface are associated with a particular environment, such as a bathroom as bathrooms are generally smaller than all other rooms in an environment and generally have hard flooring. In some embodiments, the processor labels areas or rooms of the environment based on such inferred information.

In some embodiments, the processor may adjust the speed of components of the robotic device continuously. For example, the processor continuously increases the power provided to the main brush motor as the robotic device transitions from operating on hardwood floor to carpeted floor. In other embodiments, the processor adjusts speed of components using discrete increments/decrements. For example, the processor may choose from 2, 3, or 4 different levels of speed during operation. In some embodiments, different discrete increments/decrements are used for different components.

In some embodiments, the processor commands the robotic device to complete operation on one type of driving surface before moving on to another type of driving surface. In some embodiments, the processor commands the robotic device to prioritize operating on cells with a particular environmental characteristic first (e.g., cell with high level of debris accumulation, cells with carpet or grass, cells with minimal obstacles, etc.). In some embodiments, the processor generates a movement path that connects cells with a particular environmental characteristic and the processor commands the robotic device to operate along the path. In some embodiments, the processor may command the robotic device to drive over cells with a particular environmental characteristic more slowly or quickly for a predetermined amount of time and/or at a predetermined frequency over a period of time. For example, a processor may command a robotic device to operate on cells with a particular driving surface type, such as hardwood flooring, five times per week. In some embodiments, a user provides the above-mentioned commands and/or other commands to the robotic device using an application of a communication device paired with the robotic device (as described above) or an interface of the robotic device.

The methods and techniques described herein may be used with various types of robotic devices such as a surface cleaning robotic device (e.g., mop, vacuum, pressure cleaner, steam cleaner, etc.), a robotic router, a robot for item or food delivery, a restaurant server robot, a first aid robot, a robot for transporting passengers, a robotic charger, an image and video recording robot, an outdoor robotic sweeper, a robotic mower, a robotic snow plough, a salt or sand spreading robot, a multimedia robotic device, a robotic cooking device, a car washing robotic device, a robotic hospital bed, and the like. Some examples are described in U.S. Patent Application Nos. 62/736,676, 62/729,015, 62/730,675, 62/736,239, 62/737,270, 62/739,738, 62/756, 896, 62/772,026, 62/774,420, 62/760,267, and 62/737,576, the entire contents of which are hereby incorporated by reference.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A method for tracking movement of a robotic device within an environment, comprising:
   tracking, with a processor of the robotic device, a movement of the robotic device based on data from a first sensor and data from a second sensor, wherein:
      the data from the first sensor indicates a rotation count of wheels of the robotic device; and
      the data from the second sensor is utilized to account for wheel rotations that do not move the robotic device when at least one of the wheels of the robotic device is slipping;
   iteratively capturing, with the processor of the robotic device, the data from the first sensor as the robotic device moves within the environment;
   determining, with the processor of the robotic device, a displacement value of the robotic device in two dimensions based on the data from the second sensor;
   determining, with the processor of the robotic device, a difference in displacement values between a displacement value determined based on the data from the first sensor and the displacement value determined based on the data from the second sensor, wherein the difference in the displacement value is computed as slippage of the robotic device;
   adjusting, with the processor of the robotic device, the tracked movement based on at least data from the first sensor and the second sensor;
   estimating, with the processor of the robotic device, a new location of the robotic device based on the adjusted tracked movement; and
   navigating, with the processor of the robotic device, the robotic device to perform a task within the environment, wherein the task is cleaning a surface within the environment.

2. The method of claim 1, wherein estimating the new location of the robotic device comprises:
   updating, with the processor of the robotic device, a last estimated location of the robotic device to a new estimated location of the robotic device after the movement.

3. The method of claim 2, wherein:
   updating, with the processor of the robotic device, the new estimated location of the robotic device comprises:
      creating or updating, with the processor of the robotic device, an ensemble of simulated locations based on a plurality of new estimated locations.

4. The method of claim 3, wherein updating the new estimated location of the robotic device further comprises:
   selecting, with the processor of the robotic device, a most feasible simulated location to determine the location of the robotic device.

5. The method of claim 3, wherein the processor of the robotic device eliminates simulated locations of the robotic device when a probability of being feasible is below a threshold.

6. The method of claim 5, wherein the processor of the robotic device generates new simulated locations of the robotic device to replace the eliminated simulated locations.

7. The method of claim 1, wherein the first sensor of the robotic device is an encoder.

8. The method of claim 1, wherein the second sensor of the robotic device is an optoelectronic sensor.

9. The method of claim 1, wherein the first and second sensors capture sequential data from the environment.

10. The method of claim 8, wherein at least one of the first sensor and the second sensor is coupled with at least one light source.

11. The method of claim 10, wherein the at least one light source comprises a laser.

12. The method of claim 10, wherein the at least one light source comprises an LED.

13. The method of claim 10, wherein the processor of the robotic device alternates the at least one light source when a reading quality value is below a threshold.

14. The method of claim 1, wherein the method further comprises:
   creating, with the processor of the robotic device, a map of the environment.

15. The method of claim 14, wherein the method further comprises:
   autonomously segmenting, with the processor of the robotic device, the map of the environment into rooms.

16. The method of claim 15, wherein the method further comprises:
   determining, with the processor of the robotic device, a floor type.

17. The method of claim 16, wherein the method further comprises:
   activating or deactivating, with the processor of the robotic device, a mopping function, or a liquid release of the robotic device based on the floor type.

18. The method of claim 16, wherein the method further comprises:
   recording, with the processor of the robotic device, a level of debris accumulation; and
   marking, with the processor of the robotic device, locations of debris accumulation within the map of the environment.

19. The method of claim 18, wherein the method further comprises:
   determining, with the processor of the robotic device, a path of the robotic device based on the locations of debris accumulation within the environment.

20. The method of claim 18, wherein the method further comprises:
   adjusting, with the processor of the robotic device, settings of the robotic device based on the level of dirt accumulation, or the locations of dirt accumulations, wherein the settings of the robotic device comprise adjusting a motor speed or activating or deactivating a cleaning component.

21. The method of claim 1, wherein the method further comprises:
navigating, with the processor of the robotic device, back to a charging station after the task is completed, wherein the robotic device distinguishes the charging station based on features associated with the charging station, comprising at least one of a particular print, a painting, and a pattern on a surface of the charging station.

22. The method of claim 1, wherein the method further comprises:
estimating, with the processor of the robotic device, a major wall angle of a room to align a path of the robotic device with a wall in the room.

23. The method of claim 14, wherein the robotic device is paired with an application of a communication device configured to:
receive at least a user input designating a task schedule of the robotic device, a number of coverage repetitions of a room, a cleaning power setting, a room within which a task is to be performed, and an instruction for the robotic device to empty a dustbin of the robotic device;
receive at least a user input designating a modification, or a deletion of an obstacle, an addition, a modification, or a deletion of a virtual barrier;
receive at least a user input designating an addition, a modification, or a deletion of a subarea within the map of the environment; and
display a status of the robot, a history of work sessions comprising at least a total area covered and total hours of operation, and an error.

24. The method of claim 23, wherein:
the application of the communication device is further configured to:
receive at least one user input designating a liquid dispersion setting, rooms within which vacuuming is to be performed, and rooms within which mopping is to be performed.

25. The method of claim 1, wherein the method further comprises:
determining, with the processor of the robotic device, a schedule for performing tasks at different rooms of the environment based on data indicating a level of user activity or a time of user activity in rooms within the environment.

26. The method of claim 14, wherein the method further comprises:
associating, with the processor of the robotic device, environmental characteristics of rooms within the environment, wherein:
an application of a communication device paired with the robotic device is configured to display the map of the environment including the environmental characteristics.

27. The method of claim 1, wherein the method further comprises:
inferring, with the processor of the robotic device, a presence of a user in the environment.

28. A robot, comprising:
a chassis;
a set of wheels coupled to the chassis;
one or more electric motors for rotating the set of wheels;
one or more tools for performing work coupled to the chassis;
a processor electronically coupled to a plurality of sensors; and
a tangible, non-transitory, machine readable medium storing instructions that when executed by the processor of the robot effectuates operations comprising:
iteratively capturing, with the processor of the robot, data from a first sensor and a second sensor as the robot moves within an environment, wherein the first sensor is an encoder and the second sensor is an optoelectronic sensor;
tracking, with the processor of the robot, a movement of the robot based on the data from the first sensor and the data from the second sensor;
determining, with the processor of the robot, displacement of the robot in two dimensions based on the data from the second sensor;
determining, with the processor of the robot, a difference in displacement values between the displacement value determined based on the data from the first sensor and the displacement value determined based on the data from the second sensor, wherein the difference in the displacement values is computed as slippage of the robot;
adjusting, with the processor of the robot, the tracked movement from the first sensor based on at least data from the second sensor of the robot;
creating, with the processor of the robot, a map of the environment as the robot moves within the environment;
estimating, with the processor of the robot, a new location of the robot based on the adjusted tracked movement, wherein estimating the new location of the robotic device comprises:
updating a last estimated location of the robot to a new estimated location of the robot after the movement within the map of the environment; and
navigating, with the processor of the robot, the robot to perform a task within the environment;
wherein the robotic device is paired with an application of a communication device configured to:
receive at least a user input designating a task schedule of the robotic device, a number of coverage repetitions of a room, a cleaning power setting, a room within which a task is to be performed, and an instruction for the robotic device to empty a dustbin of the robotic device;
receive at least a user input designating a modification, or a deletion of an obstacle, an addition, a modification, or a deletion of a virtual barrier;
receive at least a user input designating an addition, a modification, or a deletion of a subarea within the map of the environment; and
display a status of the robot, a history of work sessions comprising at least a total area covered and total hours of operation, and an error.

29. A device for tracking movement of a robot within an environment, comprising:
a robot, comprising:
a chassis;
a set of wheels coupled to the chassis;
one or more electric motors for rotating the set of wheels;
one or more tools for performing work coupled to the chassis;
a processor electronically coupled to a plurality of sensors; and a tangible, non-transitory, machine readable medium storing instructions that when executed by the processor of the robot effectuates operations comprising:
- iteratively capturing, with the processor of the robot, data from a first sensor and a second sensor as the robot moves within the environment, wherein the first sensor is an encoder and the second sensor is an optoelectronic sensor coupled with a light source;
- tracking, with the processor of the robot, a movement of the robot based on the data from the first sensor and the data from the second sensor;
- determining, with the processor of the robot, a displacement value of the robot in two dimensions based on the data from the second sensor;
- determining, with the processor of the robot, a difference in displacement values between a displacement value determined based on the data from the first sensor and the displacement value determined based on the data from the second sensor, the difference in the displacement values is computed as slippage of the robot;
- adjusting, with the processor of the robot, the recorded movement by the first sensor based on at least data from the second sensor of the robot;
- creating, with the processor of the robot, a map of the environment;
- estimating, with the processor of the robot, a new location of the robot based on the adjusted tracked movement, wherein estimating the new location of the robot comprises:
  - updating a last estimated location of the robot to a new estimated location of the robot after the movement within the map of the environment; and
- navigating, with the processor of the robot, the robot to perform a task within the environment;
wherein the robotic device is paired with an application of a communication device configured to:
- receive at least a user input designating a task schedule of the robot, a number of coverage repetitions of a room, a cleaning power setting, a room within which a task is to be performed, and an instruction for the robotic device to empty a dustbin of the robot;
- receive at least a user input designating a modification, or a deletion of an obstacle, an addition, a modification, or a deletion of a virtual barrier;
- receive at least a user input designating an addition, a modification, or a deletion of a subarea within the map of the environment; and
- display a status of the robot, a history of work sessions comprising at least a total area covered and total hours of operation, and an error.

30. A tangible, non-transitory, machine-readable medium storing instructions that when executed by a processor of a robot effectuates operations comprising:
- iteratively capturing, with the processor of the robot, data from a first sensor and a second sensor as the robot moves within the environment, wherein the first sensor is an encoder and the second sensor is an optoelectronic sensor and is coupled with a light source;
- tracking, with the processor of the robot, a movement of the robot based on the data from a first sensor and the data from a second sensor;
- determining, with the processor of the robot, displacement value of the robotic device in two dimensions based on the data from the second sensor;
- determining, with the processor of the robot, a difference in displacement value between the displacement determined based on the data from the second sensor and a displacement determined based on the data from the first sensor, the difference in displacement being indicative of slippage;
- adjusting, with the processor of the robot, the recorded movement by the first sensor based on at least data from the second sensor of the robot;
- creating, with the processor of the robot, a map of the environment;
- estimating, with the processor of the robot, a new location of the robot based on the adjusted tracked movement, wherein estimating the new location of the robot comprises:
  - updating a last estimated location of the robot to a new estimated location of the robot after the movement within the map of the environment; and
- navigating, with the processor of the robot, the robot to perform a task within the environment;
wherein the robot is paired with an application of a communication device configured to:
- receive at least a user input designating a task schedule of the robot, a number of coverage repetitions of a room, a cleaning power setting, a room within which a task is to be performed, and an instruction for the robot device to empty a dustbin of the robot device;
- receive at least a user input designating a modification, or a deletion of an obstacle, an addition, a modification, or a deletion of a virtual barrier;
- receive at least a user input designating an addition, a modification, or a deletion of a subarea within the map; and
- display a status of the robot, a history of work sessions comprising at least a total area covered and total hours of operation, and an error.

* * * * *